United States Patent
Dinan

(10) Patent No.: US 9,642,098 B2
(45) Date of Patent: *May 2, 2017

(54) MANAGING SOUNDING SIGNALS TO LIMIT POWER IN A MULTICARRIER WIRELESS DEVICE

(71) Applicant: Comcast Cable Communications, LLC, Philadelphia, PA (US)

(72) Inventor: Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,881

(22) Filed: Mar. 4, 2016

(65) Prior Publication Data
US 2016/0192361 A1 Jun. 30, 2016

Related U.S. Application Data

(63) Continuation of application No. 14/953,827, filed on Nov. 30, 2015, now Pat. No. 9,319,194, which is a (Continued)

(51) Int. Cl.
*H04L 5/00* (2006.01)
*H04W 74/08* (2009.01)
(Continued)

(52) U.S. Cl.
CPC ........ *H04W 52/346* (2013.01); *H04B 7/2618* (2013.01); *H04J 11/00* (2013.01);
(Continued)

(58) Field of Classification Search
CPC ......... H04W 56/0005; H04W 72/0406; H04W 56/0045; H04W 72/0473; H04W 72/10;
(Continued)

(56) References Cited

U.S. PATENT DOCUMENTS

| | | |
|---|---|---|
| 4,954,892 A | 9/1990 | Asai et al. |
| 5,740,167 A | 4/1998 | Taketsugu et al. |

(Continued)

FOREIGN PATENT DOCUMENTS

| | | |
|---|---|---|
| EP | 2640138 A1 | 9/2013 |
| WO | 2011023057 A1 | 3/2011 |

(Continued)

OTHER PUBLICATIONS

3GPP TSG RAN WG1 Meeting #66bis R1-113187, Zhuhai, China, Oct. 10-14, 2011, Source: LG Electronics, Title: Discussion on Simultaneous Uplink Channel Transmission in Rel-11.

(Continued)

*Primary Examiner* — Gbemileke J Onamuti
(74) *Attorney, Agent, or Firm* — Banner & Witcoff, Ltd.

(57) ABSTRACT

A wireless device receives message(s) configuring cell groups and transmissions of sounding reference signals (SRSs). Uplink transmission timing in a first cell group is derived employing a cell in the first cell group and uplink transmission timing in a second cell group is derived employing a second cell in the second cell group. A first signal is transmitted on a cell of the first cell group. A first subset of the SRSs are dropped and a second subset of the SRSs are transmitted.

40 Claims, 21 Drawing Sheets

Related U.S. Application Data continuation of application No. 14/599,490, filed on Jan. 17, 2015, now Pat. No. 9,204,406, which is a continuation of application No. 13/862,423, filed on Apr. 14, 2013, now Pat. No. 8,964,683.

(60) Provisional application No. 61/654,900, filed on Jun. 3, 2012, provisional application No. 61/635,957, filed on Apr. 20, 2012.

(51) Int. Cl.

| | | |
|---|---|---|
| H04W 72/10 | (2009.01) | |
| H04W 72/04 | (2009.01) | |
| H04W 52/34 | (2009.01) | |
| H04W 56/00 | (2009.01) | |
| H04W 52/06 | (2009.01) | |
| H04W 52/36 | (2009.01) | |
| H04W 52/40 | (2009.01) | |
| H04B 7/26 | (2006.01) | |
| H04L 5/14 | (2006.01) | |
| H04L 27/18 | (2006.01) | |
| H04L 12/24 | (2006.01) | |
| H04L 29/12 | (2006.01) | |
| H04L 29/06 | (2006.01) | |
| H04W 76/04 | (2009.01) | |
| H04J 11/00 | (2006.01) | |
| H04W 88/02 | (2009.01) | |

(52) U.S. Cl.
CPC ............ *H04L 5/005* (2013.01); *H04L 5/0007* (2013.01); *H04L 5/0048* (2013.01); *H04L 5/14* (2013.01); *H04L 27/18* (2013.01); *H04L 41/0681* (2013.01); *H04L 61/6022* (2013.01); *H04L 69/22* (2013.01); *H04W 52/06* (2013.01); *H04W 52/367* (2013.01); *H04W 52/40* (2013.01); *H04W 56/005* (2013.01); *H04W 56/0005* (2013.01); *H04W 56/0045* (2013.01); *H04W 72/04* (2013.01); *H04W 72/042* (2013.01); *H04W 72/0406* (2013.01); *H04W 72/0413* (2013.01); *H04W 72/0446* (2013.01); *H04W 72/0473* (2013.01); *H04W 72/10* (2013.01); *H04W 74/0833* (2013.01); *H04W 76/046* (2013.01); *H04J 2011/0096* (2013.01); *H04W 88/02* (2013.01)

(58) Field of Classification Search
CPC . H04W 72/04; H04W 52/06; H04W 72/0413; H04W 74/0833; H04W 52/367; H04W 56/005; H04L 5/0048; H04L 5/0007
See application file for complete search history.

(56) References Cited

U.S. PATENT DOCUMENTS

| | | | |
|---|---|---|---|
| D431,347 S | 10/2000 | Bettencourt | |
| 6,201,803 B1 | 3/2001 | Munday et al. | |
| 6,714,784 B1 | 3/2004 | Forssell et al. | |
| 6,804,212 B1 | 10/2004 | Vallstrom et al. | |
| 7,352,714 B2 | 4/2008 | Balachandran et al. | |
| 7,912,485 B2 | 3/2011 | Sinnarajah et al. | |
| 8,031,662 B2 | 10/2011 | Lee et al. | |
| 8,077,670 B2 | 12/2011 | Fan et al. | |
| 8,131,295 B2 | 3/2012 | Wang et al. | |
| 8,270,424 B2 | 9/2012 | Rao | |
| 8,280,391 B2 | 10/2012 | Kim et al. | |
| 8,289,922 B2 | 10/2012 | Ewe et al. | |
| 8,395,985 B2 | 3/2013 | Dinan | |
| 8,422,410 B2 | 4/2013 | Park et al. | |
| 8,432,811 B2 | 4/2013 | Park et al. | |
| 8,462,610 B1 | 6/2013 | Dinan | |
| 8,462,688 B1 | 6/2013 | Dinan | |
| 8,503,322 B2 | 8/2013 | Krishnamurthy et al. | |
| 8,520,497 B1 | 8/2013 | Dinan | |
| 8,526,310 B2 | 9/2013 | Dinan | |
| 8,526,389 B2 | 9/2013 | Dinan | |
| 8,531,966 B1 | 9/2013 | Dinan | |
| 8,537,739 B1 | 9/2013 | Dinan | |
| 8,542,654 B1 | 9/2013 | Dinan | |
| 8,547,929 B1 | 10/2013 | Dinan | |
| 8,553,558 B1 | 10/2013 | Dinan | |
| 8,553,655 B1 | 10/2013 | Dinan | |
| 8,553,671 B2 | 10/2013 | Kim et al. | |
| 8,559,405 B2 | 10/2013 | Dinan | |
| 8,565,142 B1 | 10/2013 | Dinan | |
| 8,571,467 B2 | 10/2013 | Uusitalo et al. | |
| 8,576,780 B2 | 11/2013 | Vujcic | |
| 8,588,169 B2 | 11/2013 | Dinan | |
| 8,599,785 B1 | 12/2013 | Dinan | |
| 8,619,727 B1 | 12/2013 | Dinan | |
| 8,625,404 B2 | 1/2014 | Dinan | |
| 8,625,405 B2 | 1/2014 | Dinan | |
| 8,644,129 B2 | 2/2014 | Dinan | |
| 8,687,541 B2 | 4/2014 | Lohr et al. | |
| 8,699,317 B2 | 4/2014 | Dinan | |
| 8,717,866 B2 | 5/2014 | Dinan | |
| 8,767,585 B2 | 7/2014 | Pelletier et al. | |
| 8,780,784 B2 | 7/2014 | Chung et al. | |
| 8,804,668 B2 | 8/2014 | Dinan | |
| 8,811,433 B2 | 8/2014 | Zhao et al. | |
| 8,824,968 B2 | 9/2014 | Kim et al. | |
| 8,837,304 B2 | 9/2014 | Yamada | |
| 8,867,666 B2 | 10/2014 | Kim et al. | |
| 8,873,443 B2 | 10/2014 | Haim et al. | |
| 8,885,589 B2 | 11/2014 | Kim et al. | |
| 8,897,248 B2 | 11/2014 | Dinan | |
| 8,917,593 B2 | 12/2014 | Damnjanovic et al. | |
| 8,934,438 B2 | 1/2015 | Dinan | |
| 8,934,459 B2 | 1/2015 | Marinier et al. | |
| 8,958,342 B2 | 2/2015 | Dinan | |
| 8,964,590 B2 | 2/2015 | Dinan | |
| 8,964,593 B2 | 2/2015 | Dinan | |
| 8,964,659 B2 | 2/2015 | Vujcic | |
| 8,964,683 B2 | 2/2015 | Dinan | |
| 8,964,780 B2 | 2/2015 | Dinan | |
| 8,964,793 B2 | 2/2015 | Jang et al. | |
| 8,971,280 B2 | 3/2015 | Dinan | |
| 8,971,298 B2 | 3/2015 | Dinan | |
| 8,976,765 B2 | 3/2015 | Dinan | |
| 8,982,852 B2 | 3/2015 | Dinan | |
| 8,989,128 B2 | 3/2015 | Dinan | |
| 8,995,381 B2 | 3/2015 | Dinan | |
| 8,995,405 B2 | 3/2015 | Dinan | |
| 9,001,780 B2 | 4/2015 | Chen et al. | |
| 9,008,050 B2 | 4/2015 | Feuersanger et al. | |
| 9,042,925 B2 | 5/2015 | Seo et al. | |
| 9,054,835 B2 | 6/2015 | Kwon et al. | |
| 9,054,841 B2 | 6/2015 | Ouchi et al. | |
| 9,084,228 B2 | 7/2015 | Dinan | |
| 9,084,270 B2 | 7/2015 | Dinan | |
| 9,107,206 B2 | 8/2015 | Dinan | |
| 9,113,387 B2 | 8/2015 | Dinan | |
| 9,137,762 B2 | 9/2015 | Ahn et al. | |
| 9,155,092 B2 | 10/2015 | Park et al. | |
| 9,161,322 B2 | 10/2015 | Dinan | |
| 9,161,323 B2 | 10/2015 | Dinan | |
| 9,179,420 B2 | 11/2015 | Dinan | |
| 9,179,425 B2 | 11/2015 | Dinan | |
| 9,179,454 B2 | 11/2015 | Dinan | |
| 9,179,457 B2 | 11/2015 | Dinan | |
| 9,204,406 B2 | 12/2015 | Dinan | |
| 9,204,407 B2 | 12/2015 | Dinan | |
| 9,210,619 B2 | 12/2015 | Dinan | |
| 9,210,664 B2 | 12/2015 | Dinan | |
| 9,210,665 B2 | 12/2015 | Dinan | |
| 9,210,667 B2 | 12/2015 | Dinan | |
| 9,210,676 B2 | 12/2015 | Dinan | |
| 9,215,051 B2 | 12/2015 | Dinan | |
| 9,215,678 B2 | 12/2015 | Dinan | |

(56) References Cited

U.S. PATENT DOCUMENTS

| | | |
|---|---|---|
| 9,220,116 B2 | 12/2015 | Dinan |
| 9,237,537 B2 | 1/2016 | Dinan |
| 9,241,326 B2 | 1/2016 | Dinan |
| 9,319,194 B2 | 4/2016 | Dinan |
| 9,337,980 B2 | 5/2016 | Ahn et al. |
| 9,363,832 B2 | 6/2016 | Dinan |
| 9,386,490 B2 | 7/2016 | Dinan |
| 9,386,604 B2 | 7/2016 | Dinan |
| 9,391,824 B2 | 7/2016 | Dinan |
| 9,392,623 B2 | 7/2016 | Dinan |
| 9,397,875 B2 | 7/2016 | Dinan |
| 9,402,255 B2 | 7/2016 | Lohr et al. |
| 9,414,332 B2 | 8/2016 | Dinan |
| 9,414,340 B2 | 8/2016 | Dinan |
| 9,439,217 B2 | 9/2016 | Feuersaenger et al. |
| 2003/0087647 A1 | 5/2003 | Hurst |
| 2004/0202119 A1 | 10/2004 | Edge |
| 2005/0037786 A1 | 2/2005 | Edge |
| 2007/0002890 A1 | 1/2007 | Mangold et al. |
| 2007/0032255 A1 | 2/2007 | Koo et al. |
| 2007/0149196 A1 | 6/2007 | Choi et al. |
| 2007/0189205 A1 | 8/2007 | Terry et al. |
| 2007/0207828 A1 | 9/2007 | Cheng et al. |
| 2007/0293224 A1 | 12/2007 | Wang et al. |
| 2008/0039087 A1 | 2/2008 | Gallagher et al. |
| 2008/0084849 A1 | 4/2008 | Wang et al. |
| 2008/0102842 A1 | 5/2008 | Kim |
| 2008/0102896 A1 | 5/2008 | Wang et al. |
| 2008/0123576 A1 | 5/2008 | Son et al. |
| 2008/0130585 A1 | 6/2008 | Park et al. |
| 2008/0137632 A1 | 6/2008 | Choi et al. |
| 2008/0182579 A1 | 7/2008 | Wang et al. |
| 2008/0267127 A1 | 10/2008 | Narasimha et al. |
| 2009/0109838 A1 | 4/2009 | Kuo |
| 2009/0181687 A1 | 7/2009 | Tiirola et al. |
| 2009/0186613 A1 | 7/2009 | Ahn et al. |
| 2009/0238121 A1 | 9/2009 | Kotecha |
| 2009/0239545 A1 | 9/2009 | Lee et al. |
| 2009/0316637 A1 | 12/2009 | Yi et al. |
| 2009/0316678 A1 | 12/2009 | Yamada et al. |
| 2010/0035581 A1 | 2/2010 | Park et al. |
| 2010/0056160 A1 | 3/2010 | Kim et al. |
| 2010/0067470 A1 | 3/2010 | Damnjanovic et al. |
| 2010/0069071 A1 | 3/2010 | Simonsson et al. |
| 2010/0098011 A1 | 4/2010 | Pelletier et al. |
| 2010/0118788 A1 | 5/2010 | Ohta et al. |
| 2010/0130137 A1 | 5/2010 | Pelletier et al. |
| 2010/0144353 A1 | 6/2010 | Chong et al. |
| 2010/0184446 A1 | 7/2010 | Moon et al. |
| 2010/0215004 A1 | 8/2010 | Yoo |
| 2010/0227569 A1 | 9/2010 | Bala et al. |
| 2010/0238872 A1 | 9/2010 | Kim et al. |
| 2010/0238908 A1 | 9/2010 | Wu |
| 2010/0254356 A1 | 10/2010 | Tynderfeldt et al. |
| 2010/0279695 A1 | 11/2010 | Amirijoo et al. |
| 2010/0290427 A1 | 11/2010 | Sebire et al. |
| 2010/0302998 A1 | 12/2010 | Bao et al. |
| 2010/0303039 A1 | 12/2010 | Zhang et al. |
| 2010/0309877 A1 | 12/2010 | Damnjanovic et al. |
| 2011/0039568 A1 | 2/2011 | Zhang et al. |
| 2011/0039593 A1 | 2/2011 | Lee et al. |
| 2011/0044287 A1 | 2/2011 | Park et al. |
| 2011/0081936 A1 | 4/2011 | Haim et al. |
| 2011/0085491 A1 | 4/2011 | Tynderfeldt et al. |
| 2011/0098054 A1 | 4/2011 | Gorokhov et al. |
| 2011/0111749 A1 | 5/2011 | Kim et al. |
| 2011/0128935 A1 | 6/2011 | Jang et al. |
| 2011/0134774 A1 | 6/2011 | Pelletier et al. |
| 2011/0158116 A1 | 6/2011 | Tenny et al. |
| 2011/0194455 A1 | 8/2011 | Aminaka et al. |
| 2011/0194493 A1 | 8/2011 | Centonza et al. |
| 2011/0200014 A1 | 8/2011 | Lee et al. |
| 2011/0201367 A1 | 8/2011 | Aminaka et al. |
| 2011/0222428 A1 | 9/2011 | Charbit et al. |
| 2011/0222492 A1 | 9/2011 | Borsella et al. |
| 2011/0223932 A1 | 9/2011 | Hole et al. |
| 2011/0243102 A1 | 10/2011 | Sebire et al. |
| 2011/0243106 A1 | 10/2011 | Hsu et al. |
| 2011/0249641 A1 | 10/2011 | Kwon et al. |
| 2011/0250918 A1 | 10/2011 | Jen |
| 2011/0255431 A1 | 10/2011 | Wang et al. |
| 2011/0261776 A1 | 10/2011 | Ahn et al. |
| 2011/0268032 A1 | 11/2011 | Kim et al. |
| 2011/0268087 A1 | 11/2011 | Kwon et al. |
| 2011/0269469 A1 | 11/2011 | Xiao et al. |
| 2011/0275335 A1 | 11/2011 | Luo et al. |
| 2011/0281581 A1 | 11/2011 | Brandt et al. |
| 2011/0286409 A1 | 11/2011 | Son et al. |
| 2011/0286411 A1 | 11/2011 | Kim et al. |
| 2011/0294508 A1 | 12/2011 | Min et al. |
| 2011/0299489 A1 | 12/2011 | Kim et al. |
| 2011/0300856 A1 | 12/2011 | Aminaka |
| 2011/0310845 A1 | 12/2011 | Jung et al. |
| 2012/0008524 A1 | 1/2012 | Amirijoo et al. |
| 2012/0008600 A1 | 1/2012 | Marinier et al. |
| 2012/0014371 A1 | 1/2012 | Weng et al. |
| 2012/0021693 A1 | 1/2012 | Wintzell et al. |
| 2012/0026972 A1 | 2/2012 | Miao et al. |
| 2012/0026976 A1 | 2/2012 | Chang et al. |
| 2012/0039273 A1 | 2/2012 | Nam et al. |
| 2012/0039284 A1 | 2/2012 | Barbieri et al. |
| 2012/0044906 A1 | 2/2012 | Chen et al. |
| 2012/0063425 A1 | 3/2012 | Wang et al. |
| 2012/0076037 A1 | 3/2012 | Noh et al. |
| 2012/0076088 A1 | 3/2012 | Hwang et al. |
| 2012/0076103 A1 | 3/2012 | Dai et al. |
| 2012/0077484 A1 | 3/2012 | Ji |
| 2012/0082152 A1 | 4/2012 | Baldemair et al. |
| 2012/0093128 A1 | 4/2012 | Song et al. |
| 2012/0106511 A1 | 5/2012 | Wu |
| 2012/0113883 A1 | 5/2012 | Osterling |
| 2012/0113914 A1 | 5/2012 | Zhao et al. |
| 2012/0113941 A1 | 5/2012 | Chung et al. |
| 2012/0113962 A1 | 5/2012 | Jen |
| 2012/0120944 A1 | 5/2012 | Yang et al. |
| 2012/0170497 A1 | 7/2012 | Zhang et al. |
| 2012/0170570 A1 | 7/2012 | Chang et al. |
| 2012/0176967 A1 | 7/2012 | Kim et al. |
| 2012/0178482 A1 | 7/2012 | Seo et al. |
| 2012/0188897 A1 | 7/2012 | Shen |
| 2012/0218987 A1 | 8/2012 | Zhao et al. |
| 2012/0218988 A1 | 8/2012 | Xu et al. |
| 2012/0224552 A1 | 9/2012 | Feuersanger et al. |
| 2012/0243498 A1 | 9/2012 | Kwon et al. |
| 2012/0243514 A1 | 9/2012 | Wu |
| 2012/0250520 A1 | 10/2012 | Chen et al. |
| 2012/0257510 A1 | 10/2012 | Jeong et al. |
| 2012/0257513 A1 | 10/2012 | Yamada |
| 2012/0257569 A1 | 10/2012 | Jang et al. |
| 2012/0257570 A1 | 10/2012 | Jang et al. |
| 2012/0257601 A1 | 10/2012 | Kim et al. |
| 2012/0275378 A1 | 11/2012 | Lee |
| 2012/0275390 A1 | 11/2012 | Korhonen et al. |
| 2012/0281680 A1 | 11/2012 | Bostrom et al. |
| 2012/0287865 A1 | 11/2012 | Wu et al. |
| 2012/0294163 A1 | 11/2012 | Turtinen et al. |
| 2012/0300715 A1 | 11/2012 | Pelletier et al. |
| 2012/0300743 A1 | 11/2012 | Kim et al. |
| 2012/0300752 A1 | 11/2012 | Kwon et al. |
| 2012/0307811 A1 | 12/2012 | Kwon et al. |
| 2012/0314652 A1 | 12/2012 | Ahn et al. |
| 2012/0314675 A1 | 12/2012 | Vujcic |
| 2012/0322453 A1 | 12/2012 | Weng et al. |
| 2012/0327804 A1 | 12/2012 | Park et al. |
| 2013/0010619 A1 | 1/2013 | Fong et al. |
| 2013/0010684 A1 | 1/2013 | Park et al. |
| 2013/0010704 A1 | 1/2013 | Kronquist et al. |
| 2013/0010711 A1 | 1/2013 | Larsson et al. |
| 2013/0010712 A1 | 1/2013 | Kim et al. |
| 2013/0021980 A1 | 1/2013 | Yang et al. |
| 2013/0028069 A1 | 1/2013 | Pelletier et al. |
| 2013/0028185 A1 | 1/2013 | Wu |
| 2013/0028198 A1 | 1/2013 | Yamada |
| 2013/0034085 A1 | 2/2013 | Bostrom et al. |

(56) References Cited

U.S. PATENT DOCUMENTS

| | | |
|---|---|---|
| 2013/0039294 A1 | 2/2013 | Wang |
| 2013/0044617 A1 | 2/2013 | Boixadera et al. |
| 2013/0044831 A1 | 2/2013 | Narasimha et al. |
| 2013/0044843 A1 | 2/2013 | Malkamaki et al. |
| 2013/0058309 A1 | 3/2013 | Kuo |
| 2013/0058315 A1 | 3/2013 | Feuersanger et al. |
| 2013/0064165 A1 | 3/2013 | Chen et al. |
| 2013/0064195 A1 | 3/2013 | Chang |
| 2013/0070726 A1 | 3/2013 | Zhang et al. |
| 2013/0072246 A1 | 3/2013 | Nobukiyo et al. |
| 2013/0078913 A1 | 3/2013 | Lee et al. |
| 2013/0083675 A1 | 4/2013 | Yamada |
| 2013/0083747 A1 | 4/2013 | Narasimha et al. |
| 2013/0083753 A1 | 4/2013 | Lee et al. |
| 2013/0084913 A1 | 4/2013 | Gaal et al. |
| 2013/0094433 A1 | 4/2013 | Nagata et al. |
| 2013/0094466 A1 | 4/2013 | Kim et al. |
| 2013/0100938 A1 | 4/2013 | Kwon et al. |
| 2013/0114398 A1 | 5/2013 | Wang |
| 2013/0114505 A1* | 5/2013 | Haim ............... H04W 52/146 370/328 |
| 2013/0114574 A1 | 5/2013 | Ng et al. |
| 2013/0148592 A1 | 6/2013 | Noh et al. |
| 2013/0155898 A1 | 6/2013 | Yin et al. |
| 2013/0163550 A1 | 6/2013 | Marinier et al. |
| 2013/0176988 A1 | 7/2013 | Wang et al. |
| 2013/0188473 A1 | 7/2013 | Dinan |
| 2013/0188580 A1 | 7/2013 | Dinan |
| 2013/0188617 A1 | 7/2013 | Dinan |
| 2013/0188619 A1 | 7/2013 | Dinan |
| 2013/0188620 A1 | 7/2013 | Dinan |
| 2013/0194908 A1 | 8/2013 | Gao et al. |
| 2013/0195048 A1 | 8/2013 | Ekpenyong et al. |
| 2013/0195084 A1 | 8/2013 | Chen et al. |
| 2013/0208601 A1 | 8/2013 | Cui et al. |
| 2013/0235807 A1 | 9/2013 | Lee et al. |
| 2013/0242892 A1 | 9/2013 | Ye |
| 2013/0242911 A1 | 9/2013 | Heo et al. |
| 2013/0250925 A1 | 9/2013 | Lohr et al. |
| 2013/0258957 A1 | 10/2013 | Dinan |
| 2013/0258958 A1 | 10/2013 | Dinan |
| 2013/0272229 A1 | 10/2013 | Dinan |
| 2013/0279434 A1 | 10/2013 | Dinan |
| 2013/0279435 A1 | 10/2013 | Dinan |
| 2013/0279486 A1 | 10/2013 | Kato et al. |
| 2013/0315214 A1 | 11/2013 | Bai et al. |
| 2013/0329675 A1 | 12/2013 | Dinan |
| 2013/0343358 A1 | 12/2013 | Kato et al. |
| 2014/0016559 A1 | 1/2014 | Jang et al. |
| 2014/0016593 A1 | 1/2014 | Park et al. |
| 2014/0023043 A1 | 1/2014 | Yang et al. |
| 2014/0029575 A1 | 1/2014 | Zeng et al. |
| 2014/0029586 A1 | 1/2014 | Loehr et al. |
| 2014/0050205 A1 | 2/2014 | Ahn et al. |
| 2014/0056244 A1 | 2/2014 | Frenne et al. |
| 2014/0079032 A1 | 3/2014 | Bergstrom et al. |
| 2014/0086182 A1 | 3/2014 | Shin et al. |
| 2014/0086213 A1 | 3/2014 | Kwon et al. |
| 2014/0092812 A1 | 4/2014 | Jang et al. |
| 2014/0105192 A1 | 4/2014 | Park et al. |
| 2014/0112308 A1 | 4/2014 | Kwon et al. |
| 2014/0185595 A1 | 7/2014 | Wu et al. |
| 2014/0192798 A1 | 7/2014 | Yang et al. |
| 2014/0198748 A1 | 7/2014 | Lee et al. |
| 2014/0219185 A1 | 8/2014 | Etemad et al. |
| 2014/0307670 A1 | 10/2014 | Kim et al. |
| 2014/0308956 A1 | 10/2014 | Zhang et al. |
| 2014/0321442 A1 | 10/2014 | Kim et al. |
| 2014/0328326 A1 | 11/2014 | Gunnarsson et al. |
| 2014/0334448 A1 | 11/2014 | Langereis et al. |
| 2014/0348078 A1 | 11/2014 | Kim et al. |
| 2014/0349713 A1 | 11/2014 | Yamada |
| 2014/0369317 A1 | 12/2014 | Ye |
| 2015/0036601 A1 | 2/2015 | Kim et al. |
| 2015/0043524 A1 | 2/2015 | Kim et al. |
| 2015/0063245 A1 | 3/2015 | Gao et al. |
| 2015/0063262 A1 | 3/2015 | Ji et al. |
| 2015/0071236 A1 | 3/2015 | Baldemair et al. |
| 2015/0208358 A1 | 7/2015 | Ahn et al. |
| 2015/0230191 A1* | 8/2015 | Seo ............... H04W 52/146 370/329 |
| 2016/0080126 A1 | 3/2016 | Dinan |
| 2016/0100372 A1 | 4/2016 | Dinan |

FOREIGN PATENT DOCUMENTS

| | | |
|---|---|---|
| WO | 2011085200 A1 | 7/2011 |
| WO | 2011120716 A1 | 10/2011 |
| WO | 2014085967 A1 | 6/2014 |

OTHER PUBLICATIONS

3GPP TSG RAN WG1 Meeting #66bis R1-113314, Zhuhai, China, Oct. 10-14, 2011, Source: Alcatel-Lucent, Alcatel-Lucent Shanghai Bell, Title: Multiple Timing Advances for Carrier Aggregation.

3GPP TSG RAN WG1 Meeting #67 R1-113910, San Francisco, USA, Nov. 14-18, 2011, Source: LG Electronics, Title: Aspect on Simultaneous Transmission of PRACH and UL Channels considering Multiple Timing Advance.

3GPP TSG RAN WG1 Meeting #67 R1-114093, San Francisco, USA, Nov. 14-18, 2011, Source: Huawei, HiSilicon, Title: RACH based multiple timing advances.

3GPP TSG RAN WG1 Meeting #68bis R1-120974, Jeju, Korea, Mar. 26-30, 2012, Source: Huawei, HiSilicon, Title: Consideration on simultaneous transmission for UL channels in case of MTA.

3GPP TSG-RAN WG1 #68bis R1-121020, Jeju Island, Korea, Mar. 26-30, 2012, Source: Ericsson, ST-Ericsson, Title: Channel Prioritization due to Multiple TA.

3GPP TSG RAN WG1 Meeting #68 bis R1-121064, Jeju, Korea, Mar. 26-30, 2012, Source: ZTE, Title: Consideration on remaining issues related to multiple TA.

3GPP TSG RAN WG1 Meeting #68bis R1-121084, Jeju, Korea, Mar. 26-30, 2012, Source: CATT, Title: UL transmission method with multiple timing advances in Rel-11.

3GPP TSG-RAN WG1 Meeting #68bis R1-121141, Jeju, Korea, Mar. 26-30, 2012, Source: Panasonic, Title: UE behavior for power limitation in multiple TA.

3GPP TSG RAN WG1 #68bis R1-121425, Jeju, Korea, Mar. 26-30, 2012, Source: LG Electronics, Title: SRS transmissions in multiple TA.

3GPP TSG RAN WG1 #68bis R1-121426, Jeju, Korea, Mar. 26-30, 2012, Source: LG Electronics, Title: Power limitation in multiple TA.

3GPP TSG RAN WG1 Meeting #68bis R1-121467, Jeju, Korea, Mar. 26-30, 2012, Source: NTT DOCOMO, Title: UL Transmissions in Case of Power Limitation for Multiple TA.

3GPP TSG-RAN WG1 #68bis R1-121551, Jeju, Korea, Mar. 24-30, 2012, Source: Qualcomm Incorporated, Title: Power control aspects of multiple TA operation.

3GPP TSG RAN WG1 #68bis R1-121896, Jeju, Korea, Mar. 26-30, 2012, Joint proposal on SRS transmission with multiple TA—full overlap case, LG Electronics. CATT, Pantech, Panasonic, Ericsson, ST-Ericsson.

3GPP TSG-RAN WG2 Meeting #76 R2-115755, San Francisco, U.S., Nov. 14-18, 2011, Source: ZTE, Title: Discussion on RACH collide with other UL transmission.

3GPP TSG-RAN WG2 Meeting #76 R2-115782, San Francisco, USA, Nov. 14-18, 2011, Source: Renesas Mobile Europe Ltd., Title: RACH procedure on SCell.

3GPP TSG-RAN WG2 Meeting #76 R2-115882, Nov. 14-18, 2011, San Francisco, USA, Source: Panasonic, Title: Parallel PRACH and PUSCH/PUCCH transmission.

3GPP TSG-RAN WG2 #76 Tdoc R2-115932, San Francisco, United States, Nov. 14-18, 2011, Source: Ericsson, ST Ericsson, Title: Parallel Transmission of Preamble and UL Data.

TSG-RAN WG2#76 R2-116184, Nov. 14-18, 2011, San Francisco, USA, Title: Simultaneous transmissions of RACH and PUCCH/PUSCH/SRS, Source: Alcatel-Lucent, Alcatel-Lucent Shanghai Bell.

(56) References Cited

OTHER PUBLICATIONS

3GPP TSG-RAN WG2 Meeting #76 R2-116311, San Francisco, USA, Nov. 14-18, 2011, Source: Fujitsu, Title: Collision between PUCCH and SCell PRACH.
3GPP TSG RAN WG2 Meeting #76, R2-115791 San Francisco, USA, Nov. 14-18, 2011 Source: CATT Title: Signaling for TAG configuration.
3GPP TSG-RAN WG2 Meeting #74 R2-113014 Barcelona, Spain, May 9-13, 2011 Source: Renesas Mobile Europe Title: Multiple timing advance using multiple RACH.
3GPP TSG-RAN WG2 Meeting #75bis R2-115181 Zhuhai, China, Oct. 10-14, 2011 Source: Nokia Siemens Networks, Nokia Corporation Title: TA group configuration and reconfiguration.
3GPP TSG-RAB WG2 Meeting#72bis, Tdoc R2-110356 Dublin, Ireland, Jan. 17-21, 2011 Source: ITRI Title: RF Receiver Information in UE Capability Signalling.
3GPP TSG RAN WG2 Meeting #77bis R2-121140 Jeju, Korea, Mar. 26-30, 2012 Source: CATT Title: Consideration on Multi-TA Capability.
3GPP TSG-RAN WG2 Meeting #76 R2-115757 San Francisco, USA, Nov. 14-18, 2011 R2-114939 Source: Nokia Siemens Networks, Nokia Corporation Title: MAC Downlink Signalling for Multiple TA.
3GPP TSG-RAN WG2 #74 Tdoc R2-113258 Barcelona, Spain, May 9-13, 2011 Source: InterDigital Communications Title: Support for RACH on SCells in LTE CA.
3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).
3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
3GPP TSG RAN WG1 Meeting #67 R1-113727 San Francisco, USA, Nov. 14-18, 2011 Source: CATT Title: Support of multiple timing advances in LTE-A Rel-11 with CA.
3GPP TSG RAN WG1 Meeting #67 R1-113961 San Francisco, USA, Nov. 14-18, 2011 Title: Rach Procedure for Multiple Timing Advances Source: Research in Motion, UK Limited.
3GPP TSG RAN WG1 #67 R1-113975 San Francisco, USA, Nov.14-18, 2011 Source: LG Electronics Title: RAN1 issues in supporting multiple timing advances.
3GPP TSG RAN WG2 Meeting #76 R2-115789 San Francisco, USA, Nov. 14-18, 2011 Source: CATT Title: CBRA on SCell.
3GPP TSG-RAN WG2 Meeting #76 R2-115804 San Francisco, USA, Nov. 14-18, 2011 Source: Nokia Siemens Networks, Nokia Corporation Title: RA procedure on SCell.
3GPP Tsg-Ran WG2 Meeting #76 R2-115817 San Francisco, USA, Nov. 14-18, 2011 Source: Potevio Title: Considerations on CBRA on SCell and Msg2 for SCell RA.
3GPP TSG-RAN WG2 Meeting #76 R2-116310 San Francisco, USA, Nov. 14-18, 2011 Source: Fujitsu Title: Remaining issues on SCell RA procedure.
3GPP TS 36.211 V10.0.0 (Dec. 2010), 3rd Generation Partnership Project; Technical Specification Group Radio Access Network; Evolved Universal TerrestrialRadio Access (E-UTRA); Physical channels and modulation (Release 10).
3GPP TSG-RAN WG2 Meeting #77 R2-120076 Dresden, Germany, Feb. 6-10, 2012 Source: ASUSTeK Title: Further consideration on timing reference for sTAG.
3GPP TSG-RAN WG2 Meeting #77 R2-120086 Dresden, Germany, Feb. 6-10, 2012 Source: Nokia Siemens Networks, Nokia Corporation Title: Timing Reference for sTAG.
3GPP TSG-RAN WG2 Meeting #77 R2-120087 Dresden, Germany, Feb. 6-10, 2012 Source: NSN Title: [Draft] LS on timing reference for sTAG.
3GPP TSG-RAN WG2 Meeting #77 R2-120088 Dresden, Germany, Feb. 6-10, 2012 Source: Nokia Siemens Networks, Nokia Corporation Title: Pathloss Reference for sTAG.
3GPP TSG-RAN WG2 Meeting #77 R2-120127 Dresden, Germany, Feb. 6-10, 2012 Source: Renesas Mobile Europe Title: Further analysis on timing reference for sTAG.
3GPP TSG-RAN WG2 Meeting#77 Tdoc R2-120166 Feb. 6-10, 2012, Dresden, Germany Source: ITRI Title: Deactivation of DL Timing Reference in sTAG.
3GPP TSG RAN WG2 #77 R2-120168 Dresden, Germany, Feb. 6-10, 2012 Source: ITRI Title: Consideration on FFS of pathloss reference configuration.
3GPP TSG-RAN2 #77 meeting Tdoc R2-120221 Dresden, Germany, Feb. 6-10, 2012 Souce: MediaTek Title: Discussion on timing reference in sTAG.
3GPP TSG RAN WG2 Meeting #77 R2-120252 Dresden, Germany, Feb. 6-10, 2012 Source: CATT Title: Timing Reference Change.
3GPP TSG-RAN WG2 #77 R2-120264 Feb. 6-10, 2012, Dresden, Germany Source: Intel Corporation Title: Remaining open issues on timing and pathloss reference for sTAG.
TSG-RAN WG2#77 R2-120604 Dresden, Germany, Feb. 6-10, 2012 Title: Pathloss reference for SCell TA group and need of RLM Source: Alcatel-Lucent, Alcatel-Lucent Shanghai Bell.
TSG-RAN WG2#77 R2-120605 Feb. 6-10, 2012, Dresden, Germany Title: Timing reference for SCell TA group Source: Alcatel-Lucent, Alcatel-Lucent Shanghai Bell.
3GPP TSG RAN WG2 Meeting #77 R2-120799 Dresden, Germany, Feb. 6-10, 2012 Source: CATT Title: Timing Reference Change.
3GPP TSG-RAN WG2 #77 R2-120821 Feb. 6-10, 2012, Dresden, Germany Source: Intel Corporation Title: Remaining Dpen issues on timing and pathloss reference for sTAG.
3GPP TSG-RAN WG2 meeting #77bis R2-121178 Jeju, South Korea, Mar. 26-30, 2012 Source: Qualcomm Incorporated Title: Timing reference cell for secondary TA group.
3GPP TSG-RAN WG2 Meeting #77bis R2-121182 Jeju, South Korea, Mar. 26-30, 2012 (Resubmission of R2-120088) Source: Nokia Siemens Networks, Nokia Corporation Title: Pathloss Reference for sTAG.
3GPP TSG RAN WG2 Meeting #77bis R2-121192 Jeju, Korea, Mar. 26-30, 2012 Source: New Postcom Title: Path loss reference and RLM on SCell.
3GPP TSG-RAN WG2 Meeting #77bis R2-121230 Mar. 26-30, 2012, Jeju, Korea (update of R2-120247) Source: Panasonic Title: Handling loss of Timing/Pathloss Reference Cell.
3GPP TSG-RAN WG2 Meeting #77Bis R2-121241 Jeju Island, Korea, Mar. 26-30, 2012 Source: ZTE Corporation Title: Pathloss and RLM for MTA.
3GPP TSG RAN WG2 Meeting #77bis R2-121307 Jeju, South Korea, Mar. 26-30, 2012 Source: Pantech Title: Deactivation of Timing Reference Cell.
3GPP TSG-RAN2 #77bis Meeting R2-121338 Jeju, Korea, Mar. 26-30, 2012 Source: MediaTek Inc. Title: Error case for timing reference.
3GPP TSG-RAN WG2 Meeting #77bis R2-121366 Jeju, South Korea, Mar. 26-30, 2012 Source : LG Electronics Inc. Title: Handling of the Timing Reference SCell Deactivation.
3GPP TSG RAN WG2#77bis R2-121398 Jeju Island, Korea, Mar. 26-30, 2012 Souce: Samsung Title: Whether to allow configurable pathloss reference in STAG?.
3GPP TSG-RAN WG2 Meeting #77bis R2-121403 Jeju, Korea, Mar. 26-30, 2012 Source: Renesas Mobile Europe Title: Discussion on error case handling of the timing reference of sTAG.
3GPP TSG-RAN WG2 Meeting #77bis R2-121428 Jeju, Korea, Mar. 26-30, 2012 Source: Huawei, HiSilicon Title: Path loss reference for STAG.
3GPP TSG RAN WG2 Meeting #77bis R2-121493 Jeju, South Korea, Mar. 26-30, 2012 Source: New Postcom Title: Considerations on Downlink Timing reference in sTAG.
3GPP TSG RAN WG2 #77 bis R2-121528 Jeju, Korea, Mar. 26-30, 2012 revised from R2-120168 Source: ITRI Title: Pathloss reference configuration.
3GPP TSG-RAN WG2 Meeting#77bis Tdoc R2-121530 Mar. 26-30, 2012, Jeju, Korea Source: ITRI Title: Deactivation of Timing Reference SCell in sTAG.

(56) References Cited

OTHER PUBLICATIONS

3GPP TSG-RAN WG2 #77bis Tdoc R2-121557 Jeju, Korea, Mar. 26-30, 2012 Source: Ericsson Title: Summary of e-mail discussion [77#26] LTE: CA: Timing reference for SCell-only TA groups.
3GPP TSG-RAN WG2 #77bis Tdoc R2-121559 Jeju, South Korea, Mar. 26-30, 2012 Source: Ericsson, ST Ericsson Title: Timing reference for SCells.
TSG-RAN WG2#77bis R2-121690 Mar. 26-30, 2012 Jeju, Korea Title: Timing reference for SCell TA group Source: Alcatel-Lucent, Alcatel-Lucent Shanghai Bell.
3GPP TSG-RAN WG2 Meeting #77bis R2-121713 Jeju, Korea, Mar. 26-30, 2012 Source: Potevio Title: Considerations on timing reference change for sTAG.
3GPP TSG RAN WG2 #77bis R2-121724 Jeju, Korea, Mar. 26-30, 2012 Source: Intel Corporation Title: Remaining Issues on timing reference for sTAG.
3GPP TSG RAN WG2 Meeting #77 R2-120732 Dresden, Germany, Feb. 6-10, 2012 Source: Fujitsu Title: Discussion on PHR for SCell in Rel-11.
3GPP TSG-RAN WG2 #77, R2-120218 Dresden, Germany, Feb. 6-10, 2012 Source: Sharp Title: TA group handling.
3GPP TSG RAN WG2 #69bis R2-102395 Beijing, China, Apr. 12-16, 2010 Source: Qualcomm Incorporated Title: UL and DL Component Carrier Linking.
3GPP TSG-RAN WG2 Meeting #75B R2-114966 Zhuhai, China, Oct. 10-14, 2011 Source: Potevio Title: Consideration on contention based random access.
3GPP TSG-RAN WG2 Meeting #75bis R2-114968 Oct. 10-14, 2011, Zhuhai, China Source: Panasonic Title: Message 2 reception in RA procedure for SCell.
3GPP TSG RAN WG2 #75bis R2-114977 Oct. 10-14, 2011, Zhuhai, China Source: Potevio Title: UE Behaviour on Multi-RA Procedures.
3GPP TSG-RAN WG2 Meeting #75bis R2-115042 Zhuhai China, Oct. 10-14, 2011 Source: Fujitsu Title: Remaining Issues on SCell RA procedure.
3GPP TSG-RAN WG2 Meeting #75bis R2-115147 Zhuhai, China, Oct. 10-14, 2011 Source: Renesas Mobile Europe Ltd. Title: Open issues for RACH procedure.
3GPP TSG-RAN WG2 #75bis Tdoc R2-115156 Zhuhai, China, Oct. 10-14, 2011 Title: Random Access Response in multiple TA Source: Research in Motion, UK Limited.
3GPP TSG-RAN WG2#75bis R2-115174 Zhuhai, China, Oct. 10-14, 2011 Source: Sharp Title: A special SCell for CA enhancement.
3GPP TSG-RAN2#75bis R2-115302 Oct. 10-14, 2011, Zhuhai, China Source: New Postcom Title: Open issues of RACH on SCell.
TSG-RAN WG2#75bis R2-115338 Oct. 10-14, 2011, Zhuhai, China Title: Rach on SCell Source: Alcatel-Lucent, Alcatel-Lucent Shanghai Bell.
3GPP TSG-RAN2 Meeting #75bis R2-115399 Oct. 10-14, 2011, Zhuhai, Chian Source: LG Electronics Inc. Title: RACH applicability and TA group.
3GPP TSG-RAN WG2 #75bis Tdoc R2-115409 Zhuhai, China, Oct. 10-14, 2011 Source: InterDigital Communications. Title: Prioritization between RACH Procedures in LTE CA.
3GPP, "TS 36.213 v10.3.0", Sep. 2011.
3GPP TSG-RAN WG2 #77 R2-120229, Dresden, Germany, Feb. 6-10, 2012, Source: Acer Incorporated, Title: Changing of DL Timing Reference.
3GPP TSG RAN WG2 Meeting #77bis R2-121309, Jeju, South Korea, Mar. 26-30, 2012, Source: Pantech, Title: RAR MAC CE with C-RNTI.
3GPP TSG-RAN WG2 Meeting #77bis R2-121368, Jeju, Korea, Mar. 26-30, 2012, Source: LG Electronics Inc., Title: Performing RA procedure on cell other than the timing reference cell.
3GPP TSG-RAN WG2#77bis meeting R2-121712, Jeju, Korea, Mar. 26-30, 2012, Source: Samsung, Title: Timing reference for sTAG.

3GPP TSG RAN WG2 Meeting #77bis R2-121190 Jeju Island, Korea, Mar. 26-30, 2012 Source: New Postcom Title: Considerations on TAG change procedure.
3GPP TSG RAN WG2 Meeting #75-bis R2-115449 Zhuhai, China, Oct. 10-14, 2011 Source: NTT Docomo, Inc. (Email discussion rapporteur) Title: Summary of email discussion [75#33]—LTE: Carrier Aggregation scenarios and resulting requirements.
3GPP TSG-RAN WG2 #75bis Tdoc R2-115463 Zhuhai, China, Oct. 10-14, 2011 Source: Ericsson, ST Ericsson Title: SCell Random Access Prioritization.
3GPP TSG-RAN WG2 #76 Tdoc R2-115743 San Francisco, United States, Nov. 14-18, 2011 Source: Ericsson, ST Ericsson Title: Random Access Response on an SCell.
3GPP TSG-RAN WG2 Meeting #76 R2-115754 San Francisco, United States, Nov. 14-18, 2011 Source: ZTE Title: MSG2 Position for MTA RA.
3GPP TSG-RAN WG2 Meeting #76 R2-115890 Nov. 14-18, 2011, San Francisco, USA Source: HT mMobile Inc. Title: Initiating RA procedure on SCell.
3GPP TSG-RAN WG2 #76 Tdoc R2-116111 San Francisco, USA, Nov. 14-18, 2011 Source: InterDigital Communications Title: MSG1 Transmission for RACH Procedure for SCells.
3GPP TSG-RAN2 Meeting #76 R2-116225 Nov. 14-18, 2011, San Francisco, USA Source: LG Electronics Inc. Title: SCell RACH trigger.
3GPP TSG-RAN2 Meeting #76 R2-116228 Nov. 14-18, 2011, San Francisco, USA Source: LG Electronics Inc. Title: RACH applicability and TA group.
3GPP TSG-RAN WG2 Meeting #76 R2-16309 San Francisco, USA, Nov. 14-18, 2011 Source: Fujitsu Title: Trigger of RA procedure on SCell(s).
3GPP TSG-WG2 Meeting #76 R2-116503 San Francisco, USA, Nov. 14-18, 2011 Updates of Carrier Aggregation agreements (WI R2-111115) Rapporteur (Nokia Corporation).
3GPP TSG-RAN WG2 Meeting #73bis R2-111880 Shanghai, China, Apr. 11-15, 2011 Title: Corrections to CA related IE descriptions Source to WG: Potevio.
3GPP TSG-RAN WG2 #74 Tdoc R2-113255 Barcelona, Spain, May 9-13, 2011 Source: InterDigital Communications Title: Support for multiple Timing Advance in LTE CA.
3GPP TSG-RAN WG1 Meeting #65 R1-111577 Barcelona, Spain, May 9-13, 2011 Source: Panasonic Title: Simultaneous SRS transmission on multiple component carriers.
3GPP TSG-RAN1 Meeting #65 R1-111893 Barcelona, Spain, May 8-13, 2011 Title: Correction to simultaneous transmission of SRS and PUCCH format 2/2a/2b Source: ZTE, Qualcomm Inc.
3GPP TSG-RAN2 Meeting #77bis, R2-121899, Jeju, Korea, Mar. 26-30, 2012 Change Request 36.300.
3GPP TSG-RAN WG1 Meeting #68 R1-120712 Dresden, Germany, Feb. 6-10, 2012 Source: Nokia Siemens Networks, Nokia Title: On Multiple Timing Advance in RAN1.
3GPP TSG RAN WG2 Meeting #76 R2-115738 San Francisco, USA, Nov. 14-18, 2011 Source: New Postcom Title: Considerations on TA group (re)configuration.
3GPP TSG-RAN WG2 Meeting #76 R2-115756 Nov. 4-18, 2011, San Francisco, USA Source: ZTE Title: TA Group management.
3GPP TSG-RAN WG2 Meeting #76 R2-115805 San Francisco, USA, Nov. 14-18, 2011 Source: Nokia Siemens Networks, Nokia Corporation Title: TA group signalling.
3GPP TSG-RAN WG2 Meeting #76 R2-115827 San Francisco, USA, Nov. 14-18, 2011 Source: Fluawei, HiSilicon Title: Signalling for the TA Group Management.
3GPP TSG-RAN2#76 meeting Tdoc R2-116340 San Francisco. USA, Nov. 14-18, 2011, Source: HTC Title: TA group configuration and reconfiguration.
3GPP TSG RAN WG2 Meeting #77 R2-120266 Feb. 6-10, 2012, Dresden, Germany Source: Intel Corporation Title: CA Signaling Enhancements for HetNet Type Deployments.
3GPP TSG RAN WG2 Meeting #77 R2-120731 Dresden, Germany, Feb. 6-10, 2012 Source: Fujitsu Title: Further consideration on the TAG change procedure.

(56) References Cited

OTHER PUBLICATIONS

3GPP TSG-RAN2 Meeting #77bis R2-121233 Jeju, Korea, Mar. 26-30, 2012 Source: Panasonic Title: TAG Composition and related aspects.

3GPP TSG RAN WG2 Meeting #77bis R2-121798 Jeju, Korea, Mar. 26-30, 2012 Source: Fujitsu Title: Further consideration on the TAG change procedure.

3GPP TSG RAN WG2 Meeting #78 R2-122173 Prague, Czech Republic, May 21-25, 2012 Source: CATT Title: Detail on TAG Configuration.

3GPP TSG-RAN2#78 meeting Tdoc R2-122240 May 21-25, 2012, Prague, Czech Republic Source: ZTE Corporation Title: UE capability report for MTA.

3GPP TSG RAN WG2 Meeting #78 R2-122264 Prague, Czech Republic, May 21-25, 2012 Source: New Postcom Title: Remaining issued of TAG configuration.

3GPP TSG RAN WG2 Meeting #78 R2-122267 Prague, Czech Republic, May 21-25, 2012 Source: New Postcom Title: Considerations on remaining issues of TAG change.

3GPP TSG-RAN WG2 Meeting #78 R2-122313 Prague, Czech Republic, May 21-25, 2012 Source: Huawei, HiSilicon Title: TAG change procedure for the SCell.

3GPP TSG-RAN WG2 Meeting #78 R2-122385 Prague, Czech Republic, May 21-25, 2012 Source: LG Electronics Inc. Title: TAG Re-association Procedure in CA.

3GPP TSG-RAN2#78 R2-122386 Prague, Czech Republic, May 21-25, 2012 Source: NTT Docomo, Inc. Title: SCell status at TAG change.

3GPP TSG-RAN WG2#78 R2-122454 Prague, Czech Republic, May 21-25, 2012 Source: Sharp Title: Remaining Issues of TA group handling.

TSG-RAN WG2#78 R2-1212738 Prague, Czech Republic, May 21-25, 2012 Title: TAG related signalling Source: Alcatel-Lucent, Alcatel-Lucent Shanghai Bell.

3GPP TSG RAN WG2 Meeting #78 R2-122852 Prague, Czech Republic, May 21-25, 2012 Source: Fujitsu Title: On the TAG change procedure.

3GPP TSG RAN WG2 Meeting #78 R2-122908 Prague, Czech, May 21-25, 2012 Source: Pantech Title: Considerations on Multiple TA capability.

3GPP TSG-RAN2 Meeting #78 R2-123022 Prague, Czech Republic, May 21-25, 2012 Change Request: 36300 CR 438 rev 1 Cun-ent version: 11.1.0 Title: Introduction of Carrier aggregation enhancements Source to WG: Rapporteur (Nokia Corporation). cited byapplicant.

3GPP TS 36212 V10.0.0 (Dec. 2010), 3rd Generation Partnership Project; Technical Specification Group Radio Access Network; Evolved Universal Radio Access (E-UTRA); Multiplexing and channel coding (Release 10).

3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TSG-RAN WG2 Meeting #74 R2-112806 May 9-13, 2011, Barcelona, Spain Source: Panasonic Title: RACH on SCell for supporting Multiple Timing Advance.

3GPP TSG-RAN WG2 Meeting #74 R2-112815 Barcelona, Spain, May 9-13, 2011 Source: CATT Title: RA Procedure for Multi-TA.

3GPP TSG-RAN WG2 Meeting #74 R2-112876 Barcelona, Spain, May 9-13, 2011 Source: ZTE Title: Group Model in Multiple TA.

3GPP TSG RAN WG2 #74 R2-112878 Barcelona, Spain, May 9-13, 2011 Source: ZTE Title: Potential PHY Impact of RACH on SCell for MTA.

3GPP TSG RAN WG2 Meeting #74 R2-112925 Barcelona, Spain, May 9-13, 2011 Source: New Postcom Title: Analysis of PCell change on single and multiple TA scenarios.

3GPP TSG-RAN WG2#74 R2-113050 Barcelona, Spain, May 9-13, 2011 Source: Sharp Title: Considerations for RACH initiation on SCell.

3GPP TSG-RAN WG2 meeting #74 R2-113063 Barcelona, Spain, May 9-13, 2011 'Source: Qualcomm Incorporated Title: Consideration on multiple TA.

3GPP TSG-RAN WG2 Meeting #74 R2-113067 Barcelona, Spain, May 9-13, 2011 Source: Potevio Title: Random Access on SCell for Supporting Multi-TA.

3GPP TSG-RAN2 #73bis meeting Tdoc R2-113101 Barcelona, Spain, May 9-13, 2011 Souce: MediaTek Title: Grouping of multi-TA.

3GPP TSG-RAN2#74 meeting R2-113124 Barcelona, Spain, May 9-13, 2011 Souce: Samsung Title: Further discussions of Issues with Multiple-TA.

3GPP TSG RAN WG2 #74 R2-113192 Barcelona, Spain, May 9-13, 2011 Source: ITRI Title: Considerations on Random Access on SCell.

3GPP TSG RAN2#74 meeting R2-113215 Barcelona, Spain, May 9-13, 2011 Source: Intel Corporation Title: Configuration of multiple TA in Rel-11 CA.

TSG-RAN WG2#74 R2-113235 May 9-13, 2011, Barcelona, Spain Title: Initiating timing alignment for SCell in multiple TA Source: Alcatel-Lucent, Alcatel-Lucent Shanghai Bell.

3GPP TSG-RAN WG2#74 R2-113241 May 9-13, 2011, Barcelona, Spain Source: Motorola Mobility Title: Considerations for Supporting Multiple Timing Advances.

3GPP TSG-RAN WG1 #68 R1-120075 Dresden, Germany, Feb. 6-10, 2012 Source: Ericsson, ST-Ericsson Title: Power scaling due to multiple TA values. cited byapplicant.

3GPP TSG RAN WG1 Meeting #68 R1-120093 Dresden, Germany, Feb. 6-10, 2012 Source: CATT Title: UL power control with multiple timing advances in Rel-11.

3GPP TSG RAN WG1 Meeting #68 R1-120123 Dresden, Germany, Feb. 6-10, 2012 Source: Huawei, HiSilicon Title: Discussion on UL control signalling transmission with multiple TAs.

3GPP TSG-RAN WG1 Meeting #68 R1-120130 Dresden, Germany, Feb. 6-10, 2012 Source: InterDigital Communications, LLC Title: Simultaneous UL transmissions in presence of R11 Multiple TA.

3GPP TSG-RAN WG1 Meeting #68 R1-120221 Dresden, Germany, Feb. 6-10, 2012 Source: Panasonic Title: Simultaneous transmissions in multiple TA.

3GPP TSG RAN WG1 Meeting #68 R1-120286 Dresden, Germany, Feb. 6-10, 2012 Source: ZTE Title: Consideration on issues related to multiple TA.

3GPP TSG RAN WG1 Meeting #68 R1-120317 Dresden, Germany, Feb. 6-10, 2012 Source: Pantech Title: Issues on parallel transmission in multiple TA environments.

3GPP TSG RAN WG1 #68 R1-110424 Dresden, Germany, Feb. 6-10, 2012 Source: LG Electronics Title: Simultaneous transmissions in multiple TA groups.

3GPP TSG RAN WG1 #68 R1-120462 Dresden, Germany, Feb. 6-10, 2012 Source: Texas Instruments Title: Physical layer aspects of multiple timing advance commands.

3GPP TSG RAN WG1 Meeting #68 R1-120486 Dresden, Germany, Feb. 6-10, 2012 Source: Alcatel-Lucent, Alcatel-Lucent Shanghai Bell Title: Power scaling for simultaneous transmissions of multiple UL channels with multiple TA groups.

3GPP TSG RAN WG1 #68 R1-120539 Feb. 6-10, 2012, Dresden, Germany Source: Qualcomm Incorporated Title: SRS operation in multiple TA offset CA.

3GPP TSG RAN WG1 #68 R1-120540 Feb. 6-10, 2012, Dresden, Germany Source: Qualcomm Incorporated Title: Power control aspects of multiple TA operation.

3GPP TSG RAN WG1 Meeting #68 R1-120915 Dresden, Germany, Feb. 6-10, 2012 Title: [Draft] LS on simultaneous transmission of PUSCH/PUCCH/SRS for multiple TA Source: Panasonic [TSG RAN WG1].

3GPP TSG RAN WG1 #68 R1-120918 Dresden, Germany, Feb. 6-10, 2012 Proposal on PUSCH/PUCCH transmission with multiple TA LG Electronics, Panasonic, Ericsson, ST-Ercisson, Pantech, Texas Instruments.

3GPP TSG RAN WG1 #68 R1-120919 Dresden, Germany, Feb. 6-10, 2012 proposal on SRS transmission with multiple TA LG Electronics, ZTE, Pantech, CATT.

(56) References Cited

OTHER PUBLICATIONS

3GPP TSG RAN WG1 Meeting #68 R1-120946 Dresden, Germany, Feb. 6-10, 2012 Title: LS on simultaneous transmission of PUSCH/PUCCH/SRS for multiple TA Source: TSG RAN WG1.
Adaptive Video Coding for Mobile Wireless Networks by Benjamin Belzer, Judy Liao, John D. Villasenor, IEEE Compt. Soc. Press (1994).
3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).
3GPP TSG RAN WG1 Meeting #68bis R1-121142 Jeju, Korea, Mar. 26-30, 2012 Source: Panasonic Title: SCell PRACH transmission timing.
3GPP TSG-RAN2 #73bis meeting Tdoc R2-113102 Barcelona, Spain, May 9-13, 2011 Souce: MediaTek Title: Transmission of SCell RACH.
3GPP TSG-RAN WG2 Meeting #77bis R2-121130 Jeju, South Korea, Mar. 26-30, 2012 Agenda item: 7.1.2.3 Source: Qualcomm Incorporated Title: UE indication of UL timing loss for secondary TA group.
3GPP TSG RAN WG2 Meeting #77bis R2-121139 Jeju, Korea, Mar. 26-30, 2012 Source: CATT Title: RACH Configuration in sTAG.
3GPP TSG-RAN WG2 Meeting #77bis R2-121181 Jeju, South Korea, Mar. 26-30, 2012 (Resubmission of R2-120089) Source: Nokia Siemens Networks, Nokia Corporation Title: RLM on SCells.
3GPP TSG RAN WG2 Meeting #77bis R2-121189 Jeju, Korea, Mar. 26-30, 2012 Source: New Postcom Title: Considerations on RACH failure handling on SCell.
3GPP TSG-RAN2#77bis R2-121193 Jeju, South Korea, Mar. 26-30, 2012 Source: NTT DOCOMO, Inc. Title: Radio link monitoring for SCell in Rel-11.
3GPP TS 36.321 V11.0.0 (Sep. 2012), 3rd Generation Partnership Project; Technical Specification Group Radio Access Network; Evolved Universal Terrestrial Radio Access (E-UTRA); Medium Access Control (MAC) protocol specification (Release 11).
3GPP TSG-RAN WG2 Meeting #77bis R2-121232 Mar. 26-30, 2012, Jeju, Korea resubmission of R2-120246 Source: Panasonic Title: Issues on exceeding maximum timing difference of aggregated cells.
3GPP TS 36.321 V10.4.0 (Dec. 2011), 3rd Generation Partnership Project; Technical Specification Group Radio Access Network; Evolved Universal Terrestrial Radio Access (E-UTRA); Medium Access Control (MAC) protocol specification (Release 10).
3GPP TSG-RAN WG2 #77bis Tdoc R2-121278 Jeju, South Korea, Mar. 26-30, 2012 Title: Random Access Response in multiple TA Source: Research in Motion, UK Limited.
3GPP TSG-RAN2 #77bis Meeting Tdoc R2-121347 Jeju, Korea, Mar. 26-30, 2012 Source: MediaTek Inc. Title: Discussions on SCell RA procedure when reaching PREAMBLE_TRAN_MAX.
3GPP TSG-RAN2 Meeting #77bis R2-121377 Mar. 26-30, 2012, Jeju, Korea Source: LG Electronics Inc. Title: Handling of SCell RACH Problem.
3GPP TSG-RAN WG2#77bis R2-121384 Jeju, Korea, Mar. 26-30, 2012 Source: Sharp Title: Remaining Issues of TA group handling.
3GPP TSG RAN WG2#77bis R2-121404 Jeju Island, Korea, Mar. 26-30, 2012 Source: Samsung Title: Remaining Issue on random access failure for SCell.
3GPP Tsg-Ran WG2 #77b R2-121409 Jeju, Korea, Mar. 26-30 2012 Source: Acer Incorporated Title: Analysis of RA failure Handling.
3GPP TSG RAN WG2 #77 bis R2-121529 Jeju, Korea, Mar. 26-30, 2012 Source: ITRI Title: Discussion on whether to stop RA procedure when RA failure occurs.
3GPP TSG-RAN WG2 Meeting #77bis R2-121711 Jeju, Korea, Mar. 26-30, 2012 Source: Potevio Title: Random Access Failures Handling on SCells.
3GPP TSG RAN WG2 #77bis R2-121721 Mar. 26-30, 2012, Jeju, Korea Source: Intel Corporation Title: Further discussion on the open issues of RACH on SCell.
3GPP TSG-RAN WG2 Meeting #77bis R2-121799 Jeju, Korea, Mar. 26-30, 2012 Source: Fujitsu Title: Reaching PREAMBLE_TRANS_MAX.
3GPP TSG-RAN2 Meeting #77bis R2-121869 Jeju, Korea, Mar. 26-30, 2012 Source: Ericsson Title: Introduction of CA Enhancements in MAC.
3GPP TSG RAN WG2 Meeting #78, R2-123022 Prague, Czech Republic, May 25, 2011, Title: Introduction of Carrier Aggregation enhancements.
U.S. Appl. No. 14/599,493, Uplink Transmissions in a Wireless Device, filed Jan. 17, 2015.
U.S. Appl. No. 14/599,494, Wireless Device Connection to an Application Server, Jan. 17, 2015.
U.S. Appl. No. 14/616,774, Cell Timing in a Wireless Device and Base Station, Feb. 9, 2015.
U.S. Appl. No. 14/622,969, Transmit Power Control in Multicarrier Communications, filed Feb. 16, 2015.
U.S. Appl. No. 14/797,082, Automobile Communication Device, filed Jul. 11, 2015.
U.S. Appl. No. 14/822,628, Carrier Grouping in Multicarrier Communications, filed Aug. 10, 2015.
U.S. Appl. No. 14/824,132, Handover Signaling in a Wireless Network, filed Aug. 12, 2015.
U.S. Appl. No. 14/877,961, Primary and Secondary Cell Group Configuration, filed Oct. 8, 2015.
U.S. Appl. No. 14/929,410, Multicarrier Signal Transmission in Wireless Communications, filed Nov. 1, 2015.
U.S. Appl. No. 14/929,411, Carrier Configuration in Wireless Networks, filed Nov. 2, 2015.
U.S. Appl. No. 14/953,774, Configuration of Multiple Timing Advance Groups in Wireless Communication Devices, filed Nov. 30, 2015.
U.S. Appl. No. 14/959,309, Wireless Device Preamble Transmission Timing, filed Dec. 4, 2015.
U.S. Appl. No. 14/960,389, Multicarrier Communications Employing Time Alignment Timers, filed Dec. 6, 2015.
U.S. Appl. No. 14/966,267, Wireless Device Timing Advance Configuration, filed Dec. 11, 2015.
U.S. Appl. No. 14/966,309, Managing Sounding References Signals in a Wireless Device, filed Dec. 11, 2015.
U.S. Appl. No. 14/966,439, Signal Transmission Power Adjustment in a Wireless Device, filed Dec. 11, 2015.
U.S. Appl. No. 14/969,682, Wireless Multicarrier Random Access Process, filed Dec. 15, 2015.
U.S. Appl. No. 14/929,398, Transmit Power Control in Multicarrier Communications, Nov. 11, 2015.
U.S. Appl. No. 15/201,527, Random Access Mechanism for a Wireless Device and Base Station, Jul. 4, 2016.
U.S. Appl. No. 15/201,528, Wireless Device Handover Signaling, filed Jul. 4, 2016.
U.S. Appl. No. 15/201,529, Sounding Reference Signal Transmission in a Wireless Network, filed Jul. 4, 2016.
U.S. Appl. No. 15/201,544, Carrier grouping in Multicarrier Communications, filed Jul. 4, 2016.
U.S. Appl. No. 15/201,558, Signal Power Management in a Multicarrier Wireless Device, filed Jul. 4, 2016.
U.S. Appl. No. 15/201,560, Signal Transmission Power Adjustment in a Wireless Device, filed Jul. 4, 2016.
U.S. Appl. No. 15/201,568, Configuration of Cell Groups in Wireless Communication Devices, filed Jul. 4, 2016.
European Final Rejection—EP Appl. 13702187.9—dated Nov. 28, 2016.
"MAC Downlink Signallink for Multiple TA"; Nokia Siemens Network et al: 3GPP Draft; R2-115747 Downlink Signalling for Multiple TA, 3rd Generation Partnership Project (3GPP), Mobile Competence Centre; 650, Route Des Lucioles; F-06921 Sophia-Antipolis Cedex; France, vol. Ran WG2, No. San Francisco, USA; 20111114—20111118, Nov. 7, 2011 (Nov. 7, 2011), XP050564143.

* cited by examiner

| Transmission | Condition |
|---|---|
| May not Transmit SRS | SRS and PUSCH transmissions happen to coincide in the same symbol |
| May not Transmit type 0 SRS | SRS and PUCCH format 2/2a/2b transmissions happen to coincide in the same subframe |
| May not Transmit type 1 SRS | SRS and PUCCH format 2a/2b happen to coincide in the same subframe |
| May not Transmit type 1 SRS | SRS and PUCCH format 2 with HARQ-ACK transmissions happen to coincide in the same subframe |
| May not Transmit PUCCH format 2 without HARQ-ACK | type 1 triggered SRS and PUCCH format 2 without HARQ-ACK transmissions happen to coincide in the same subframe |
| May not Transmit SRS | SRS and PUCCH transmission carrying HARQ-ACK and/or positive SR happen to coincide in the same subframe if the parameter *ackNackSRS-SimultaneousTransmission* is *FALSE* |
| May not Transmit SRS | SRS on any serving cells and PUCCH transmission carrying HARQ-ACK and/or positive SR using normal PUCCH format happen to coincide in the same subframe. |
| May not Transmit SRS | SRS and a PUSCH transmission corresponding to a Random Access Response Grant or a retransmission of the same transport block as part of the contention based random access procedure coincide in the same subframe. |
| May Transmit SRS | SRS and PUCCH transmission carrying HARQ-ACK and/or positive SR using shortened format happen to coincide in the same subframe if the parameter *ackNackSRS-SimultaneousTransmission* is *TRUE* |

FIG. 11

MANAGING SOUNDING SIGNALS TO LIMIT POWER IN A MULTICARRIER WIRELESS DEVICE

CROSS-REFERENCE TO RELATED APPLICATIONS

This application is a continuation of application Ser. No. 14/953,827, filed Nov. 30, 2015, which is a continuation of application Ser. No. 14/599,490, filed Jan. 17, 2015, which is a continuation of application Ser. No. 13/862,423, filed Apr. 14, 2013, which claims the benefit of U.S. Provisional Application No. 61/635,957, filed Apr. 20, 2012, and U.S. Provisional Application No. 61/654,900, filed Jun. 3, 2012, which are hereby incorporated by reference in its entirety.

BRIEF DESCRIPTION OF THE SEVERAL VIEWS OF THE DRAWINGS

Examples of several of the various embodiments of the present invention are described herein with reference to the drawings, in which:

FIG. 11 shows example transmission scenarios in a wireless network;

DETAILED DESCRIPTION OF EMBODIMENTS

Example embodiments of the present invention enable operation of multiple timing advance groups. Embodiments of the technology disclosed herein may be employed in the technical field of multicarrier communication systems. More particularly, the embodiments of the technology disclosed herein may relate to operation of multiple timing advance groups.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
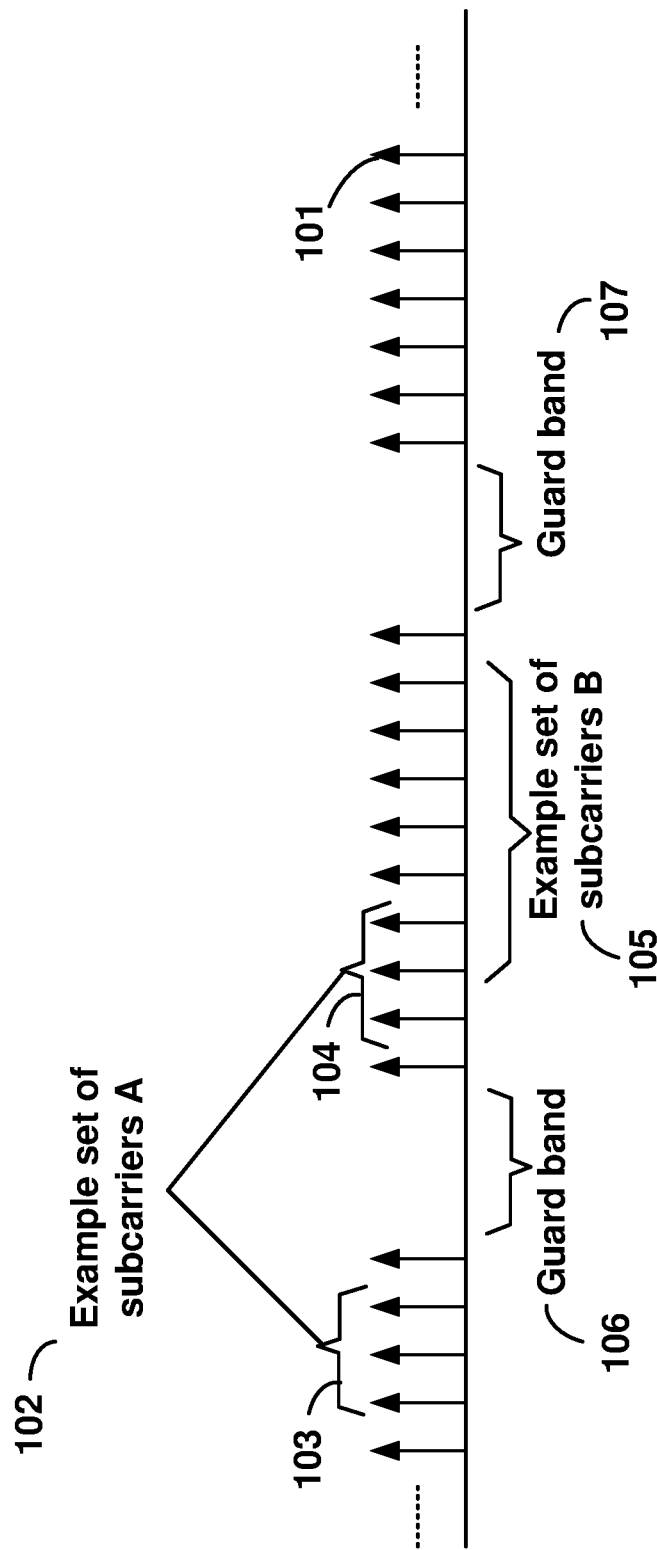
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
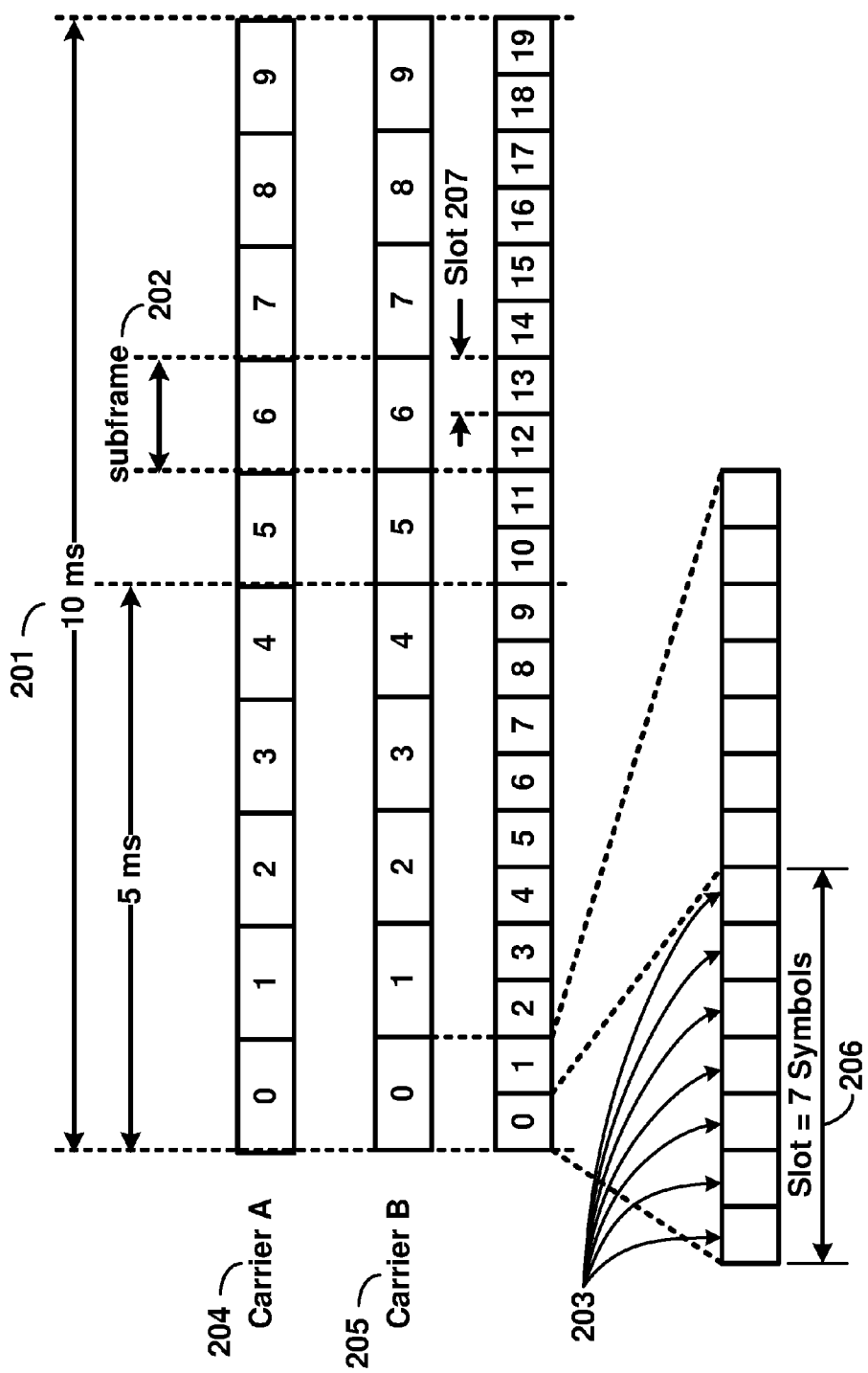
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
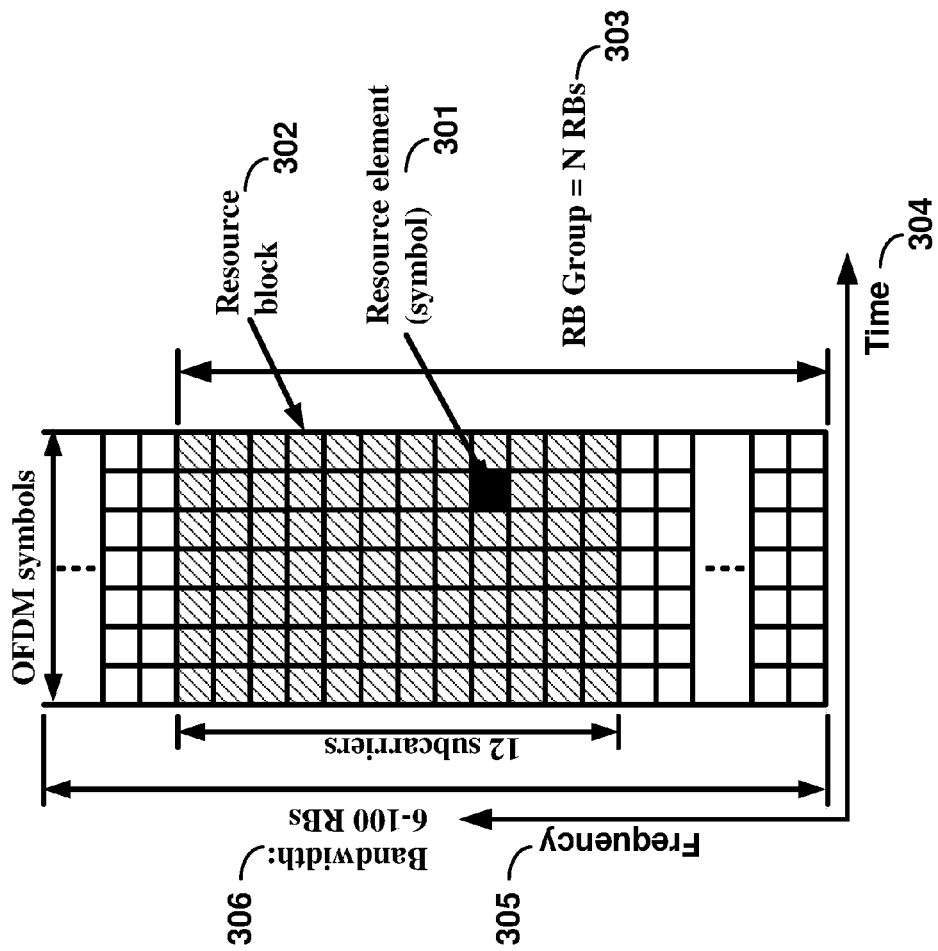
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

Figure 4:
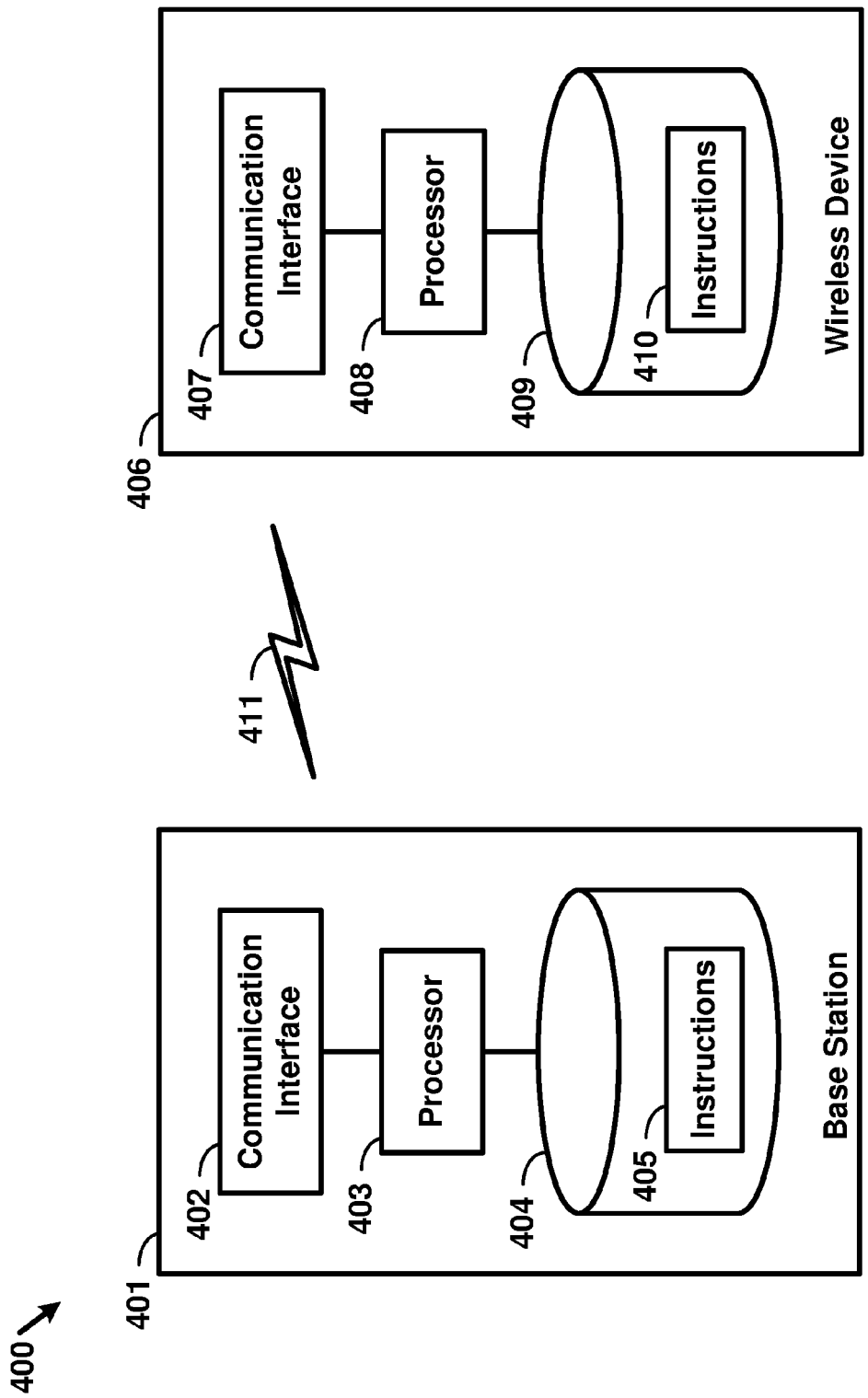
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum)

mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enable operation of multiple timing advance groups. Other example embodiments may comprise a non-transitory tangible computer readable media comprising instructions executable by one or more processors to cause operation of multiple timing advance groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multiple timing advance groups. The device may include processors, memory, interfaces, and/or the like. Other example embodiments may comprise communication networks comprising devices such as base stations, wireless devices (or user equipment: UE), servers, switches, antennas, and/or the like.

According to some of the various aspects of embodiments, serving cells having an uplink to which the same time alignment (TA) applies may be grouped in a TA group (TAG). Serving cells in one TAG may use the same timing reference. For a given TAG, a user equipment (UE) may use one downlink carrier as the timing reference at a given time. The UE may use a downlink carrier in a TAG as the timing reference for that TAG. For a given TAG, a UE may synchronize uplink subframe and frame transmission timing of the uplink carriers belonging to the same TAG. According to some of the various aspects of embodiments, serving cells having an uplink to which the same TA applies may correspond to the serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference.

Figure 5:
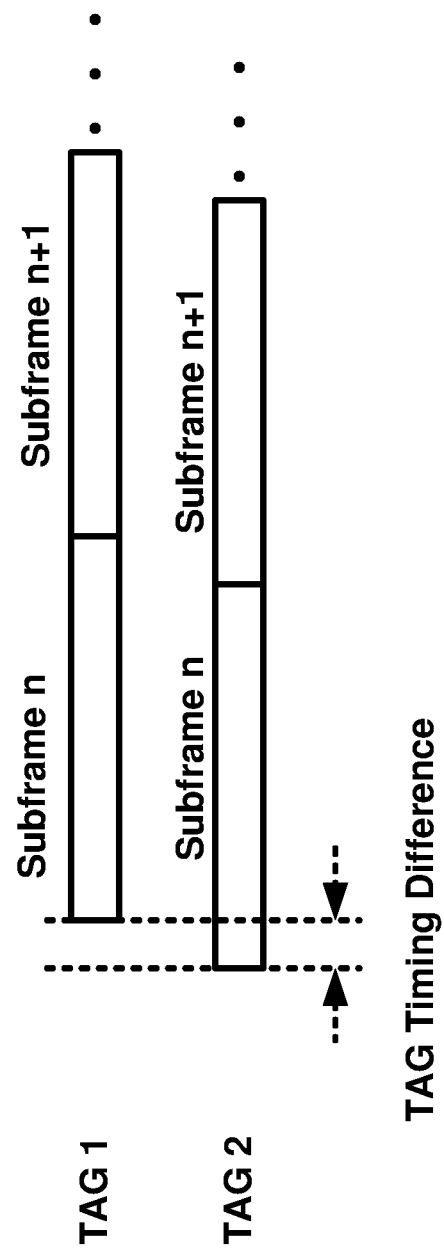
FIG. 5 is a diagram depicting uplink transmission timing of one or more cells in a first timing advance group (TAG) and a second TAG as per an aspect of an embodiment of the present invention.

FIG. 5 is a diagram depicting uplink transmission timing of one or more cells in a first timing advance group (TAG1) and a second TAG (TAG2) as per an aspect of an embodiment of the present invention. TAG1 may include one or more cells, TAG2 may also include one or more cells. TAG timing difference in FIG. 5 may be the difference in UE uplink transmission timing for uplink carriers in TAG1 and TAG2. The timing difference may range between, for example, sub micro-seconds to about 30 micro-seconds.

Figure 7:
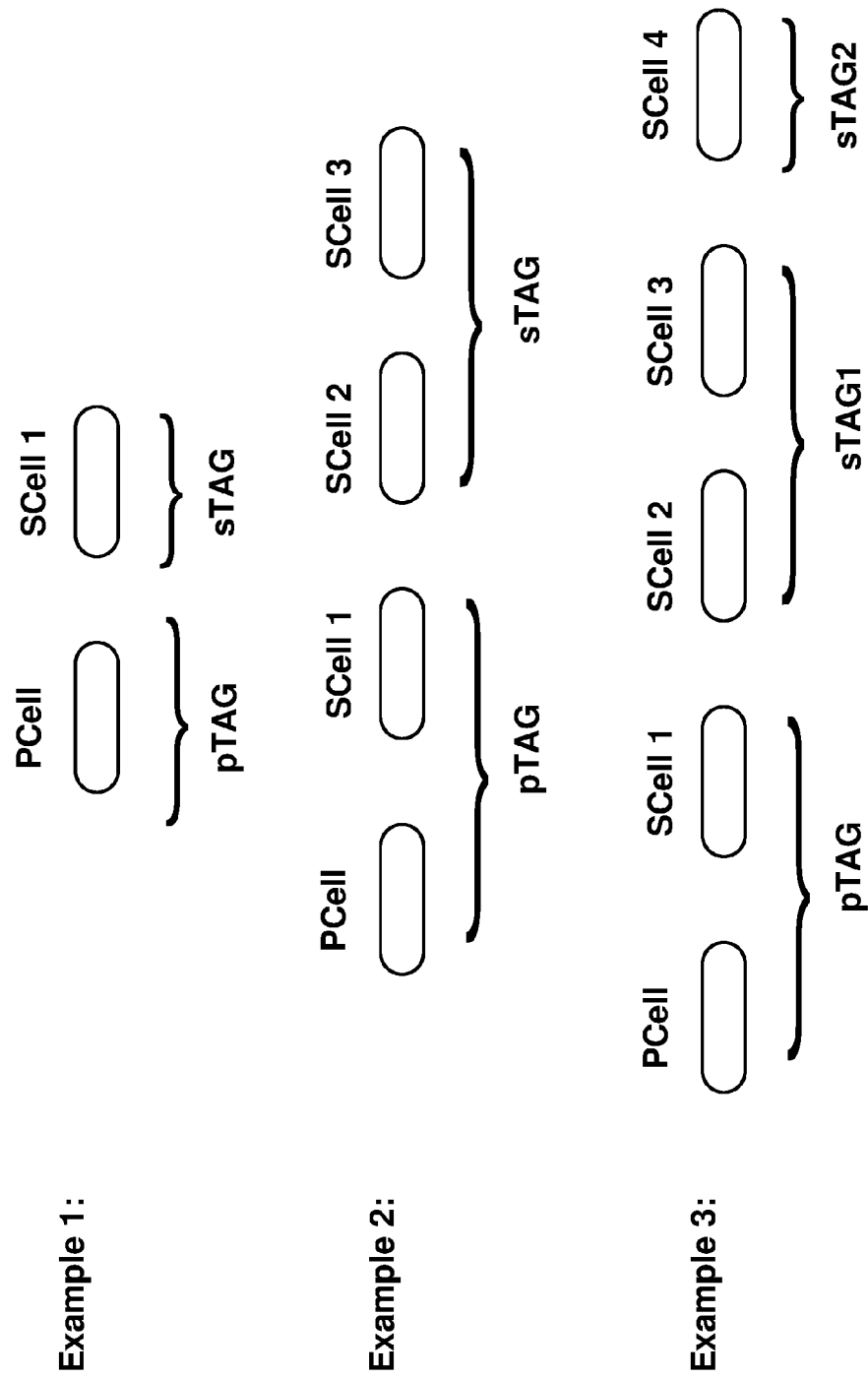
FIG. 7 shows example TAG configurations as per an aspect of an embodiment of the present invention.

FIG. 7 shows example TAG configurations as per an aspect of an embodiment of the present invention. In Example 1, pTAG include PCell, and sTAG includes SCell1. In Example 2, pTAG includes PCell and SCell1, and sTAG includes SCell2 and SCell3. In Example 3, pTAG includes PCell and SCell1, and sTAG1 includes SCell2 and SCell3, and sTAG2 includes SCell4. Up to four TAGs may be supported and other example TAG configurations may also be provided. In many examples of this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and the timing reference for pTAG may follow LTE release 10 principles. The UE may need to measure downlink pathloss to calculate the uplink transmit power. The pathloss reference may be used for uplink power control and/or transmission of random access preamble(s). A UE may measure downlink pathloss using the signals received on the pathloss reference cell. For SCell(s) in a pTAG, the choice of pathloss reference for cells may be selected from and be limited to the following two options: a) the downlink SCell linked to an uplink SCell using the system information block 2 (SIB2), and b) the downlink pCell. The pathloss reference for SCells in pTAG may be configurable using RRC message(s) as a part of SCell initial configuration and/or reconfiguration. According to some of the various aspects of embodiments, PhysicalConfigDedicatedSCell information element (IE) of an SCell configuration may include the pathloss reference SCell (downlink carrier) for an SCell in pTAG. The downlink SCell linked to an uplink SCell using the system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. TAT for TAGs may be configured with different values. When the TAT associated with the pTAG expires: all TATs may be considered as expired, the UE may flush all HARQ buffers of all serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with sTAG expires: a) SRS transmissions may be stopped on the corresponding SCells, b) SRS RRC configuration may be released, c) CSI reporting configuration for the corresponding SCells may be maintained, and/or d) the MAC in the UE may flush the uplink HARQ buffers of the corresponding SCells.

Upon deactivation of the last SCell in an sTAG, the UE may not stop TAT of the sTAG. In an implementation, upon removal of the last SCell in an sTAG, TAT of the TA group may not be running. RA procedures in parallel may not be supported for a UE. If a new RA procedure is requested (either by UE or network) while another RA procedure is already ongoing, it may be up to the UE implementation whether to continue with the ongoing procedure or start with the new procedure. The eNB may initiate the RA procedure via a PDCCH order for an activated SCell. This PDCCH order may be sent on the scheduling cell of this SCell. When cross carrier scheduling is configured for a cell, the scheduling cell may be different than the cell that is employed for preamble transmission, and the PDCCH order may include the SCell index. At least a non-contention based RA procedure may be supported for SCell(s) assigned to sTAG(s).

Figure 6:
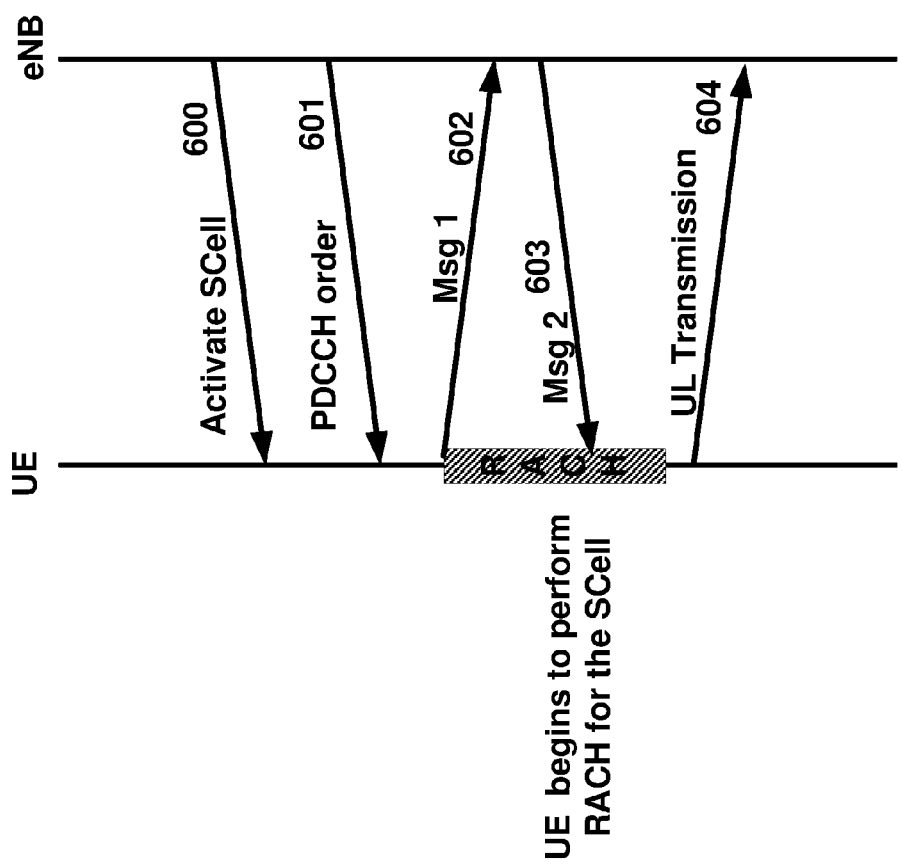
FIG. 6 is an example message flow in a random access process in a secondary TAG as per an aspect of an embodiment of the present invention.

FIG. 6 is an example message flow in a random access process in a secondary TAG as per an aspect of an embodiment of the present invention. eNB transmits an activation command 600 to activate an SCell. A preamble 602 (Msg1) may be sent by a UE in response to the PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on SCell may be addressed to RA-RNTI in PCell common search space (CSS). Uplink packets 604 may be transmitted on the SCell, in which the preamble was transmitted.

According to some of the various aspects of embodiments, initial timing alignment may be achieved through a random access procedure. This may involve the UE transmitting a random access preamble and the eNB responding with an initial TA command NTA (amount of timing advance) within the random access response window. The start of the random access preamble may be aligned with the start of the corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

A base station may communicate with a mix of wireless devices. Wireless devices may support multiple technologies, or multiple releases of the same technology, have some specific capability depending on the wireless device category and/or capability. A base station may comprise multiple sectors. When this disclosure refers to a base station communicating with a plurality of wireless devices, this disclosure may refer to a subset of the total wireless devices in the coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in the coverage area, which perform according to the disclosed methods, and/or the like. There may be many wireless devices in the coverage area that may not comply with the disclosed methods, for example, because those wireless devices perform based on older releases of LTE technology. A time alignment command MAC control element may be a unicast MAC command transmitted to a wireless device.

According to some of the various aspects of various embodiments, the base station or wireless device may group cells into a plurality of cell groups. The term "cell group" may refer to a timing advance group (TAG) or a timing alignment group or a time alignment group. Time alignment command may also be referred to timing advance command. A cell group may include at least one cell. A MAC TA command may correspond to a TAG. A cell group may explicitly or implicitly be identified by a TAG index. Cells in the same band may belong to the same cell group. A first cell's frame timing may be tied to a second cell's frame timing in a TAG. When a time alignment command is received for the TAG, the frame timing of both first cell and second cell may be adjusted. Base station(s) may provide TAG configuration information to the wireless device(s) by RRC configuration message(s).

The mapping of a serving cell to a TAG may be configured by the serving eNB with RRC signaling. The mechanism for TAG configuration and reconfiguration may be based on RRC signaling. According to some of the various aspects of embodiments, when an eNB performs SCell addition configuration, the related TAG configuration may be configured for the SCell. In an example embodiment, eNB may modify the TAG configuration of an SCell by removing (releasing) the SCell and adding (configuring) a new SCell (with the same physical cell ID and frequency) with an updated TAG ID. The new SCell with the updated TAG ID may be initially inactive subsequent to being assigned the updated TAG ID. eNB may activate the updated new SCell and then start scheduling packets on the activated SCell. In an example implementation, it may not be possible to change the TAG associated with an SCell, but rather, the SCell may need to be removed and a new SCell may need to be added with another TAG. For example if there is a need to move an SCell from an sTAG to a pTAG, at least one RRC message, for example, at least one RRC reconfiguration message, may be send to the UE to reconfigure TAG configurations by releasing the SCell and then configuring the SCell as a part of pTAG (when an SCell is added/configured without a TAG index, the SCell is explicitly assigned to pTAG). The PCell may not change its TA group and may always be a member of the pTAG.

An eNB may perform initial configuration based on initial configuration parameters received from a network node (for example a management platform), an initial eNB configuration, a UE location, a UE type, UE CSI feedback, UE uplink transmissions (for example, data, SRS, and/or the like), a combination of the above, and/or the like. For example, initial configuration may be based on UE channel state measurements or received signal timing. For example, depending on the signal strength received from a UE on various SCells downlink carrier or by determination of UE being in a repeater coverage area, or a combination of both, an eNB may determine the initial configuration of sTAGs and membership of SCells to sTAGs.

In an example implementation, the TA value of a serving cell may change, for example due to UE's mobility from a macro-cell to a repeater or an RRH (remote radio head) coverage area. The signal delay for that SCell may become different from the original value and different from other serving cells in the same TAG. In this scenario, eNB may reconfigure this TA-changed serving cell to another existing TAG. Or alternatively, the eNB may create a new TAG for the SCell based on the updated TA value. The TA value may be derived, for example, through eNB measurement(s) of signal reception timing, a RA mechanism, or other standard or proprietary processes. An eNB may realize that the TA value of a serving cell is no longer consistent with its current TAG. There may be many other scenarios which require eNB to reconfigure TAGs. During reconfiguration, the eNB may need to move the reference SCell belonging to an sTAG to another TAG. In this scenario, the sTAG would require a new reference SCell. In an example embodiment, the UE may select an active SCell in the sTAG as the reference timing SCell.

eNB may consider UE's capability in configuring multiple TAGs for a UE. UE may be configured with a configuration that is compatible with UE capability. Multiple TAG capability may be an optional feature and per band combination Multiple TAG capability may be introduced. UE may transmit its multiple TAG capability to eNB via an RRC message and eNB may consider UE capability in configuring TAG configuration(s).

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

The parameters related to SCell random access channel may be common to all UEs. For example PRACH configuration (RACH resources, configuration parameters, RAR window) for the SCell may be common to UEs. RACH resource parameters may include prach-configuration index, and/or prach-frequency offset. SCell RACH common configuration parameters may also include power: power ramping parameter(s) for preamble transmission; and max number of preamble transmission parameter. It is more efficient to use common parameters for RACH configuration, since different UEs will share the same random access channel.

eNB may transmit at least one RRC message to configure PCell, SCell(s) and RACH, and TAG configuration parameters. MAC-MainConfig may include a timeAlignmentTimerDedicated IE to indicate time alignment timer value for the pTAG. MAC-MainConfig may further include an IE including a sequence of at least one (sTAG ID, and TAT value) to configure time alignment timer values for sTAGs. In an example, a first RRC message may configure TAT value for pTAG, a second RRC message may configure TAT value for sTAG1, and a third RRC message may configure TAT value for sTAG2. There is no need to include all the TAT configurations in a single RRC message. In an example embodiment they may be included in one or two RRC messages. The IE including a sequence of at least one (sTAG ID, and TAT) value may also be used to update the TAT value of an existing sTAG to an updated TAT value. The at least one RRC message may also include sCellToAddModList including at least one SCell configuration parameters. The radioResourceConfigDedicatedSCell (dedicated radio configuration IEs) in sCellToAddModList may include an SCell MAC configuration comprising TAG ID for the corresponding SCell added or modified. The radioResourceConfigDedicatedSCell may also include pathloss reference configuration for an SCell. If TAG ID is not included in SCell configuration, the SCell is assigned to the pTAG. In other word, a TAG ID may not be included in radioResourceConfigDedicatedSCell for SCells assigned to pTAG. The radioResourceConfigCommonSCell (common radio configuration IEs) in sCellToAddModList may include RACH resource configuration parameters, preamble transmission power control parameters, and other preamble transmission parameter(s). At the least one RRC message configures PCell, SCell, RACH resources, and/or SRS transmissions and may assign each SCell to a TAG (implicitly for pTAG or explicitly for sTAG). PCell is always assigned to the pTAG.

According to some of the various aspects of embodiments, a base station may transmit at least one control message to a wireless device in a plurality of wireless devices. The at least one control message is for example, RRC connection reconfiguration message, RRC connection establishment message, RRC connection re-establishment message, and/or other control messages configuring or reconfiguring radio interface, and/or the like. The at least one control message may be configured to cause, in the wireless device, configuration of at least: I) a plurality of cells. Each cell may comprise a downlink carrier and zero or one uplink carrier. The configuration may assign a cell group index to a cell in the plurality of cells. The cell group index may identify one of a plurality of cell groups. A cell group in the plurality of cell groups may comprise a subset of the plurality of cells. The subset may comprise a reference cell with a reference downlink carrier and a reference uplink carrier. Uplink transmissions by the wireless device in the cell group may employ the reference cell (the primary cell in pTAG and a secondary cell in an sTAG). The wireless device may employ a synchronization signal transmitted on the reference downlink carrier as timing reference to determine a timing of the uplink transmissions. The synchronization signal for example may be a) primary/secondary synchronization signal, b) reference signal(s), and/or c) a combination of a) and b). II) a time alignment timer for each cell group in the plurality of cell groups; and/or III) an activation timer for each configured secondary cell.

The base station may transmit a plurality of timing advance commands. Each timing advance command may comprise: a time adjustment value, and a cell group index. A time alignment timer may start or may restart when the wireless device receives a timing advance command to adjust uplink transmission timing on a cell group identified by the cell group index. A cell group may be considered out-of-sync, by the wireless device, when the associated time alignment timer expires or is not running. The cell group may be considered in-sync when the associated time alignment timer is running.

The timing advance command may causes substantial alignment of reception timing of uplink signals in frames and subframes of all activated uplink carriers in the cell group at the base station. The time alignment timer value may be configured as one of a finite set of predetermined values. For example, the finite set of predetermined values may be eight. Each time alignment timer value may be encoded employing three bits. TAG TAT may be a dedicated time alignment timer value and is transmitted by the base station to the wireless device. TAG TAT may be configured to cause configuration of time alignment timer value for each time alignment group. The IE TAG TAT may be used to control how long the UE is considered uplink time aligned. It corresponds to the timer for time alignment for each cell group. Its value may be in number of sub-frames. For example, value sf500 corresponds to 500 sub-frames, sf750 corresponds to 750 sub-frames and so on. An uplink time alignment is common for all serving cells belonging to the same cell group. In an example embodiment, the IE TAG TAT may be defined as: TAG TAT::=SEQUENCE{TAG ID, ENUMERATED {sf500, sf750, sf1280, sf1920, sf2560, sf5120, sf10240, infinity}}. Time alignment timer for pTAG may be indicated in a separate IE and may not be included in the sequence.

In an example, TimeAlignmentTimerDedicated IE may be sf500, and then TAG TAT may be {1, sf500; 2, sf2560; 3, sf500}. In the example, time alignment timer for the pTAG is configured separately and is not included in the sequence. In the examples, TAG0 (pTAG) time alignment timer value is 500 subframes (500 m-sec), TAG1 (sTAG) time alignment timer value is 500 subframes, TAG2 time alignment timer value is 2560 subframes, and TAG3 time alignment timer value is 500 subframes. This is for example purposes only. In this example a TAG may take one of 8 predefined values. In a different embodiment, the enumerated values could take other values.

According to aspects of some of the various embodiments, upon reception of a timing advance command for a given timing advance group, the UE may adjust its uplink transmission timing for PUCCH/PUSCH/SRS of the serving cells belonging to the timing advance group. The timing advance command may indicate the change of the uplink timing of the timing advance group relative to the current uplink timing of the timing advance group, for example, as multiples of $16T_s$. $T_s$ may, for example, be the sampling duration, for example, 16 $T_s$=16*10/307,200 ms=0.52 micro-sec. I some embodiments, $T_s$ may be an alternative duration, for example, a clocking duration.

According to some of the various aspects of embodiments, in a random access response with an 11-bit timing advance command, TA, may indicate NTA values by index values of TA=0, 1, 2, . . . , 1282, where an amount of the time alignment may be given by NTA=TA×16. NTA may be maintained on a per-timing advance group basis. In other cases involving a 6-bit timing advance command, TA for a timing advance group may indicate an adjustment of the current NTA value, NTA,old, to a new NTA value for the timing advance group, NTA,new. The adjustment may be by index values of TA=0, 1, 2, . . . , 63, where NTA,new=NTA, old+(TA−31)×16. Adjustment of a NTA value by a positive or a negative amount may indicate advancing or delaying the uplink transmission timing by a given amount respectively.

According to some of the various embodiments, for a timing advance command received on subframe n, the corresponding adjustment of the timing may apply from the beginning of, for example, subframe n+6. When the UE's uplink PUCCH/PUSCH/SRS transmissions in subframe n and subframe n+1 of a serving cell are overlapped due to the timing adjustment, the UE may transmit complete subframe n of the serving cell and may not transmit the overlapped part of subframe n+1 of the serving cell. For a timing advance group, if the received downlink reference timing changes and/or is not compensated and/or is partly compensated by the uplink timing adjustment without a timing advance command, the UE may change NTA of the timing advance group accordingly.

Figure 8:
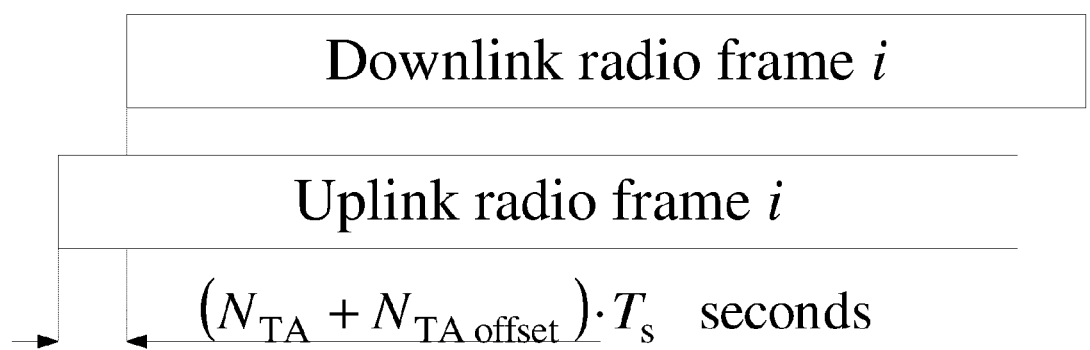
FIG. 8 is an illustration of example uplink-downlink timing relation as per an aspect of an embodiment of the present invention.

FIG. 8 is an illustration of example Uplink-downlink timing relation as per an aspect of an embodiment of the present invention. Transmission of the uplink radio frame number i from the UE may start $(N_{TA}+N_{TA\ offset})\times T_s$ seconds before the start of the corresponding downlink radio frame at the UE, where, for example: $0\leq N_{TA}\leq 20512$, $N_{TA\ offset}=0$ for frame structure type 1 and, for example, $N_{TA\ offset}=624$ for frame structure type 2. Other examples including other values and ranges may also be configured. Not all slots in a radio frame may be transmitted. One example is TDD where a subset of the slots in a radio frame may be transmitted.

A UE receiver may cope with a relative propagation delay difference up to a threshold, for example 30 μs, among the component carriers to be aggregated, for example, in inter-band non-contiguous carrier aggregation (CA). The carriers with a relative propagation delay difference may belong to different TAGs. The base station time alignment may be within a threshold, for example 1.3 μs. In the example, a UE may cope with a delay spread of up to 31.3 μs among the component carriers monitored at the receiver.

In prior releases of LTE technology (for example, release 10), uplink transmission on uplink carriers may be aligned and use the same timing reference, and a PCell may be employed as the timing reference. In release 11 or above, multiple TAGs may be supported, and a TAG may have its own time alignment process. Uplink subframe transmissions in different TAGs may have a timing difference. A UE may be able to cope with a timing difference within a certain limit, for example 31.3 μs. If the timing difference between different TAGs in a given scenario increases beyond the allowed limit, network performance may deteriorate, and/or unwanted interference may increase. FIG. 5 is an illustration of the timing difference between two TAGs as per an aspect of an embodiment of the present invention. This may apply to uplink transmission timing and/or downlink reception timing in a UE. Timing delay in excess of a given threshold, for example, a delay of 80 μs>33.3 μs, may cause an overlap between different symbols of different carriers in a subframe in uplink transmission. This overlap may cause distortions in UE transmit power, for example, around the subframe boundaries and when UE is power limited in the uplink transmission. There may be a need to address this issue and develop an eNB and/or UE behavior that addresses this issue and reduce the negative effects of such a scenario. This issue may not apply to prior releases of LTE technology (for example, release 10) since uplink transmission timing may be aligned on uplink carriers. There may be a need to reduce the possibility of an excessive TAG timing difference in a network.

According to some of the various aspects of embodiments, an eNB may keep track of timing differences between different TAGs. This could be performed using one or a combination of the methods in an eNB, for example: by monitoring uplink reception timings; monitoring reception of uplink preambles transmitted by a UE; by keeping track of and/or accumulating transmitted TA values in TA commands; by measuring and/or estimating propagation delay or round-trip delay for TAGs; and/or the like. An eNB may know the uplink transmission timing difference and/or relative propagation delay difference between different TAGs. An eNB may calculate the uplink transmission timing by accumulating the transmitted TA commands (including RAR) and detect excess timing differences between different TAGs. When a timing difference exceeds a threshold, for example 30 μsec or 31.3 μsec, an eNB may perform an action to reduce the occurrence of unwanted effects of excessive timing differences. For example, an eNB may take one or a combination of the following actions: the eNB may stop scheduling uplink transmissions on some of the TAG(s); the eNB may de-configure SCell(s) or uplink SCell carriers in some of the TAG(s); the eNB may deactivate some of the SCells in some of the TAG(s); the eNB may de-configure TAG configuration of some of the SCell(s); the eNB may initiate a random access process in one of the SCells; and/or the like. The eNB may perform one or many of these actions to reduce the effect of excessive delay between multiple TAGs, and may reduce the interference and/or deterioration in UE performance. One or more carriers with excessive delay may be re-configured (or de-configured) at a MAC and/or RRC level to reduce excessive time delay between carriers in a UE.

According to some of the various aspects of embodiments, a UE may take an action to avoid an excessive timing delay between multiple TAGs. An excessive timing delay between TAGs may apply to downlink reception timing and/or uplink transmission timing. In an example embodiment, an eNB may not be able to track the uplink transmission timing difference among TAGs. For a timing advance group, if the received downlink reference timing changes and/or a timing change is not compensated by TA commands, and/or a timing change is partly compensated by an uplink timing adjustment without a timing advance command, the UE may change NTA of the timing advance group accordingly. An eNB may not be able to accurately track the timing difference between uplink transmissions of various TAGs in one or more scenarios. The understanding of transmission time differences between uplink component carriers in different TAGs may be different from an UE and an eNB. Therefore, an eNB may transmit a TA command to a UE, which may result in excessive uplink transmission timing differences between different TAGs. For example, a TA command may increase the transmission timing difference between carriers in different TAGs to above a threshold value, for example 30 μs, or 31.3 μs, etc. In another example embodiment, the timing difference between received signals from reference signals belonging to two TAGs may exceeds a threshold. In another example embodiment, in order to maintain uplink synchronization, a UE may need to change TAG uplink transmission timings such that it may result in excessive timing differences between TAGs.

According to some of the various aspects of embodiments, when the timing difference exceeds a threshold or would exceed a threshold due to a received TA command or due to UE's detection of changes in timing reference, a UE may perform an action to reduce the occurrence of unwanted effects of excessive timing differences. For example, a UE may take one or a combination of the following actions. In an example embodiment, if the TA command is for the pTAG, the UE may adjust the pTAG timing, and if timing difference between TAGs (for example a pTAG and an sTAG) exceeds the threshold, the UE may put the sTAG(s) in an out-of-sync state and stop uplink transmissions in sTAG(s) with excessive time differences. If a TA command is for an sTAG and results in excess time differences between the sTAG and the pTAG, the UE may not adjust uplink transmission according to a TA command. The UE may change the state of the sTAG to an out-of-sync state. If a TA command is for an sTAG and results in excess time differences between the sTAG and another sTAG, the UE may take one of the following two actions: a) the UE may not adjust uplink transmission according to a TA command and the UE may change the state of the sTAG to an out-of-sync state; and b) the UE may adjust the uplink transmission according to a TA command and the UE may change the state of the other sTAGs with excessive time differences to an out-of-sync state.

According to some of the various aspects of embodiments, if a TA command results in excess time differences between TAGs, the UE may abort the execution of the TA command. A base station may notice that the uplink timing is not updated according to a TA command, and detect an uplink out-of-sync cell (or TAG). The base station may take a proper action according to the previous paragraph. In an example, the UE may also change the state of the TAG to an out-of-sync state. In another example embodiment, the UE may adjust its uplink transmission timing for a pTAG when a TA command for the pTAG is received. If the UE observes that the uplink transmission timing between an sTAG and a pTAG or between two sTAGs exceed a threshold, the UE may take an action. For example, the UE may change the state of an sTAG to an out-of-sync state, or the UE may inform an eNB that a radio link issue exists. This could be done by transmitting a MAC or an RRC message to a base station. In another example embodiment, a UE may check the timing difference as a result of a timing adjustment when the UE receives a TA and/or when uplink timing is adjusted autonomously by the UE, and the UE may adjust the TA up to a maximum amount. In this case, the timing difference between TAGs may not exceed a threshold amount. If an event that would result in an excessive uplink transmission timing difference, a UE may take an action to prevent unwanted effects.

A UE may know the timing difference between its configured cells. In an example embodiment, when the UE detects an excessive delay difference in a cell, the UE may report a channel quality index (CQI) index of 0 (out of range) for these cells that are beyond the receive window to an eNB. This may make it possible to indicate cells that have already fallen out of the receive window to an eNB. There may be several other reasons for the UE to send a CQI 0, and the eNB may not know exactly why the UE is sending a CQI equal to zero. It may be up to an eNB implementation to evaluate this CQI value correctly and to take an action. In another example embodiment, a mechanism may be considered that informs the eNB of cells that exceed a pre-defined propagation delay difference. The eNB may take an action and may deactivate or reconfigure these cell(s). In another example embodiment, the eNB may detect the timing difference and take a protocol layer one/two or higher layer (for example RRC) action to remedy the situation. The eNB action may be an RRC or MAC action and may comprise at least one of the following: de-configuring a cell, de-activating a cell, initiating a random access process, not scheduling uplink packets on a cell, and transmitting an RRC reconfiguration message to said wireless device.

According to some of the various aspects of embodiments, a UE may monitor the time difference between reference signals of different receiving reference signals and take proper action when the time delay exceeds a threshold. In this example, a UE may cope with a delay spread of up to 31.3 μs among the component carriers monitored at the receiver. If a higher delay (TAG timing difference) is observed, the UE may take one of many of the following actions: deactivate a carrier, change the sync state of a carrier, transmit a message (for example MAC or RRC) to a base station, and/or the like. If the downlink timing difference between two component carriers is increased above a threshold, additional UE complexity may be required because the UE may need to buffer data for one of the two CCs (PCell or SCell) during the time difference between the PCell and the SCell. That may also result in complexity and unwanted power limitations and/or interference in the uplink. In general, carrier aggregation may be more likely to be deployed in urban areas than in rural areas in order to enhance both cell capacity and peak throughput, and therefore, a relatively small cell radius may be assumed. But in an example implementation, some actions may be taken by a UE and/or an eNB to reduce interference where a cell radius is high and delay differences between bands may be high or radio wave reflections may result in excessive delay spread among carriers.

Figure 9:
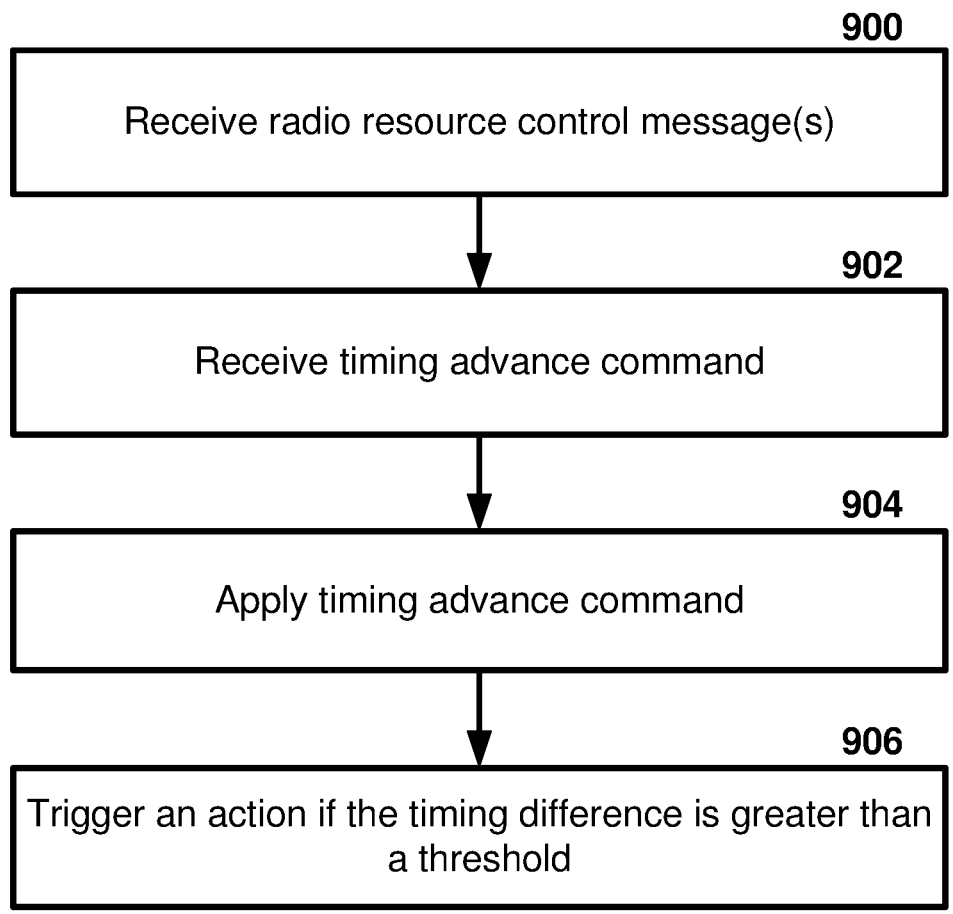
FIG. 9 is an illustration of a cell group timing process in a wireless device for as per an aspect of an embodiment of the present invention.

According to aspects of some of the various embodiments, a wireless device may communicate employing a plurality of cells. FIG. 9 is an illustration of a cell group timing process in a wireless device for as per an aspect of an embodiment of the present invention. The wireless device may receive at least one control message from a base station at block 900. The at least one control message to cause in the wireless device configuration of a primary cell and at least one secondary cell in the plurality of cells, and assignment of each of the at least one secondary cell to a cell group in a plurality of cell groups. The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the at least one secondary cell. Uplink transmissions in the secondary cell group may employ a second synchronization signal on an activated secondary cell in the secondary cell group as a secondary timing reference. The wireless device may receive at least one timing advance command from the base station at block 902. The timing advance command may comprise a time adjustment value; and an index identifying the secondary cell group.

The wireless device may apply the time adjustment value to uplink transmission timing of the secondary cell group at block 904. The wireless device may trigger an action in response to the wireless device detecting a difference between primary cell group timing and secondary cell group timing, the difference being greater than a threshold at block 906. The threshold may be determined internally by the wireless device or may be communicated to the wireless device. The threshold may depend on many variables such as signal transmission power, power limitations, receiver signal processing capability, handset release, and/or the like. In an example embodiment, the threshold may be a fixed value for example 30 micro-sec, or 20 micro-sec. In another example embodiment, the threshold may be calculated internally by the mobile device (for example dynamically, semi-statically, statically, etc) depending on various internal parameters and timers and may vary depending on the circumstances.

According to aspects of some of the various embodiments, there may be various methods to determine the timings. The primary cell group timing may be a primary cell group uplink signal timing. The secondary cell group timing is a secondary cell group uplink signal timing. The primary cell group timing may be a primary cell group downlink signal timing. The secondary cell group timing may be a secondary cell group downlink signal timing. In an example embodiment, the difference may employ, at least in part, the first synchronization signal and the second synchronization signal. The wireless device may employ, at least in part, primary cell group uplink signal timing and secondary cell group uplink signal timing to detect the difference. Transmission of downlink signals in the primary cell group and the secondary cell group may be time aligned within a predetermined value.

According to aspects of some of the various embodiments, the action may be an action in a radio resource control layer or an action in a medium access control layer. The action may comprise at least one of the following: a) transmitting a radio resource control (RRC) message to the base station. The RRC message may inform the base station that an internal event has occurred, for example the RRC message may be a connection re-establishment message or an error message. b) transmitting a medium access control message to the base station. The MAC message may inform the base station about an error scenario or about an action. c) changing the synchronization state of a cell from an in-sync state to an out-of-sync state; and d) changing the synchronization state of a cell group from an in-sync state to an out-of-sync state; e) suspending uplink transmission on a cell. For example, uplink transmission on a cell that its timing difference is above the threshold may be stopped. The comparison may be made with the primary cell timing. f) suspending uplink transmission on a cell group. For example, uplink transmission on a cell group that its timing difference is above the threshold may be stopped. The comparison may be made with the primary cell timing. g) ignoring a received timing advance command resulting in an increase in the difference. Other actions may also possible.

Figure 10:
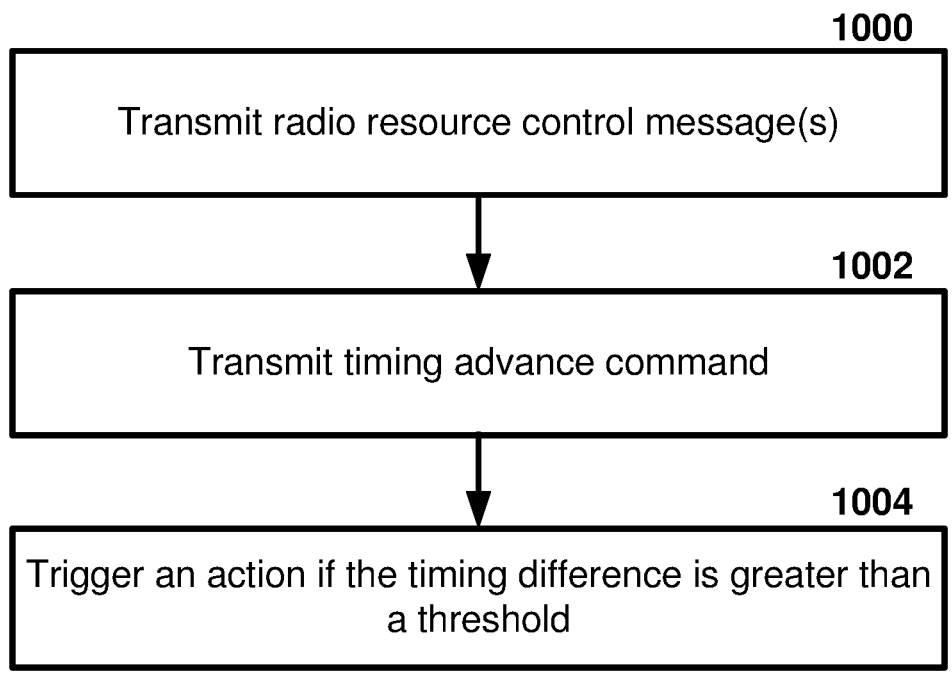
FIG. 10 is an illustration of a cell group timing process in a base station for as per an aspect of an embodiment of the present invention.

According to aspects of some of the various embodiments, a base station may be configured communicate employing a plurality of cells. FIG. 10 is an illustration of a cell group timing process in a base station for as per an aspect of an embodiment of the present invention. The base station may transmit at least one control message to a wireless device at block 1000. The at least one control message may cause in the wireless device configuration of a primary cell and at least one secondary cell in the plurality of cells assignment of each of the at least one secondary cell to a cell group in a plurality of cell groups. The plurality of cell groups may comprise a primary cell group comprising a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the at least one secondary cell. Uplink transmissions in the secondary cell group may employ a second synchronization signal on an activated secondary cell in the secondary cell group as a secondary timing reference. The base station may transmit at least one timing advance command to the wireless device at block 1002. The timing advance command may comprise a time adjustment value and an index identifying the secondary cell group. The base station may trigger an action corresponding to the wireless device in response to the base station detecting a difference between primary cell group timing of the wireless device and secondary cell group timing of the wireless device, the difference being greater than a threshold at block 1004. The threshold may be determined internally by the base station or may be communicated to the base station. The threshold may depend on many variables such as signal transmission power, power limitations, receiver signal processing capability, handset or base station release, and/or the like. In an example embodiment, the threshold may be a fixed value for example 30 micro-sec, or 20 micro-sec. In another example embodiment, the threshold may be calculated (for example dynamically, semi-statically, statically, etc) internally by the mobile device depending on various internal parameters and timers and may vary depending on the circumstances.

The difference may be detected employing at least one random access process. The difference may be detected employing the at least one timing advance command. The action may be an action in a radio resource control layer or an action in a medium access control layer. The action may comprise at least one of the following: a) transmitting a medium access control message to the wireless device; b) de-configuring at least one cell; c) de-activating at least one cell; d) initiating a random access process; e) not scheduling uplink packets on at least one cell; and f) transmitting a radio resource control reconfiguration message to the wireless device. Transmission of downlink signals in the primary cell group and the secondary cell group may be time aligned within a predetermined value.

In prior releases of LTE technology (for example, release 10), uplink transmission on uplink carriers may be aligned and use the same timing reference, and PCell may be employed as the timing reference. A random access preamble transmission timing may be based on PCell reference signal timing and considering TA=0. A random access response may include 11-bit timing advance command, TA, and may indicate NTA values by index values of TA=0, 1, 2, . . . , 1282, where an amount of the time alignment may be given by NTA=TA×16.

In release 11 or above multiple TAGs may be supported, and a TAG may have its own time alignment process. Uplink subframe transmission in a TAG may have its own timing difference. A UE receiver may cope with a relative propagation delay difference up to a certain limit, for example 30 us, among the component carriers to be aggregated, for example, in inter-band non-contiguous CA. The base station time alignment may be up to a certain limit, for example 1.3 us. In the example, a UE may cope with a delay spread of up to 31.3 us among the component carriers monitored at the receiver. If the timing difference between different TAGs in a given scenario increases beyond the allowed limit, network performance may deteriorate, and/or unwanted interference may increase. Therefore, network and/or equipment implementation may consider preventing or reducing the possibility of introducing a timing difference between TAGs above a given threshold.

The signal propagation and other delays including for example, repeater delay, etc may be in the range of one micro-second to tens or hundreds of micro seconds. For example propagation time difference for radius of 10 Km may be 33.3 us, and for a cell radius of 100 km may be 333 us. The round-trip delay time may be twice these values.

If the initial PRACH transmission considers TA=0, then the overlap between PRACH and other signals such as PUSCH, PUCCH, and/or SRS may include a wide range including part of a subframe. The duration of overlap between PRACH transmission and PUSCH, PUCCH and/or SRS may depend on radio transmission delay, including propagation delay (a function of distance between UE and eNB), repeater delay, and other factors affecting the reception timing of reference signal transmitted by an eNB and received by a UE and used for preamble transmission. The duration of overlap between PRACH transmission and PUSCH, PUCCH and/or SRS may also depend preamble duration. A wide range in overlap between PRACH and other uplink channels, may reduce efficiency for example when the UE is power limited.

There may be advantages in transmitting an initial preamble, which its timing is closer to an sTAG adjusted uplink timing. This may result in smaller time alignment adjustments in random access response. Since the timing difference between TAGs is typically smaller than the round-trip-delay, a UE may use the timing of other TAGs in transmitting the first random access response. The UE may use another TAG's (for example pTAG's) timing for uplink transmission, and use a non-zero value for TA for preamble transmission. The UE may use the timing of pTAG, or other synchronized sTAGs, or previous NTA timing values in setting a proper value for TA. This process may be triggered if certain radio configuration or radio conditions arise. A UE may transmit preamble for an sTAG with a non-zero TA value. This may decrease the overlap possibilities between preamble and other uplink channels, and may improve power management process in a UE when a UE is power limited. The inter TAG timing difference may be smaller than, for example 31.3 us. The adjustment needed for the timing of the uplink preamble transmission may be below 31.3 us. If TA=0 is used for uplink transmission, the adjustment may be up to hundreds of us.

According to some of the various aspects of embodiments, when a secondary cell group is configured, it is initially in an out-of-sync state and its time alignment timer may not be running. Uplink transmission timing advance may be initialized as zero. A base station may start a random access process to synchronize uplink timing of the wireless device for the secondary cell group. The base station may transmit a PDCCH order, and receive a random access preamble. The base station may then transmit a random access response including a timing advance command for the secondary cell group. The time alignment timer of the secondary cell group starts running and the secondary cell group may become in-sync after the wireless device receives and processes the random access response. In an example embodiment, a method to initially synchronize the uplink transmission of a secondary cell group is initiating a random access process on the secondary cell group. The secondary cell group may move to out-of-sync state, when the time alignment timer of the secondary cell group expires. To reduce the time required for changing the state of the secondary cell group from out-of-state to in-sync, the wireless device may store the updated timing advance of the secondary cell group when the secondary cell group becomes out-of-sync. The stored value of the timing advance may not be a proper value of the uplink transmission timing advance when the secondary cell group becomes in-sync again. Specially, when the wireless device moves around, the propagation delay may change, for example, wireless devices may move to the coverage area of a repeater, and/or the like. The value of the stored timing advance may be close the actual value of the timing advance for in-sync transmission of the wireless device, especially when the cell radius is small and/or the wireless device does not move, or moves slowly. In an example embodiment, the stored value of the timing advance may be employed in order to obtain transmission timing for a random access process for a secondary cell in a secondary cell group.

According to some of the various aspects of embodiments, a wireless device may be configured to communicate employing a plurality of cells. The wireless device may receive at least one control message from a base station. The at least one control message may cause in the wireless device configuration of a primary cell and at least one secondary cell in the plurality of cells and assignment of each of the at least one secondary cell to a cell group in a plurality of cell groups (explicitly or implicitly). The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the at least one secondary cell. Uplink transmissions in the secondary cell group may employ a second synchronization signal on an activated secondary cell in the secondary cell group as a secondary timing reference.

The wireless device may receive a control command causing the wireless device to transmit a random access preamble on random access resources of a secondary cell in the secondary cell group. The wireless device may transmit the random access preamble on the random access resource to the base station. Transmission timing of the random access preamble may be determined, at least in part, employing uplink frame and subframe transmission timing of the primary cell. The transmission timing of the random access preamble may be determined, at least in part, further employing a synchronization signal received on the secondary cell. Transmission timing of the random access preamble may be time aligned with uplink frame and subframe transmission timing of the primary cell.

According to some of the various aspects of embodiments, the at least one control message may comprise a plurality of random access resource parameters. The plurality of random access resource parameters may comprise an index, a frequency offset, and a plurality of sequence parameters. The at least one control message may cause configuration of the random access resources. The wireless device may be assigned, by the configuration, a plurality of media access control dedicated parameters comprising a plurality of time alignment timer values. Each time alignment timer value may be associated with a unique cell group in the wireless device.

According to some of the various aspects of embodiments, the at least one control message may cause in the wireless device configuration of a time alignment timer for each of the plurality of cell groups. The time alignment timer may start or restart in response to the wireless device receiving a timing advance command to adjust an timing advance of a commanded cell group in the plurality of cell groups. The wireless device may generate a first updated timing advance by updating a first timing advance of the secondary cell group employing at least one first timing advance command for the secondary cell group. The wireless device may store the first updated timing advance upon expiry of an associated time alignment timer of the secondary cell group. The wireless device may receive a control command causing the wireless device to transmit a random access preamble on random access resources of a secondary cell in the secondary cell group. The wireless device may transmit the random access preamble on the random access resource to the base station. The transmission timing of the random access preamble may be determined, at least in part, employing the stored first updated timing advance.

The first timing advance may be approximately (or substantially) equal to a difference between received timing of the secondary timing reference and transmission timing of the uplink signals. Approximately (substantially) equal implies that it is equal within certain accuracy, for example, within 1 micro-sec, within 2 micro-sec, or within 5 micro-sec. The accuracy may depend on wireless device timing accuracy and/or timing advance command(s) accuracy. The first timing advance value may be initiated by a timing advance value in a random access response for a random access preamble transmitted in the secondary cell group. The first timing advance value may be set to zero when the secondary cell group is configured. The stored first updated timing advance may be released in the wireless device when the secondary cell group is released.

According to release 10 of the LTE standard, 3GPP TS 36.213, a UE may drop a sounding reference signal (SRS) transmission in many scenarios when an SRS transmission overlaps with the transmission of a PUCCH, a PUSCH, and/or a PRACH. In LTE release 10, a UE may not transmit an SRS whenever the SRS and PUSCH transmissions happen to coincide in the same symbol. For TDD, when one SC-FDMA symbol exists in UpPTS of a given serving cell, the SC-FDMA symbol may be used for an SRS transmission. When two SC-FDMA symbols exist in UpPTS of a given serving cell, both symbols may be used for an SRS transmission and both symbols may be assigned to the same UE. A UE may not transmit a type 0 triggered SRS whenever the type 0 triggered SRS and PUCCH format 2/2a/2b transmissions happen to coincide in the same subframe. A UE may not transmit a type 1 triggered SRS whenever the type 1 triggered SRS and PUCCH format 2a/2b or format 2 with HARQ-ACK transmissions happen to coincide in the same subframe. A UE may not transmit a PUCCH format 2 without HARQ-ACK whenever the type 1 triggered SRS and PUCCH format 2 without HARQ-ACK transmissions happen to coincide in the same subframe.

In LTE release 10, a UE may not transmit an SRS whenever the SRS transmission and a PUCCH transmission carrying a HARQ-ACK and/or positive Scheduling Request (SR) happen to coincide in the same subframe if the parameter ackNackSRS-SimultaneousTransmission is FALSE. A UE may transmit an SRS whenever the SRS transmission and a PUCCH transmission carrying a HARQ-ACK and/or positive SR using a shortened format happen to coincide in the same subframe if the parameter ackNackSRS-SimultaneousTransmission is TRUE. A UE may not transmit an SRS whenever the SRS transmission on any serving cells and a PUCCH transmission carrying a HARQ-ACK and/or positive SR using a normal PUCCH format happen to coincide in the same subframe. In a UpPTS, whenever an SRS transmission instance overlaps with the PRACH region for a preamble format 4 or exceeds the range of an uplink system bandwidth configured in the serving cell, the UE may not transmit an SRS.

In LTE release 10, the parameter ackNackSRS-SimultaneousTransmission provided by higher layers may determine if a UE is configured to support the transmission of a HARQ-ACK on PUCCH and an SRS in one subframe. If the UE is configured to support the transmission of a HARQ-ACK on a PUCCH and an SRS in one subframe, then a UE may transmit a HARQ-ACK and an SR using the shortened PUCCH format in the cell specific SRS subframes of the primary cell where the HARQ-ACK or the SR symbol corresponding to the SRS location is punctured. This shortened PUCCH format may be used in a cell specific SRS subframe of the primary cell even if the UE does not transmit an SRS in that subframe. The UE may use the normal PUCCH format 1/1a/1b or normal PUCCH format 3 for the transmission of the HARQ-ACK and the SR. FIG. 11 summarizes example transmission scenarios for transmission of an SRS and a PUSCH/PUCCH in the uplink that may be implemented in an example LTE-Advanced network (e.g. LTE release 10).

The above limitations may cause excessive dropping of SRS signals in an uplink. SRS signals may be transmitted by the UE, and may provide a base station with information about channel conditions. Reducing the dropping possibility of SRS signals in the uplink may enhance a base station's ability to estimate radio channel conditions. In an example scenario, the base station may need to transmit, in parallel, a combination of one or more of the following signals: a PRACH signal, a PUCCH signal, PUSCH signal(s), and SRS signal(s). The implementation of mechanisms employing parallel transmission of SRS and/or PRACH signals with other uplink physical channel signals may enhance network performance.

Figure 12:
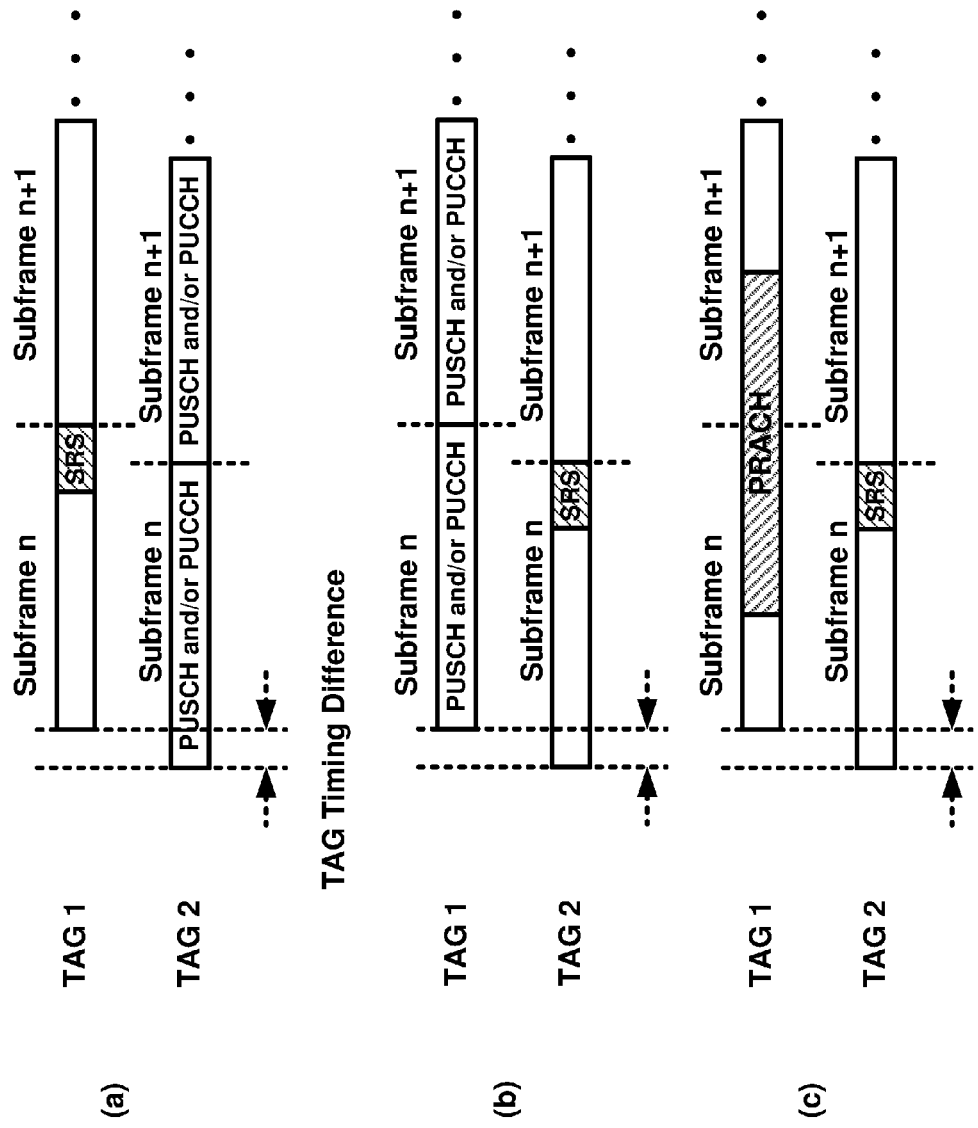
FIG. 12 is an example illustration of parallel transmission of SRS and other physical channel signals as per an aspect of an embodiment of the present invention.

According to some of the aspects of some of the various embodiments, a UE may transmit an SRS signal in the same symbol in parallel with transmission of a PUCCH and/or a PUSCH. The parallel transmission of an SRS signal and a PUCCH and/or a PUSCH may be limited to non-power limited scenarios wherein the UE has enough transmit power for transmission of one or more SRSs and a PUCCH and/or PUSCH(s) during the same subframe and/or symbol. A power limitation in a UE may be defined as a function of transmitter parameters, instantaneous transmission power over time, and/or maximum carrier transmit power. For example, a power limitation may cause the UE to adjust its total transmission power to not exceed its maximum transmit power ($P_{CMAX}$) on any time period. For example, a UE may not exceed its maximum transmit power on any overlap period between different subframes of different TAGs. In another example implementation, a UE may be allowed to transmit at a power above the limit for a short period of time (for example in a transient period of less than 5, 10, 20, or 30 μs). Power limitations may be defined in term of transient (short term) and non-transient (long term) power. Functions such as linear averaging, log averaging, and/or the like may be considered to define a power limited scenario. An SRS signal duration may be one symbol. A PUCCH duration may be one subframe unless a shortened format is used. If a shortened format of a PUCCH is used, the PUCCH may not be transmitted during the last symbol of a subframe. FIG. 12 is an example illustration of parallel transmission of SRS and other physical channel signals as per an aspect of an embodiment of the present invention. Other example scenarios, not shown in FIG. 12, may be also possible. Considering that there is a timing difference between multiple TAGs, the SRS transmission in a TAG may overlap with the first symbol of the next subframe in another TAG as shown in FIG. 12(a). In some other scenarios, an SRS transmission in a TAG may overlap with the penultimate symbol of the same subframe in another TAG as shown in FIG. 12(b). In some other scenarios, an SRS transmission in a TAG may overlap with the PRACH transmission as shown in FIG. 12(c).

Figure 13:
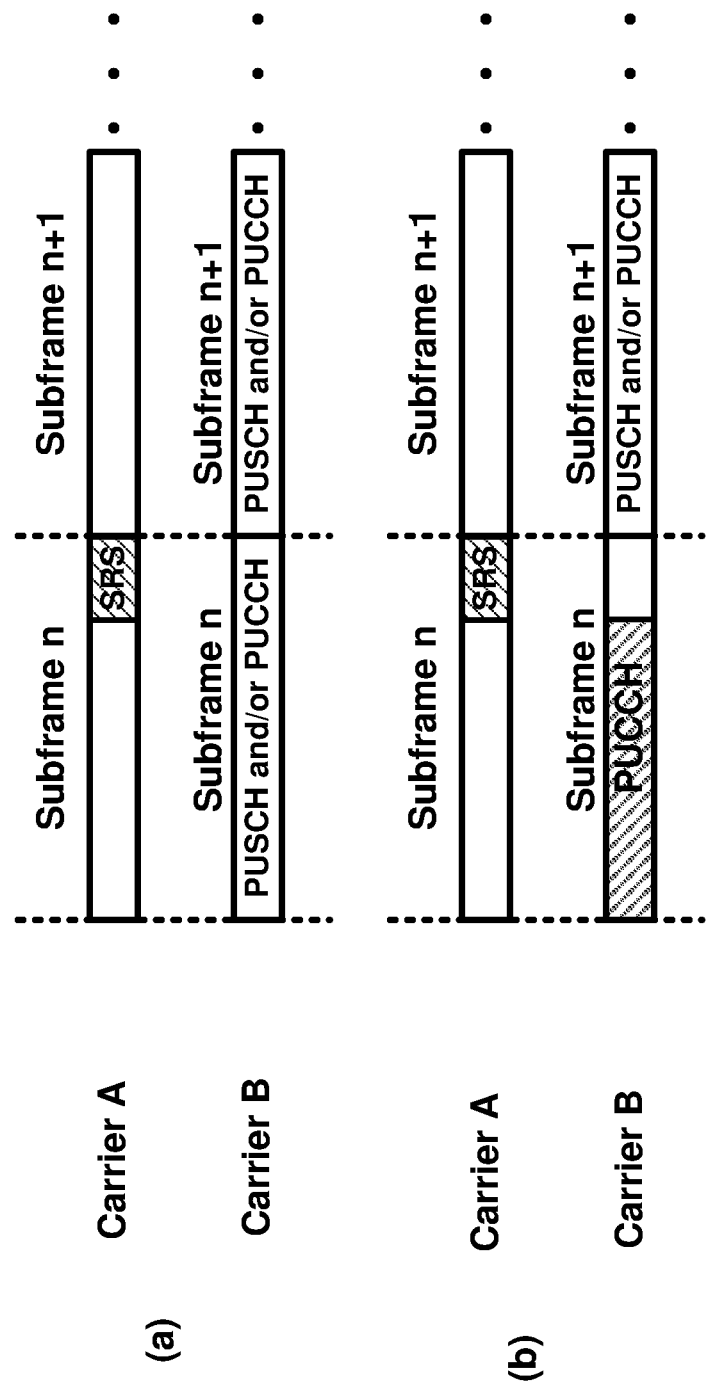
FIG. 13 is an example illustration of parallel transmission of SRS and other physical channel signals as per an aspect of an embodiment of the present invention.

According to some of the various aspects of embodiments, an SRS and a PUCCH and/or a PUSCH may be transmitted in the same subframe and in the same TAG. FIG. 13 is an example illustration of parallel transmission of an SRS and other physical channel signals as per an aspect of an embodiment of the present invention. Other example scenarios, not shown in FIG. 13, may also be possible. In an example embodiment, in a non-power limited scenario, a UE may transmit an SRS signal in one carrier while transmitting a PUCCH and/or a PUSCH in another carrier as shown in FIG. 13(a). A PUCCH may be in a shortened format (e.g. not occupying the last symbol of a subframe as shown in FIG. 13(b)), or may be in a regular format (e.g. occupying the last symbol of a subframe as shown in FIG. 13(a)). In an example implementation, a PUSCH may be in a shortened format (e.g. not occupying the last symbol of a subframe), or may be in regular format (e.g. occupying the last symbol of a subframe). In an example embodiment, a UE may transmit an SRS signal in a carrier while transmitting a shortened PUCCH in the same carrier.

According to some of the various aspects of embodiments, for a UE that is not configured with multiple TAGs when the UE is scheduled by an eNB to transmit a PUSCH on the same subframe that the UE is scheduled to transmit a type 0 or a type 1 SRS, the UE may drop the SRS transmission in that subframe. If the UE is scheduled to transmit an SRS signal and a PUCCH signal in the same subframe, the UE may drop the SRS signal transmission except if the PUCCH transmission carrying a HARQ-ACK and/or positive SR using a shortened format happen to coincide in the same subframe and if the parameter ackNackSRS-SimultaneousTransmission is TRUE. If the UE is scheduled to transmit an SRS signal in parallel with a PRACH signal transmission, the UE may drop the SRS signal transmission. In an example embodiment, the UE behavior when the UE is not configured with multiple TAGs may be according to FIG. 11.

According to some of the various aspects of embodiments, for a UE that is configured with multiple TAGs, a UE may transmit an SRS signal with other uplink signals if the UE is not power limited. When the UE is scheduled by the same eNB to transmit a PUSCH on the same subframe that the UE is scheduled to transmit a type 0 or a type 1 SRS, the UE may transmit the SRS signal and the PUSCH signal if the PUSCH and the SRS are scheduled for transmission in different cells. In other words, the UE may transmit SRS signals in a subframe of at least one first carrier and PUSCH signals in the same subframe of at least one second carrier (e.g. where at least one first carrier and at least one second carrier do not overlap). In another example, if the UE is scheduled to transmit an SRS signal and a regular PUCCH signal (not shortened PUCCH), the UE may transmit both regular PUCCH and SRS signals if the SRS and the PUCCH are transmitted in different cells. In another example, if the UE is scheduled to transmit an SRS signal and a shortened PUCCH signal, the UE may transmit both the shortened PUCCH and the SRS signals in the same cell (e.g. according to an ackNackSRS-SimultaneousTransmission parameter) or different cells. If the UE is scheduled to transmit an SRS signal in parallel with a PRACH signal in the same symbol and in the same TAG, the UE may drop the SRS signal transmission. If the UE is scheduled to transmit an SRS signal in parallel with a PRACH signal in the same symbol and in different TAGs, the UE may transmit both the PRACH and the SRS signal. Other combinations may be specified. If a UE is not configured with multiple TAGs, then the UE may not transmit an SRS and a PUSCH and/or a PUCCH in parallel. If a UE is configured with multiple TAGs, the UE may transmit an SRS and a PUSCH and/or PUCCH in parallel in different serving cells of the same TAG or different TAGs. Please note that a shortened PUCCH and an SRS in the primary cell group may not be transmitted in parallel since they do not overlap in time.

In an example, user terminals (for example: UE1, and/or UE2) communicating with an eNB may be configured differently or may have different sets of LTE features. For example, UE2 may be configured with multiple timing advance groups, and UE1 may not be configured with multiple timing advance groups. An eNB may transmit RRC messages and/or PDCCH orders to the user terminals (UE1, UE2) in unicast messages. RRC messages and/or PDCCH orders may order (and/or configure) transmission of type 0 and/or type 1 SRS signals for UE1 and UE2. User terminals (UE1, and/or UE2) may perform different functions in response to the RRC messages and/or the PDCCH orders for transmission of type 0 and/or type 1 SRS messages. The order (RRC or PDDCH) for transmission of type 0 or type 1 SRS signals may be processed differently by UE1 and UE2. For example, in a scenario, UE1 may consider transmissions of a PUCCH and/or a PUSCH as a factor in enabling transmission of an SRS in the same subframe as described in this disclosure. A UE1 may not transmit a PUSCH and an SRS in the same subframe. A UE2 may have more freedom in transmission of SRS signals (and drop less SRS signals), and may transmit SRS signals simultaneous with uplink PUSCH and/or PUCCH channel signals when UE2 is not limited in transmission power. Therefore, the RRC or PDCCH order for transmission of a type 0 and/or a type 1 SRS may be processed differently by different UEs configured differently.

According to some of the various aspects of embodiments, if the UE is configured with multiple TAGs and when the UE is power limited, the UE may drop one or more SRS signal transmissions. If one or more SRS transmissions of the wireless device in a symbol on a subframe for one or more serving cells in a TAG overlaps with the PUCCH/PUSCH transmission on the same or different subframe for a different serving cell in the same or another TAG, the wireless device may drop at least one SRS when the wireless device is power limited. The UE may drop an SRS when requested by higher layers to transmit a PRACH in a secondary serving cell in parallel with the SRS transmission in a symbol on a subframe of a different serving cell belonging to a different TAG if the UE is power limited.

According to some of the various aspects of embodiments, the UE may drop an SRS, a PUSCH, and/or a PUCCH signal when requested by higher layers to transmit a PRACH in a serving cell in parallel with the SRS, PUSCH, and/or PUCCH in the same cell group. The UE may transmit an SRS, a PUSCH, and/or a PUCCH signal in parallel with transmission of a PRACH in a serving cell if the PRACH is transmitted in a different cell group compared with the SRS, the PUSCH, and/or the PUCCH signal. For example, when a UE transmits a PRACH signal in a subframe of a secondary cell of a secondary TAG, the UE may drop the SRS, and/or the PUSCH in the same subframes of the serving cells belonging to the secondary TAG. When a UE transmits a PRACH signal in a subframe of a secondary cell of a secondary TAG, the UE may also transmit an SRS, and/or a PUSCH in the same subframes of the serving cells belonging to TAGs different from the secondary TAG.

According to some of the various aspects of embodiments, when multiple timing advance groups are configured and in a non-power-limited scenario, a UE may allow parallel transmission of SRS and PUSCH and/or PUCCH signals in the same subframe of different TAGs and/or the same TAGs. When a UE is not power limited, the UE may not drop the SRS in a TAG when the PUCCH/PUSCH are transmitted in the same subframe in another TAG or in another carrier of the same TAG. A PUCCH may be in a shortened format (e.g not occupying the last symbol of a subframe), or may be in a regular format (e.g. occupying the last symbol of a subframe). When a PUCCH with a shortened format is transmitted in a subframe of a carrier, an SRS may be transmitted on the same subframe of the carrier. According to some of the various aspects of embodiments, when multiple timing advance groups are configured, parallel SRS transmission with other physical layer channel signals may be allowed.

When an SRS and a PUCCH, a PUSCH, and/or a PRACH are transmitted on different cells, then the UE transmitter may map a channel signal on the resource elements of the corresponding cell, and there may be no resource element overlap between an SRS and other channel signals since signals are transmitted on radio resource of different cells. This implementation may be enabled by a digital signal processor that processes signals for transmission on multiple cells. The disclosed implementation may increase UE performance and may reduce the possibility of dropping SRS signal(s). Example implementations for transmission of SRS signals, PUCCH signals, PUSCH signals, and PRACH signals are described in this specification.

According to some of the various aspects of embodiments, for a UE not having a first capability when the UE is scheduled by an eNB to transmit a PUSCH on the same subframe that the UE is scheduled to transmit a type 0 or type 1 SRS, the UE may drop the SRS transmission in that subframe. If the UE is scheduled to transmit an SRS signal and a PUCCH signal in the same subframe, the UE may drop the SRS signal transmission except if the PUCCH transmission carrying a HARQ-ACK and/or a positive SR using a shortened format happen to coincide in the same subframe and if the parameter ackNackSRS-SimultaneousTransmission is TRUE. If the UE is scheduled to transmit an SRS signal in parallel with a PRACH signal transmission, the UE may drop the SRS signal transmission. In an example embodiment, the UE behavior when the UE is not configured with multiple TAGs may be according to FIG. 11.

According to some of the various aspects of embodiments for a UE having a first capability, the UE may transmit an SRS signal with other uplink signals if the UE is not power limited. When the UE is scheduled by the same eNB to transmit a PUSCH on the same subframe that the UE is scheduled to transmit a type 0 or a type 1 SRS, the UE may transmit the SRS signal and the PUSCH signal if the PUSCH and the SRS are scheduled for transmission in different cells. In other words, the UE may transmit SRS signals in a subframe of at least one first carrier and PUSCH signals in the same subframe of at least one second carrier (e.g when at least one first carrier and at least one second carrier do not overlap). In another example, if the UE is scheduled to transmit an SRS signal and a regular PUCCH signal (e.g not a shortened PUCCH), the UE may transmit both a regular PUCCH and SRS signals if the SRS and the PUCCH are transmitted in different cells. In another example, if the UE is scheduled to transmit an SRS signal and a shortened PUCCH signal, the UE may transmit both the shortened PUCCH and SRS signals in the same cell (e.g. according to an ackNackSRS-SimultaneousTransmission parameter) or different cells. If the UE is scheduled to transmit an SRS signal in parallel with a PRACH signal in the same symbol and in the same TAG, the UE may drop the SRS signal transmission. If the UE is scheduled to transmit an SRS signal in parallel with a PRACH signal in the same symbol and in different TAGs, the UE may transmit both the PRACH and the SRS signal transmission. Other combinations may be specified.

If a UE does not have the first capability, then the UE may not transmit an SRS and a PUSCH/PUCCH in parallel. If the UE has the first capability, the UE may transmit an SRS and a PUSCH/PUCCH in parallel in different serving cells of the same TAG or different TAGs. The first capability, for example, may be: a capability of supporting multiple TAG configurations; a capability of parallel SRS transmissions; a capability of supporting specific releases of an LTE standard; a capability of a transmission combination; a combination thereof, and/or the like. In an example implementation, the first capability may be communicated to the base station implicitly or explicitly using one or more parameters in an RRC radio capability message. The first capability may be implicitly determined according to the features or other capability of the wireless device. For example, a UE transmitting a radio capability message to a base station that indicates that the UE supports multiple TAG configuration may have the first capability.

In an example, user terminals (e.g. UE1, and/or UE2) communicating with an eNB may have different sets of capabilities or may have different sets of LTE features. For example, UE2 may be capable of supporting configurations of multiple timing advance groups, and UE1 may not be capable of supporting configurations of multiple timing advance groups. An eNB may transmit an RRC messages and/or PDCCH orders to the user terminals (e.g. UE1, and/or UE2) in unicast messages. RRC messages and/or PDCCH orders may order (and/or configure) transmission of type 0 and/or type 1 SRS signals for UE1 and UE2. The user terminals (e.g. UE1, and/or UE2) may perform different functions in response to the RRC messages and/or the PDCCH orders for transmission of type 0 and/or type 1 SRS messages. The order (RRC or PDDCH) for transmission of type 0 or type 1 SRS signals may be processed differently by UE1 and UE2. For example, in a scenario, UE1 may consider transmissions of PUCCH and/or PUSCH signals as a factor in enabling transmission of an SRS in the same subframe as described in this disclosure. UE1 may not transmit a PUSCH and an SRS in the same subframe. UE2 may have more freedom in transmission of SRS signals (and drop less SRS signals) and may transmit SRS signals simultaneous with uplink PUSCH and/or PUCCH channel signals when UE2 is not limited in transmission power. Therefore, the RRC or PDCCH order for transmission of type 0 and/or type 1 SRS signals may be processed differently by different UEs configured differently.

According to some of the various aspects of embodiments, a wireless device may receive at least one radio resource control message from a base station. The at least one radio resource control message may be configured to cause in the wireless device configuration of a primary cell and at least one secondary cell in a plurality of cells. The at least one radio resource control message may be configured to cause in the wireless device configuration of transmissions of sounding reference signals by the wireless device. The transmission of sounding reference signal may be triggered by one of the RRC messages or one or more PDCCH orders. A sounding reference signal (SRS) may be configured to be transmitted in the last symbol of a first subframe on a first cell in the plurality of cells. An SRS configured for transmission may be transmitted or dropped depending on other parallel transmissions by the wireless device. Transmission of the sounding reference signal may be triggered by receiving one or more PDCCH packets or one or more of the at least one radio resource control message. The configuration of the sounding reference signal may indicate a transmission period of sounding reference signals.

In one example embodiment, we consider parallel transmission of PUCCH and/or PUSCH signals/packets with the SRS transmission and no random access preamble may be transmitted in the last symbol in parallel other signals. The wireless device may transmit at least one packet on at least one second cell in the plurality of cells in a plurality of symbols of the first subframe. The plurality of symbols may comprise the last symbol of the first subframe. The wireless device may transmit the sounding reference signal if the following conditions are satisfied: the at least one radio resource control message further causes in the wireless device configuration of a plurality of cell groups; the wireless device has sufficient power to transmit the sounding reference signal and the at least one packet; and the first cell is different from the at least one second cell. The wireless device may drop the sounding reference signal in the last symbol if the wireless device is not configured with a plurality of cell groups. In this example embodiment, parallel transmission of SRS with other signals may be supported when multiple TAGs are configured. If UE is not configured with multiple TAGs, then SRS and PUSCH/PUCCH may not be transmitted in parallel. If UE is configured with multiple TAGs, then SRS and PUSCH/PUCCH may be transmitted in parallel from different serving cells of the same TAG or different TAGs. The rule may be extended to a scenario when multiple SRSs are configured for transmission. Each of the SRS signals may follow the example rule. The power limitations may apply to SRS signals that may be transmitted when UE has sufficient power. For example, a UE may drop all SRS signals when UE does not have sufficient power to transmit all of them in the last symbol. Or a UE may drop a first subset of SRS signals, and transmit a second subset of SRS signals if UE has sufficient power to transmit the second subset of SRS signals in parallel with other signals. A packet in the at least one packet is at least one of the following: a physical uplink control channel packet; and a physical uplink shared channel packet.

According to some of the various aspects of embodiments, the transmission rule may be extended for the case when a random access preamble is scheduled for transmission in symbols comprising the last symbol. When a random access preamble is transmitted in symbols of a cell of a TAG, no other signal may be transmitted in the same TAG in parallel with the random access preamble. The wireless device may drop the sounding reference signal in the last symbol if: the at least one radio resource control message further causes in the wireless device configuration of a plurality of cell groups; the wireless device has sufficient power to transmit both the sounding reference signal and the at least one packet; and a random access preamble is transmitted on symbols comprising the last symbol on a cell in a cell group comprising the first cell.

In an example embodiment, the wireless device may drop the sounding reference signal in the last symbol if: the at least one radio resource control message further causes in the wireless device configuration of a plurality of cell groups; and the wireless device has insufficient power to transmit both the sounding reference signal and the at least one packet. As discussed the rule may be extended to multiple sounding reference signals. The wireless device may give a transmission power of the sounding reference signal a lower priority compared with a priority of a transmission power of a random access preamble; and a priority of a transmission power of the at least one packet.

The wireless device may drop the sounding reference signal in the last symbol if: the at least one radio resource control message further causes in the wireless device configuration of a plurality of cell groups; the wireless device has sufficient power to transmit both the sounding reference signal and the at least one packet; and the first cell is in the at least one second cell.

According to some of the various aspects of embodiments, the at least one radio resource control message may further cause in the wireless device, assignment of each of the at least one secondary cell to one cell group in the plurality of cell groups if the at least one radio resource control message further causes in the wireless device configuration of a plurality of cell groups. A cell group in the plurality of cell groups may comprise a subset of the plurality of cells. Uplink transmissions of the wireless device in the cell group may employ a synchronization signal on an activated cell in the cell group as a timing reference.

According to some of the various aspects of embodiments, the wireless device may receive at least one radio resource control message from a base station. The at least one radio resource control message may be configured to cause in the wireless device configuration of: a primary cell and at least one secondary cell in a plurality of cells; and transmissions of sounding reference signals by the wireless device. A sounding reference signal may be configured to be transmitted on the last symbol in a first subframe on a first cell in the plurality of cells. An SRS configured for transmission may be transmitted or dropped depending on other parallel transmissions by the wireless device. Transmission of the sounding reference signal may be triggered by receiving one or more PDCCH packets or one or more of the at least one radio resource control message. The configuration of the sounding reference signal indicates a transmission period of sounding reference signals. A scenario is considered in which no random access preamble is configured for transmission in parallel with the last symbol of the first subframe.

The wireless device may transmit at least one packet on at least one second cell in the plurality of cells in a plurality of symbols of the first subframe. The plurality of symbols may comprise the last symbol of the first subframe. The wireless device may transmit the sounding reference signal if the following conditions are satisfied: the wireless device supports configuration of a plurality of cell groups; the wireless device has sufficient power to transmit the sounding reference signal and the at least one packet; and the first cell is different from the at least one second cell. The wireless device may drop the sounding reference signal in the last symbol if the wireless device does not support configuration of a plurality of cell groups.

In an example embodiment, the wireless device may drop the sounding reference signal in the last symbol if: the wireless device supports configuration of a plurality of cell groups; and the wireless device has insufficient power to transmit both the sounding reference signal and the at least one packet. As described in the specification, the rule may be extended to a scenario wherein many SRSs are configured for transmission in the last symbol. In an example embodiment, the wireless device may drop the sounding reference signal in the last symbol if: the wireless device supports configuration of a plurality of cell groups; the wireless device has sufficient power to transmit both the sounding reference signal and the at least one packet; and the first cell is in the at least one second cell. The wireless device may drop the sounding reference signal in the last symbol if: the wireless device supports configuration of a plurality of cell groups; the wireless device has sufficient power to transmit both the sounding reference signal and the at least one packet; and a random access preamble is transmitted in symbols comprising the last symbol on a cell in a cell group comprising the first cell. When no cell groups are configured, then all cells belong to the same primary cell group.

According to some of the various embodiments, when a UE is power limited, parallel transmission of SRS and PUCCH, PUSCH and/or PRACH signals may not be possible. One or some of the SRS, PUCCH, PUSCH and/or PRACH transmissions may be dropped or the transmit power of one or some of the SRS, PUCCH, PUSCH and/or PRACH transmissions may be reduced to address the limitations in the transmit power. There may be a need to define rules for parallel transmission of SRS, PUCCH, PUSCH and/or PRACH signals when a UE is power limited. Otherwise, the UE may exceed its transmission power or perform an unexpected behavior. There may be many different scenarios for such a parallel transmission, and a given scenario may require its own solution. Some examples of parallel transmission scenarios are listed below: s SRS+PRACH; s SRS+PUCCH; s SRS+k PUSCH; s SRS+PRACH+PUCCH; s SRS+PRACH+k; USCH; s SRS+PUCCH+k PUSCH; and s SRS+PRACH+PUCCH+k PUSCH.

According to some of the various embodiments, PUSCH and PRACH transmissions may be given a higher priority compared with SRS transmissions. Therefore, whenever a UE is power limited and an SRS configuration indicates parallel transmission of SRS(s) with PUSCH and or PRACH signals, some of the SRS transmissions may be dropped.

If a UE does not have enough power for transmission of s SRS, PRACH, and PUSCH signals; then PRACH and PUSCH signal transmissions may take higher priority over SRS signal transmission. In one example implementation, if a UE does not have enough power for simultaneous transmission, then the UE may not transmit any SRS signal and may drop the SRS transmission. This approach may be simple to implement, but may result in excessive SRS droppings. In a second example embodiment, if UE does not have enough power for parallel transmission of SRS(s) and other signals, then the UE may transmit s1 SRS signals on s1 cells, wherein s1 is smaller than s. s1 cells may be selected for SRS signal transmission from s cells. s1 SRS signals may be transmitted assuming that the UE has sufficient power to transmit s1 SRS signals in parallel with other signals (e.g. PUCCH, PUSCH, and/or PRACH signals). The selection of s1 cells among s cells for SRS transmission may be according to a predetermined rule. The predetermined rule may be, for example: s1 cells with smaller cell index; cells belonging to sTAG with smaller cell index; cells requiring lower power to transmit SRS; cells requiring higher power to transmit SRS and/or any other predetermined rule in the UE. The UE may drop s2 SRS signals and transmit s1 SRS signals in the same symbol. In this mechanism, some SRS signal(s) may be dropped. When a UE does not have sufficient power to transmit s SRS signals in parallel with other packets, the UE may at least transmit some of the SRS signals while dropping some others in the same symbol. The mechanism may be more efficient than dropping all the SRS signals in the UE when the UE is power limited during SRS transmission. This mechanism could be applied to intra-frame overlap (in the same or different TAGs) as well as inter-frame overlap of SRS signals in different TAGs. Reducing SRS dropping may increase spectral efficiency, since a base station may have more information about channel conditions when the base station receives more SRS signals from UEs. This mechanism is superior to other techniques, wherein a UE drops all parallel SRS transmissions in a symbol when UE is power limited in the symbol. If PRACH, PUCCH and/or k PUSCH signals are transmitted in parallel and their total transmit power exceeds $\hat{P}_{CMAX}(i)$ then, all overlapping SRS signal transmissions may be dropped.

According to some of the various aspects of embodiments, to determine the priority of SRS transmission when a PUCCH is transmitted, the following scenarios may be considered: s SRS+PUCCH; s SRS+PUCCH+PRACH; s SRS+PUCCH+k PUSCH; and s SRS+PUCCH+PRACH+k PUSCH.

According to some of the various aspects of embodiments, if a shortened version of a PUCCH signal is used, transmission of an SRS signal and a PUCCH signal may not overlap. In one example embodiment, a PUCCH transmission may take a higher priority than an SRS transmission. Therefore, in power scaling (or power reduction, or signal dropping) rules, the following priorities may be considered: PRACH>PUCCH>PUSCH with UCI>PUSCH>SRS.

If a UE does not have enough power for transmission of s SRS, a PRACH, PUCCH and PUSCH signals, then PRACH, PUCCH and PUSCH transmissions may take priority over SRS signal transmissions. In one example implementation, if a UE does not have enough power for simultaneous transmission, then the UE may not transmit any SRS signal and may drop SRS transmissions.

When multiple TAGs are configured in an LTE release 11 or above compliant UE, and when SRS transmission is scheduled in parallel with a PUCCH transmission, the SRS transmission may be dropped when there is a full overlap and/or partial overlap in transmission time. In this embodiment, the SRS transmission mechanism of first UEs may be different with the SRS transmission of second UEs. First UEs may support multiple-TAG capability and second UEs may not support multiple-TAG capability. First UEs may be configured with multiple TAGs and second UEs may not be configured with multiple TAGs.

According to some of the various embodiments, the UEs may not transmit PUCCH format 2 signals without a HARQ-ACK whenever a type 1 triggered SRS and PUCCH format 2 without HARQ-ACK transmissions happen to coincide in the same subframe. In this embodiment, UEs may drop SRS transmission when an SRS transmission would collide with a PUCCH transmission when there is an overlap between different TAGs and the UE does not have sufficient power.

In another example embodiment, a different rule may be adopted. If a UE configured with multiple TAGs does not have enough power for transmission of s SRS, PRACH, PUCCH and PUSCH signals, then transmission of PUCCH signals may take a higher priority than an SRS signal. An exception exists in at least the following scenario in which SRS transmission priority may be higher than PUCCH transmission priority: PUCCH Format A=PUCCH format 2 without HARQ-ACK transmissions; SRS Format B=Type 1 triggered SRS.

PUCCH Format A transmission may take a lower priority than SRS Format B transmission. Therefore, when Type 1 triggered SRS and PUCCH format 2 without HARQ-ACK transmission coincide and the UE is power limited, the UE may drop PUCCH signal transmission and may transmit Type 1 triggered SRS. In an example, the priorities may be defined according to the following: PRACH>PUCCH (except PUCCH Format A)>PUSCH with UCI>PUSCH>Type 1 triggered SRS>PUCCH Format A>Type 0 Triggered SRS.

In another example embodiment, an SRS signal may be dropped if there is not enough power according to priorities assigned to channels. The mechanisms may be triggered if there is an inter-frame overlap between SRS and other signals.

According to some of the various embodiments, a wireless device may receive at least one radio resource control message from a base station. The at least one radio resource control message may be configured to cause in the wireless device configuration of transmissions of sounding reference signals by the wireless device. n sounding reference signals are configured to be transmitted in a first subframe, n being greater than 1. Each sounding reference signal is configured for transmission on a different cell from other sounding reference signals. The wireless device may transmit at least one packet on at least one first cell in the plurality of cells in a plurality of symbols of the first subframe. The plurality of symbols may comprise the last symbol of the first subframe. The wireless device may transmit a k subset of the n sounding reference signals in the last symbol, wherein 1<=k<n. The k subset of SRSs are transmitted on k cell(s). The wireless device may drop an m subset of the n sounding reference signals in the last symbol, wherein 1<=m<n. Each of the sounding The wireless device has sufficient power to transmit in parallel both the k subset of the n sounding reference signals and the at least one packet. The wireless device has insufficient power to transmit in parallel the k subset of the n sounding reference signals, the m subset of the n sounding reference signals, and the at least one packet. The wireless device may drop one or more of the sounding reference signals, but the wireless device may drop one or more sounding reference signals because it is power limited.

In an example embodiment, if UE has enough power for transmission of s SRS signal and preamble transmission on an SCell, UE may transmit SRS signal on s uplink carriers. If UE does not have enough power for transmission of s SRS signal and preamble, then preamble transmission may take priority over SRS signal transmission. Three implementation examples are provided. In one example implementation, if UE does not have enough power for simultaneous transmission of preamble and s SRS signals, then UE may not transmit any SRS signal and may transmit the preamble. In a second example embodiment, if UE does not have enough power for simultaneous transmission of preamble and s SRS signals, then UE may transmit preamble and s1 SRS signals on s1 cells, wherein s1 is smaller than s. S1 cells may be selected for SRS signal transmission from s cells. The selection of s1 cells among s cells for SRS transmission, may be according to a predetermined rule. The predetermined rule may be such as: s1 cells with smaller cell index, or cells belonging to sTAG with smaller cell index, or any other predetermined rule in the UE. In a third example embodiment, power scaling may be used for transmission of s SRS signals. SRS signal power may be scaled down, so that transmission of s SRS signal and preamble signal do not exceed UE allowed transmission power. If the total transmit power of the UE for the Sounding Reference Symbol would exceed $\hat{P}_{CMAX}(i)$, the UE may scale $\hat{P}_{SRS,c}(i)$ for the serving cell c in subframe i such that the condition $$\sum_c w(i) \cdot \hat{P}_{SRS,c}(i) \le \left(\hat{P}_{CMAX}(i) - \hat{P}_{PRACH}(i)\right)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in subframe i and w(i) is a scaling factor of $\hat{P}_{SRS,c}(i)$ for serving cell c where $0<w(i)\leq 1$. Other functions in addition to linear value may be supported. For example, average power, and/or the like. In an example, w(i) values may be the same across serving cells, in which w(i) is not zero.

The wireless device may also drop some of the SRS signal(s) for other reasons. The wireless device may drop a sounding reference signal in the n sounding reference signals if: the wireless device has sufficient power to transmit both the sounding reference signal and the at least one packet; and the sounding reference signal is configured to be transmitted on a cell in the at least one first cell. The wireless device may drop the sounding reference signal in the last symbol if: the wireless device has sufficient power to transmit both the sounding reference signal and the at least one packet; and the sounding reference signal is configured to be transmitted on a cell in parallel with a random access preamble transmitted on the cell or another cell in the same cell group.

Transmission of the sounding reference signal may be triggered by receiving a PDCCH packet or one or more of the at least one first radio resource control message. The configuration of the sounding reference signal may indicate a transmission period of the sounding reference signals. The wireless device may give a transmission power of the sounding reference signal a lower priority compared with: a priority of a transmission power of a random access preamble; and a priority of a transmission power of the at least one packet. A packet in the at least one packet is at least one of the following: a physical uplink control channel packet; and a physical uplink shared channel packet.

The at least one radio resource control message may be configured to cause in the wireless device configuration of a primary cell and at least one secondary cell in a plurality of cells. The at least one radio resource control message may be configured to cause in the wireless device assignment of each of the at least one secondary cell to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell.

Figure 14:
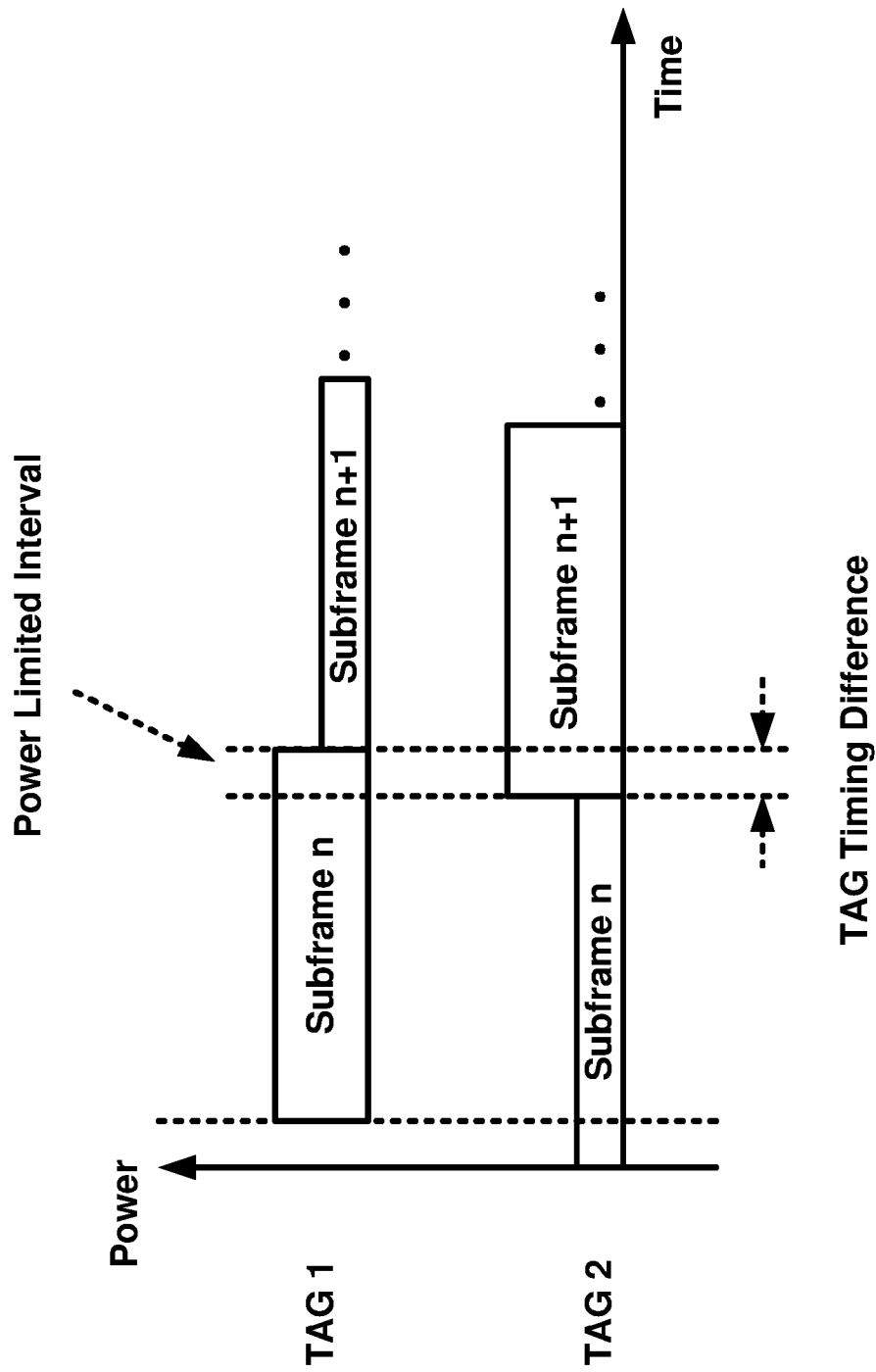
FIG. 14 is an illustration of power limitations during timing overlap between different subframes from different TAGs as per an aspect of an embodiment of the present invention.

According to some of the various embodiments, within transition periods (overlap periods) where one carrier is transmitting subframe n but another carrier has already begun transmitting subframe n+1, terminal power limitations may arise. Even though the scheduling assignments may not lead to any power limitation during the periods where carriers transmit the same subframe, power may not be sufficient in the transition periods if one cell increases its requested power but another cell has not yet started transmitting the next subframe. FIG. 14 is an illustration of power limitations during a timing overlap period between different subframes from different TAGs as per an aspect of an embodiment of the present invention. The sum of the power of subframe n in TAG1 and the power of subframe n+1 in TAG2 may be more than the maximum allowed transmission power of the wireless device. In FIG. 14, power levels for subframes are shown to be fixed for simplicity. During the transient period, for example at the two ends of each subframe, transmission power may change. For example, if a subframe duration is 1 msec and a transient period duration is 20 micro-sec., then the transmit power may be substantially fixed during the subframe, except during the transient period where the power may substantially. In another example embodiment, transient periods may also be defined at slot boundaries near or at the middle of a subframe.

Figure 15:
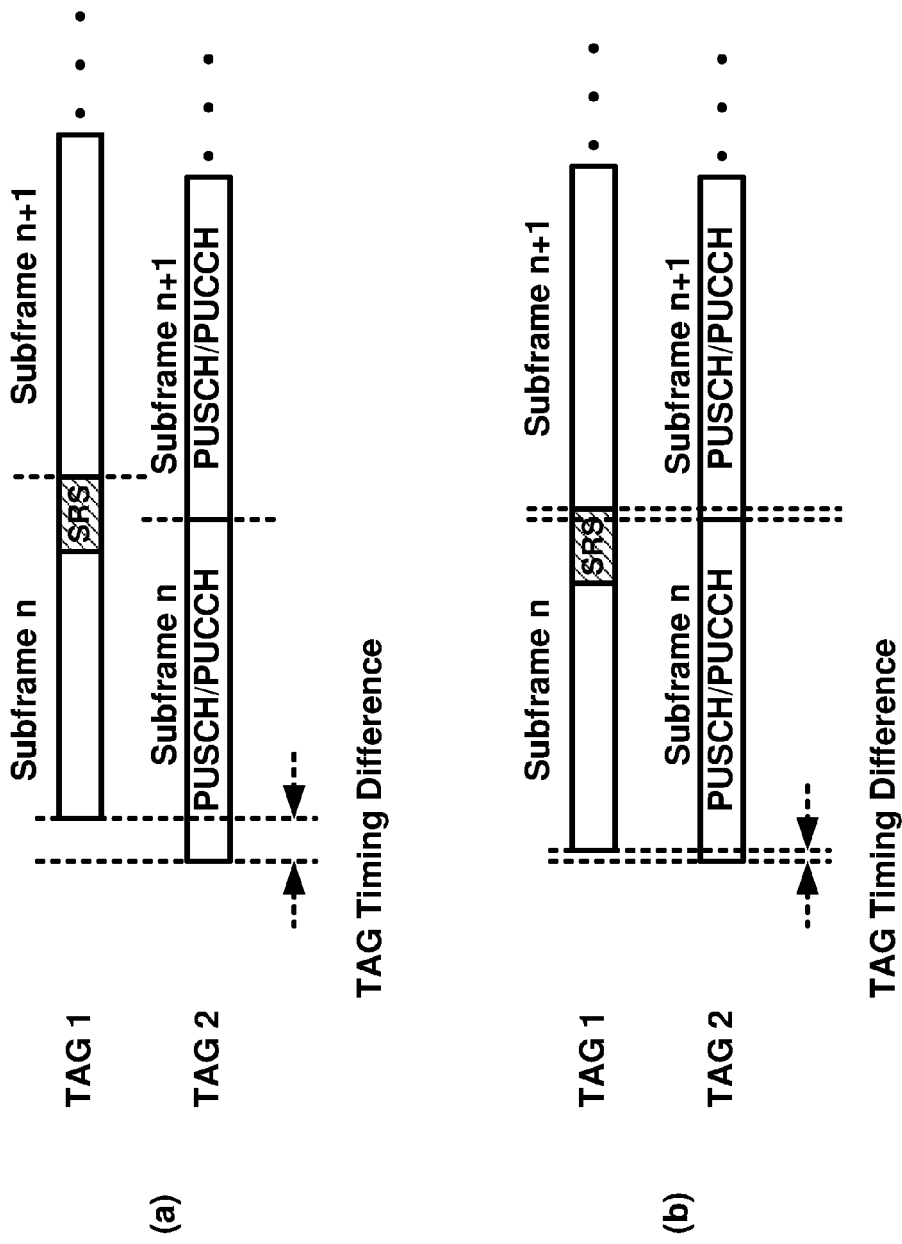
FIG. 15 is an example illustration of parallel transmission of SRS and PUCCH/PUSCH as per an aspect of an embodiment of the present invention.

FIG. 15 is an illustration of power limitations during a timing overlap between an SRS signal and a PUCCH and/or PUSCH signal as per an aspect of an embodiment. The overlap between PUCCH and/or PUSCH transmission and SRS transmission from other TAGs may be in the range of, for example, one micro-second to tens of micro-seconds. A rule may be defined for parallel transmission of PUCCH and/or PUSCH and SRS signals when there is an overlap between an SRS transmission in one TAG and PUSCH/PUCCH transmissions in another TAG. According to some of the various aspects of embodiments, PUCCH and/or PUSCH signal transmissions may be assigned a higher priority compared with SRS signal transmissions. The example is shown for two TAGs and two cells, but other similar examples may be provided with more than two TAGs and/or one or more cells in each TAG. The rules provided here may be generalized to cover those scenarios.

A UE may support parallel transmission of SRS with other signals, for example, PUCCH, PUSCH, and/or PRACH according to certain transmission rules. For example, a UE configured with multiple TAGs, or a UE with capability of multiple TAG configurations may support parallel transmission of SRS with other signals. Some other UEs, for example, UEs supporting release 10 or lower may not support parallel transmission of SRS with other signals. We focus our discussion here on UEs that have the capability of transmitting SRS with other signals according to certain transmission rules.

If the SRS transmission of the wireless device in a symbol on subframe n for a given serving cell in a TAG overlaps with the PUCCH/PUSCH transmission on subframe n or subframe n+1 for another serving cell in the same or another TAG, the wireless device may drop SRS if its total transmission power exceeds the maximum allowable transmission power on any overlapping period of the symbol. This rule may be generalized covering scenarios with multiple cell SRS transmissions and multiple cell PUSCH and/or PUCCH transmissions. If the SRS transmission of the wireless device in a symbol on subframe n for a given serving cell overlaps with the SRS transmission on subframe n on other serving cell(s) and with PUSCH/PUCCH transmission on subframe n or subframe n+1 for another serving cell(s) the wireless device may drop the SRS transmissions if the total transmission power exceeds the maximum allowable transmission power on any overlapping period of the symbol.

If the transmission overlap between PUCCH and/or PUSCH(s) and SRS signals is below a second time period, during the overlap the power may be below the UE maximum allowed transmission power even if sum of SRS symbol and PUCCH/PUSCH subframe transmission power may exceed the UE maximum allowed transmission power. During the transient period, the UE may reduce its transmission power to a lower level compared with the transmission power during the non-transient period of a symbol or a subframe. In this case, even though SRS and PUCCH/PUSCH transmission power may exceed the UE maximum allowed transmission power, the UE may not drop the SRS signal and may transmit both SRS signal and PUSCH signals. As described before this may be applied when more than one cell transmit SRS signal and more than one cell transmits PUCCH and/or PUSCH.

If the transmission overlap between PUCCH and/or PUSCH and SRS signals is relatively large, then the SRS signals may be dropped if sum of SRS symbol power and PUCCH/PUSCH subframe transmission power exceeds the UE maximum allowed transmission power. In an example implementation, if sum of SRS symbol power and PUCCH/PUSCH subframe transmission power exceeds the UE maximum allowed transmission power and overlap between PUCCH and/or PUSCH and SRS signals exceeds a first period, the SRS may be dropped. In an example implementation, if sum of SRS symbol power and PUCCH/PUSCH subframe transmission power exceeds the UE maximum allowed transmission power and overlap between PUCCH and/or PUSCH and SRS signals is below a second period, the SRS may be transmitted. The second period may be below the transient period. The UE may reduce transmission power of SRS and/or PUCCH/PUSCH signals during the transient period to overcome power limitations, and the UE may not drop the SRS signal. The process of using reduced power during transient periods to reduce SRS dropping may increase spectral efficiency. The more base station receives SRS signals, the better it may estimate wireless channel characteristics. The UE may not restrict itself in calculating total transmission power by summing SRS symbol power and PUSCH/PUCCH subframe power whenever there is an overlap of any size. The UE may take advantage of reduced power during transient period to ensure the total power is below the maximum power during any period of time, while summation of SRS symbol power and PUSCH/PUCCH subframe power may exceed the power limit.

A UE receiver may cope with a relative propagation delay difference up to a certain limit, for example 30 μs, among the component carriers to be aggregated (e.g. in inter-band non-contiguous CA). The base station time alignment may be up to a certain limit, for example 1.3 μs. In an example, a UE may cope with a delay spread of up to 31.3 μs among the component carriers monitored at the receiver.

In this solution, an SRS dropping operation may be applied to SRS signals when the TAG timing difference is relatively large and the UE cannot ensure power constraints by adjusting transient period transmission power. The power constraint is that the total transmission power should not exceed the maximum allowable transmission power on any overlapping period of the symbol.

In examples presented in FIG. 15(a) and FIG. 15(b), a sum of SRS symbol power in subframe n and subframe PUSCH/PUCCH power in subframe n+1 may exceed the maximum allowable transmission power. An SRS signal may be dropped in FIG. 15(a). The UE may not be able to comply with power constraints when the overlap period is larger than a first period. For example, the overlap period in FIG. 15(a) may be 25 micro-seconds or more. The UE may drop SRS signal in FIG. 15(a). The UE may transmit SRS signal in FIG. 15(b). The UE may comply with power requirements by reducing SRS and/or PUSCH/PUCCH during the transient period. The partial overlap in FIG. 15(b) may be below a second period.

Figure 16:
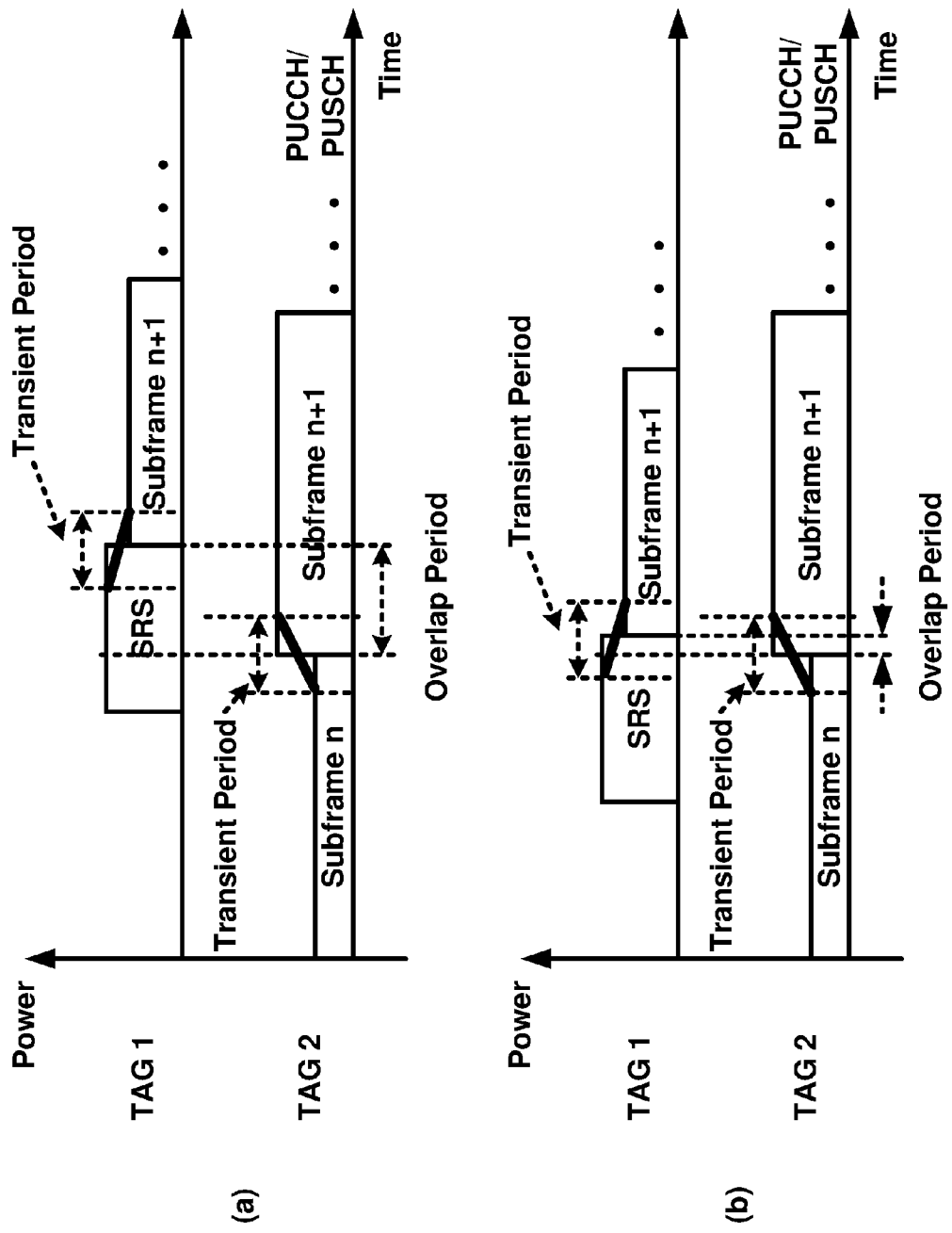
FIG. 16 is an example illustration of parallel transmission of SRS and PUCCH/PUSCH, and transient period as per an aspect of an embodiment of the present invention.

FIG. 16 provides a more detailed illustration of FIG. 15. In FIG. 16 (a), UE may drop SRS signal. UE may exceed its transmission power even though it may reduce its power during the transient period. In FIG. 16(b) UE may transmit SRS in subframe n in TAG1 and PUCCH/PUSCH in subframe n+1 in TAG2, even though the sum of SRS symbol power and PUCCH/PUSCH power exceeds UE total power. UE may comply with power requirements by reducing its power during the transient period. Other examples may be provided with different power levels and overlap periods.

To test an example operation as described in FIG. 15 and FIG. 16, a test set up may be implemented, in which the TAG timing difference (or overlapping period) is increased from a small period to a large period. The UE may be configured to transmit SRS on TAG1 and PUSCH/PUCCH on TAG2. The UE may be put in a power limited condition (e.g. by increasing the attenuation of the channel pathloss). As the TAG timing difference increases the probability of SRS dropping may also increase. For small TAG timing difference, UE may comply with power requirements by reducing transient period power. For a large TAG timing difference, a UE may drop SRS signals more often to comply with power requirements. If base station scheduling operation can be configured, the test plan may also consider designing packet scheduling with SRS transmission to better determine the operation of the disclosed mechanisms.

When SRS symbol power and PUCCH/PUSCH subframe power are considered for power calculations, the SRS signal may be dropped or reduced even if the partial overlap is small compared with symbol duration. This operation may require a simple process in the UE, but may increase SRS dropping in the system. When the first period is above zero, for example 1, 5, 10, 30 or more micro seconds, the SRS dropping possibility may decrease. The first period (as well as the second period) may not be a fixed period, and depending on UE configuration, position, power requirements, channel behavior, the first period may change. In another example, the threshold may be in the range of a cyclic prefix of a symbol. In urban deployments, for example when a cell radius is small and in scenarios wherein TAG timing difference is small compared with transient period, SRS dropping may be reduced by reducing the power in the transient period. When there is an overlap above a period between SRS and PUCCH and/or PUSCH transmissions and the SRS symbol power and PUCCH/PUSCH may become an important factor in total power calculations, and the SRS signal may be dropped. The reduction of power during transient period may reduce the possibility of SRS dropping and increase system efficiency. An eNB may employ SRS signals for channel estimation, and reduction of the SRS dropping (or power reduction) may increase eNB air interface efficiency. In an example embodiment, power reduction during the transient period may not always eliminate SRS dropping because of inter-frame overlap power limitations, but it may reduce the possibly of SRS dropping when the overlap period is relatively small.

The same mechanism may be applied to a scenario, wherein SRS(s) are transmitted in parallel with a PRACH signal. The sum of SRS, PRACH, and/PUCCH/PUSCH power may exceed maximum allowed power. The wireless device may transmit PRACH in a secondary serving cell in parallel with SRS transmission in a symbol on a subframe of a different serving cell belonging to a different TAG. The wireless device may drop an SRS if the total transmission power exceeds the maximum allowed limit on any overlapped period in the symbol. When the overlap period is small (for example compared with the transient period), the UE may reduce transmission power during the transient period and may transmit SRS, and PRACH and reduce the possibility of SRS dropping.

According to some of the various embodiments, a wireless device may receive at least one radio resource control message from a base station. The at least one radio resource control message may cause in the wireless device configuration of a plurality of cells comprising a primary cell and at least one secondary cell and assignment of each of the at least one secondary cell to a cell group in a plurality of cell groups. The at least one radio resource control message may cause in the wireless device configuration of transmissions of sounding reference signals by the wireless device. Each of the plurality of cell groups may comprise a subset of the plurality of cells.

The wireless device may decode an information element in a received control message indicating transmission of one of the sounding reference signals in a symbol on subframe n on a first cell in a first cell group in the plurality of cell groups. The information element may be in one of the following: the at least one radio resource control message; and a physical downlink control channel packet. The symbol may overlap in time with transmission of an uplink packet on at least one of: subframe n in a second cell, the second cell in a second cell group in the plurality of cell groups; and subframe n+1 in the second cell. The first cell group may be different from the second cell group.

The wireless device may transmit the one of the sounding reference signals if a power parameter is less than a maximum allowable transmission power in the symbol. A calculation of the power parameter may consider transmission power of the uplink packet if the overlapping in time exceeds a first duration. SRS symbol power may have a lower power priority compared with PUCCH and/or PUSCH signal powers. In an example embodiment, the overlapping period may be more than the transient period (e.g. twenty micro seconds). If the overlap is smaller than the first period, the wireless device may or may not consider transmission power of the uplink packet depending on many factors. For example, if the wireless device is able to avoid SRS dropping by reducing the transmission power during the transient period, the wireless device may not consider transmission power of the uplink packet in power calculations. The transmission power of uplink packet refers to subframe transmission power.

The calculated power parameter may a total transmission power of the wireless device. The wireless device may determine the first duration such that the total transmission power is less than or equal to the maximum allowable transmission power of the wireless device during the overlapping in time.

The wireless device may limit the total transmission power to the maximum allowable transmission power of the wireless device during the overlapping in time. The wireless device may transmit a reduced transient transmission power (compared with subframe power) of at least one of the uplink packet and the sounding reference signal during the overlapping in time. The overlap in time may be less than the first duration.

The wireless device may drop the one of the sounding reference signals if the calculated power parameter is greater than the maximum allowable transmission power in the symbol. The calculation may ignore transmission power of the uplink packet if the overlapping in time is smaller than a second duration. The wireless device may transmit SRS signal even though the sum of SRS symbol signal and PUCCH/PUSCH (uplink packet(s)) subframe transmission power exceeds the maximum allowable transmission power, if the overlapping in time is smaller than a second duration. The wireless device may comply with the power requirements considering that the transient power is smaller than the symbol or subframe power. The second duration may be less than or equal to the first duration. The uplink packet is transmitted on one of a physical uplink control channel; and a physical uplink shared channel. The wireless device may reduce a transient transmission power (compared with subframe and/or symbol transmission power) of at least one of the uplink packet and the sounding reference signal during the overlapping in time. The overlapping in time may be less than the second duration.

According to some of the various embodiments, within transition periods (overlap periods) where one carrier is transmitting subframe n but another carrier has already begun transmitting subframe n+1, terminal power limitations may arise. Even though the scheduling assignments may not lead to any power limitation during the periods where carriers transmit the same subframe, power may not be sufficient in the transition periods if one cell increases its requested power but another cell has not yet started transmitting the next subframe. FIG. 14 is an illustration of power limitations during a timing overlap period between different subframes from different TAGs as per an aspect of an embodiment of the present invention. The sum of the power of subframe n in TAG1 and the power of subframe n+1 in TAG2 may be more than the maximum allowed transmission power of the wireless device. In FIG. 14, power levels for subframes are shown to be fixed for simplicity. During the transient period, for example at the two ends of each subframe, transmission power may change. For example, if a subframe duration is 1 msec and a transient period duration is 20 micro-sec., then the transmit power may be substantially fixed during the subframe except during the transient period where the power may change. In another example embodiment, transient periods may also be defined at slot boundaries near or at the middle of a subframe.

Figure 17:
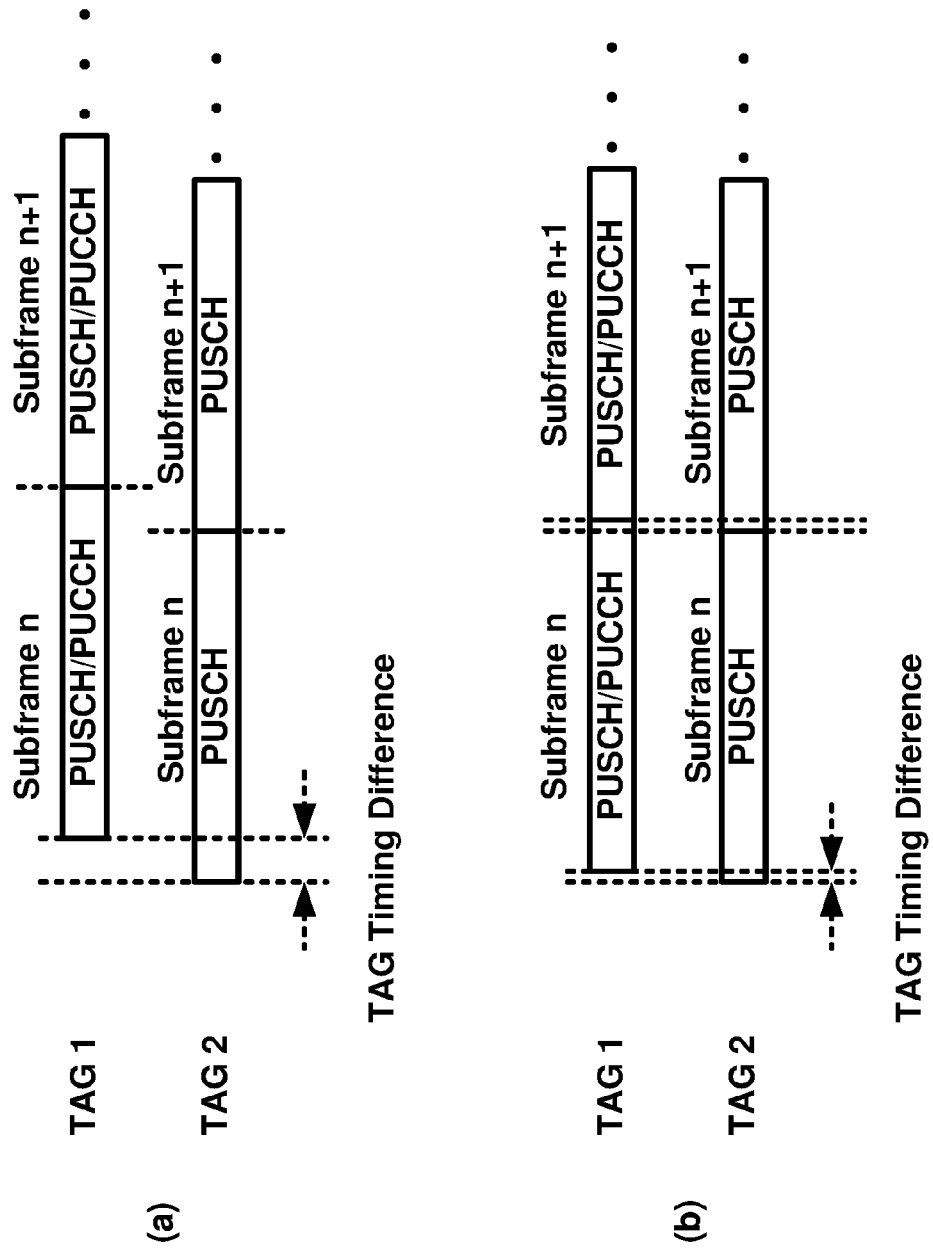
FIG. 17 is an example illustration of parallel transmission of PUCCH/PUSCH and PUSCH as per an aspect of an embodiment of the present invention.
Figure 18:
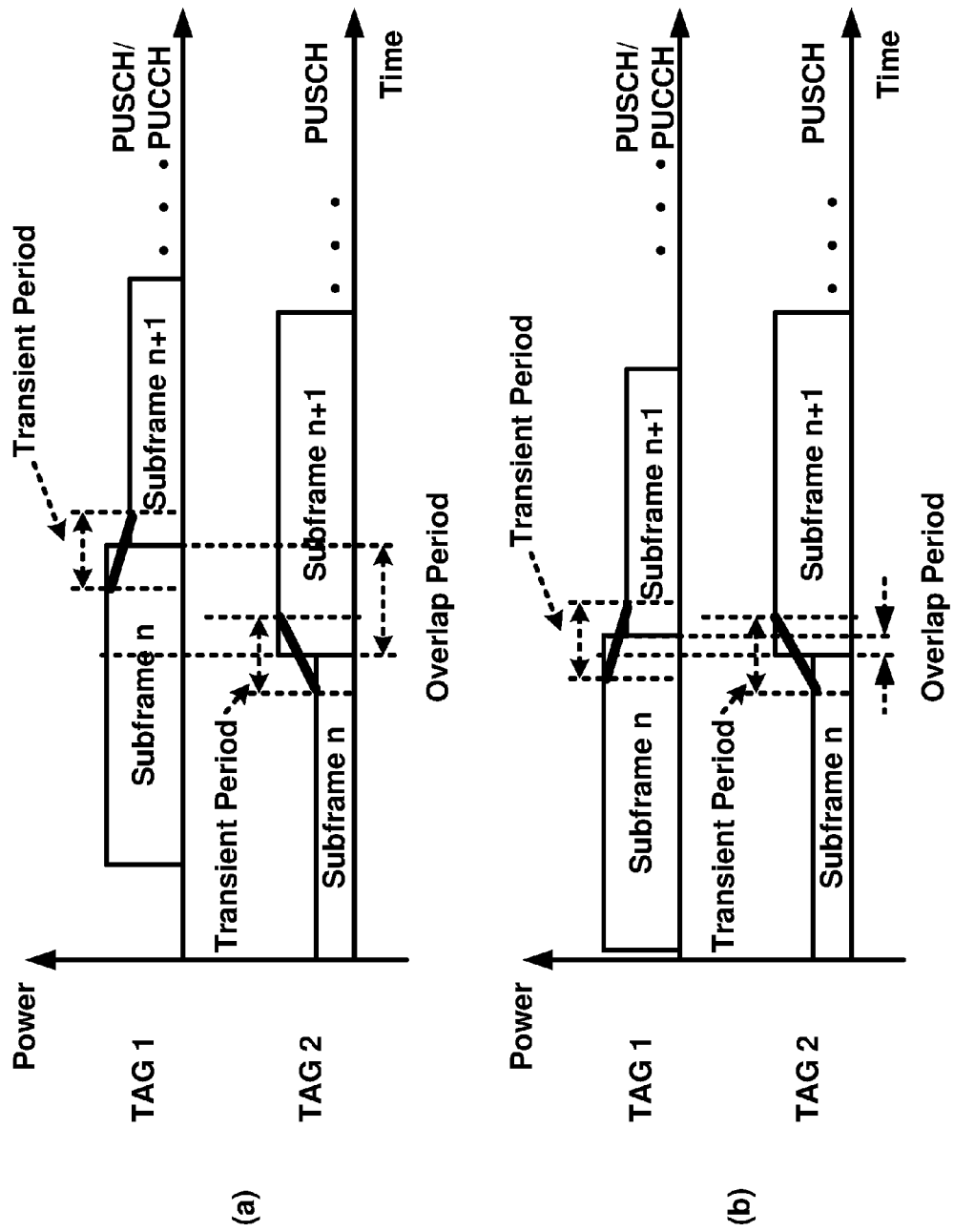
FIG. 18 is an example illustration of parallel transmission of PUCCH/PUSCH and PUSCH, and transient period as per an aspect of an embodiment of the present invention.

FIG. 17 and FIG. 18 are illustrations of power limitations during timing overlap periods between PUCCH and PUSCH transmissions or between two PUSCH transmissions as per an aspect of an embodiment of the present invention. The overlap period may be in the range of, for example, one micro-second to tens of micro-seconds. A rule may be defined for parallel transmission of PUCCH and PUSCH, or parallel transmission of PUSCHs when the UE is in a power limited scenario. According to some of the various aspects of embodiments, PUCCH signal transmission power may be assigned a higher power priority compared with PUSCH signal transmission power. The discussion below focuses on UEs configured with multiple TAGs.

If the PUCCH/PUSCH transmission of the wireless device on subframe n for a given serving cell in a TAG overlaps some period of the first symbol of the PUSCH transmission on subframe n+1 for a different serving cell in a different TAG, the UE may adjust its total transmission power to not exceed the maximum allowable transmission power on any overlapping period. If the PUSCH transmission of the wireless device on subframe n for a given serving cell in a TAG overlaps some period of the first symbol of the PUCCH transmission on subframe n+1 for a different serving cell in a different TAG, the wireless device may adjust its total transmission power to not exceed the maximum allowable transmission power on any overlapping period. This rule may be generalized covering scenarios with multiple cell PUSCH transmissions and/or multiple cell PUSCH and/or PUCCH transmission overlaps.

If the transmission overlap between PUCCH and/or PUSCH(s) signals is below a second time period, during the overlap the power may be below the UE maximum allowed transmission power even if the sum of the PUCCH and/or PUSCH(s) subframe transmission powers may exceed the UE maximum allowed transmission power. During the transient period, the UE may reduce its transmission power to a lower level compared with the transmission power during the non-transient period of the subframe. In this case, even though PUCCH and/or PUSCH transmission power may exceed the UE maximum allowed transmission power, the UE may not reduce PUSCH subframe transmission power.

If the transmission overlap between PUCCH and/or PUSCH signals is relatively large, then PUSCH subframe transmission power may be reduced if the sum of the PUCCH and PUSCH(s) subframe transmission powers exceed the UE maximum allowed transmission power. In an example implementation, if the sum of the PUCCH and PUSCH(s) subframe transmission powers exceed the UE maximum allowed transmission power and overlap between the PUCCH and/or PUSCH signals exceeds a first period, the PUSCH subframe transmission power may be reduced. In an example implementation, if sum of the PUSCH(s) subframe transmission power and the PUCCH subframe transmission power exceeds the UE maximum allowed transmission power and overlap between the PUCCH and/or PUSCH(s) signals is below a second period, the PUSCH may be transmitted without its subframe power being reduced. The second period may be less than the transient period. The UE may reduce transmission power of the PUCCH and/or PUSCH(s) signals during the transient period to overcome power limitations, and the UE may not reduce (scale down) PUSCH subframe transmission power. The process of using reduced power during transient periods to reduce PUSCH subframe power reduction may increase spectral efficiency and reduce bit error rates. The UE may not restrict itself in calculating total transmission power by summing the PUSCH and/or PUCCH subframe power of different subframes regardless of the overlap period. The UE may take advantage of reduced power during a transient period to ensure the total power is below the maximum power during the overlapping period of time while the summation of the PUSCH and/or PUCCH subframe power may exceed the power limit.

A UE receiver may cope with a relative propagation delay difference up to a certain limit (e.g. 30 µs) among the component carriers to be aggregated (e.g. in inter-band non-contiguous CA). The base station time alignment may be up to a certain limit, for example 1.3 µs. In the example, a UE may cope with a delay spread of up to 31.3 µs among the component carriers monitored at the receiver.

In examples presented in FIG. 17(a) and FIG. 17(b), a sum of the PUSCH/PUCCH subframe transmission power in subframe n and the PUSCH subframe transmission power in subframe n+1 may exceed the maximum allowable transmission power. A PUSCH subframe transmission power may be reduced (scaled down) in FIG. 17(a). The UE may not be able to comply with power constraints when the overlap period is more than a first period. For example, the overlap period in FIG. 17(a) may be 25 micro-seconds or more. The UE may reduce a PUSCH subframe transmission power signal in FIG. 17(a). The UE may not transmit with reduced PUSCH subframe transmission power FIG. 15(b). The UE may comply with power requirements by reducing the PUSCH/PUCCH transmission power during the transient period (compared with the subframe transmission power). The partial overlap in FIG. 15(b) may be below a second period.

FIG. 18 provides a more detailed illustration of FIG. 17. In FIG. 18 (a), the UE may reduce the PUSCH subframe transmission power. Without the PUSCH subframe power reduction, the UE may exceed its transmission power even though it may reduce its power during the transient period. In FIG. 18(b), the UE may transmit a PUCCH/PUSCH signal in subframe n in TAG1 and a PUSCH signal in subframe n+1 in TAG2, even though the sum of the PUSCH subframe transmission power in subframe n+1 and the PUCCH/PUSCH subframe transmission power in subframe n exceeds the UE total allowed transmission power. The UE may comply with power requirements by reducing its power during the transient period. Other examples may be provided with different power levels, overlap periods, more cells, more TAGs, and/or the like.

To test an example operation as described in FIG. 17 and FIG. 18, a test set up may be implemented in which the TAG timing difference (or overlapping period) is increased from a small period to a large period. The UE may be configured to transmit PUCCH signals on TAG1 and PUSCH signals on TAG2. The UE may be put in a power limited condition (e.g. by increasing the attenuation of the channel pathloss). As the TAG timing difference increases, the probability of reducing the PUSCH subframe transmission power may also increase. For small TAG timing differences, the UE may comply with power requirements by reducing a transient period power. For a large TAG timing difference, a UE may reduce the PUSCH transmission timing more often to comply with power requirements. In general, the channel priorities of the various signals may be considered as PUCCH>PUSCH with UCI>PUSCH.

A similar process may be implemented to comply with power requirements when there is an overlapping PRACH signal transmission with PUSCH signal transmission. If the UE is configured with multiple TAGs, the UE may transmit PRACH signals in a secondary serving cell in parallel with the transmission of PUSCH/PUCCH signals in a different serving cell belonging to a different TAG. The UE may adjust the subframe transmission power of the PUSCH/PUCCH signals so that its total transmission power does not exceed the maximum allowable transmission power on the overlapped period. When the overlapping period is smaller than a second period, the UE may comply with power requirements by reducing the transient period power of the PUSCH, PUCCH, and/or PRACH signals and may not need to reduce subframe transmission power of the PUSCH and/or PUCCH signal transmissions.

According to some of the various embodiments, the L1 random access procedure may encompass the transmission of a random access preamble and a random access response. The remaining messages may be scheduled for transmission by a higher layer on the shared data channel. A random access channel may occupy six resource blocks in a subframe or set of consecutive subframes reserved for random access preamble transmissions. The eNodeB may not be prohibited from scheduling data in the resource blocks reserved for random access channel preamble transmission.

The following steps may be required for the L1 random access procedure: 1) Layer 1 procedure may be triggered upon request of a preamble transmission by higher layers; 2) A preamble index, a target preamble received power (PREAMBLE_RECEIVED_TARGET_POWER), a corresponding RA-RNTI and a PRACH resource may be indicated by higher layers as part of the request; 3) A preamble transmission power PPRACH may be determined as PPRACH=min{$P_{CMAX,c}(i)$ PREAMBLE_RECEIVED_TARGET_POWER+$PL_c$}_[dBm], where $P_{CMAX,c}(i)$ may be the configured UE transmit power defined for subframe i of the primary cell and $PL_c$ is the downlink pathloss estimate calculated in the UE for the primary cell; 4) A preamble sequence may be selected from the preamble sequence set using the preamble index; 5) A single preamble may be transmitted using the selected preamble sequence with transmission power PPRACH on the indicated PRACH resource; 6) Detection of a PDCCH with the indicated RA-RNTI may be attempted during a window controlled by higher layers. If detected, the corresponding DL-SCH transport block may be passed to higher layers. The higher layers may parse the transport block and indicate a 20-bit uplink grant to the physical layer.

The setting of the UE transmit power for a physical uplink shared channel (PUSCH) transmission in the absence of a physical random access channel transmission and a PUCCH transmission on the same cell may be defined as follows. If the UE transmits the PUSCH signal without a simultaneous PUCCH signal for the serving cell c, then the UE may transmit with power $P_{PUSCH,c}(i)$ for PUSCH transmission in subframe i for the serving cell c given by:

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_C + \Delta_{TF,c}(i) + f_{c(i)} \end{array} \right\}$$

The setting of the UE Transmit power for a physical uplink shared channel (PUSCH) transmission in the presence of a physical random access channel transmission on an overlapping subframe in the same cell may be defined as follows. The UE transmit power $P_{PUSCH,c}(i)$ for the PUSCH transmission in subframe i for the serving cell c may be given by:

$$P_{PUSCH,c}(i) = \min \left\{ \begin{array}{l} 10\log_{10}(\hat{P}_{CMAX,c}(i) - \hat{P}_{PRACH}(i)), \\ 10\log_{10}(M_{PUSCH,c}(i)) + P_{O\_PUSCH,c}(j) + \alpha_c(j) \cdot PL_C + \Delta_{TF,c}(i) + f_{c(i)} \end{array} \right\}$$

[dBm]

The above formula may be applied when the amount of the power during overlap between transmissions of the random access preamble and the physical uplink shared channel may not be adjusted by reducing the power during the transient period.

If the UE transmits a PUSCH signal simultaneously with PUCCH and PRACH signals for the serving cell C, then the UE transmit power $P_{PUSCH,c}(i)$ for the PUSCH transmission in subframe i for the serving cell c may be given by:

$$P_{PUSCH,c}(i) = \min \left\{ \begin{array}{l} 10\log_{10}(\hat{P}_{CMAX,c}(i) - \hat{P}_{PUCCH}(i) - \hat{P}_{PRACH}(i)), \\ 10\log_{10}(M_{PUSCH,c}(i)) + P_{O\_PUSCH,c}(j) + \alpha_c(j) \cdot PL_C + \Delta_{TF,c}(i) + f_{c(i)} \end{array} \right\}$$

[dBm]

If $\hat{P}_{CMAX,c}(i) \leq \hat{P}_{PUCCH}(i) - \hat{P}_{PRACH}(i)$, then PUSCH signal may be dropped and may not be transmitted. PRACH transmission signal power and PUCCH transmission signal power may have a higher priority compared with PUSCH transmission power.

In some other example embodiments, a UE may drop any scheduled SRS, PUSCH, and/or PUCCH signals when the UE is instructed to transmit a random access preamble in parallel with SRS, PUSCH, and/or PUCCH signals in the same cell group. The above power control rules may not apply to a UE that is not configured to transmit a PRACH in parallel with an SRS, PUCCH, and/or PUSCH signal in the same cell or in the same cell group.

A wireless device may receive at least one radio resource control message from a base station. The at least one radio resource control message may cause in the wireless device: configuration of a plurality of cells comprising a primary cell and at least one secondary cell; and assignment of each of the at least one secondary cell to a cell group in a plurality of cell groups, each of the plurality of cell groups comprising a subset of the plurality of cells. The wireless device may receive a control command causing the wireless device to transmit a random access preamble on a random access channel of a first cell in a first cell group in the plurality of cell groups. The wireless device may transmit overlapping in time with transmission of the random access preamble an uplink packet on a first subframe of the first cell. Transmission power of the uplink packet may be calculated considering: a maximum allowable transmission power in the first subframe of the first cell; and transmission power of the random access preamble.

The calculation of transmission power of the uplink packet may comprise subtracting a calculated power of the random access preamble from the maximum allowable transmission power in the first subframe of the first cell if a summation of transmission powers of the uplink packet and the random access preamble in the first subframe of the first cell exceeds the maximum allowable transmission power. The maximum allowable transmission power may be for the first cell. Each cell in the plurality of cells may be assigned a maximum allowable transmission power. The uplink packet may be one of the following: a physical uplink shared channel data packet; and a physical uplink control channel control packet. The at least one radio resource control message may cause configuration of the random access channel. The control command may comprise an index of the random access preamble. In an example embodiment, the first cell group is a secondary cell group; and the first cell is a secondary cell in the secondary cell group.

Power control is an important aspect in wireless networks. Release 10 of the LTE technology standard provides power control mechanisms to control uplink transmission power of a wireless device employing many parameters including base station power control commands. The wireless device may calculate the transmission power for transmission of packets on each active carrier. The transmission power of each carrier may be calculated according to many parameters and may be limited to a preconfigured maximum value. The wireless device may reduce the transmission powers based on its total transmit power budget. Release 11 of the LTE technology standard may support configurations for multiple carrier groups. Each carrier group may have its own carrier timing. This may introduce various new challenges in controlling uplink transmission timing as well transmission power.

There may be a need for development of new processes for adjusting uplink timing of carriers in different carrier groups. There may also be a need for development of new processes for adjusting the uplink transmission power in different carrier groups. Some of the power control mechanisms in release 10 may not be applicable to an LTE radio interface supporting multiple carrier group configurations. When multiple TAGs are configured, random access processes may be defined for the primary carrier as well as secondary carrier(s). Random access processes may include random access preamble (RAP) transmissions and random access responses (RAR). Both RAP and RAR transmissions may impact power control processes. Random access preamble transmissions may be on a primary or secondary carrier with random access resources. Random access responses may be carried on the primary carrier. In LTE release 10, random access responses may only be related to random access preambles transmitted on the primary carrier. When multiple TAGs are configured, there may be a need to re-examine random access processes and related impact on power control mechanisms. There may be a need for improvements in power control mechanisms to integrate the power control mechanisms with various types of random access transmissions in a wireless network configured with multiple carrier groups.

Figure 20:
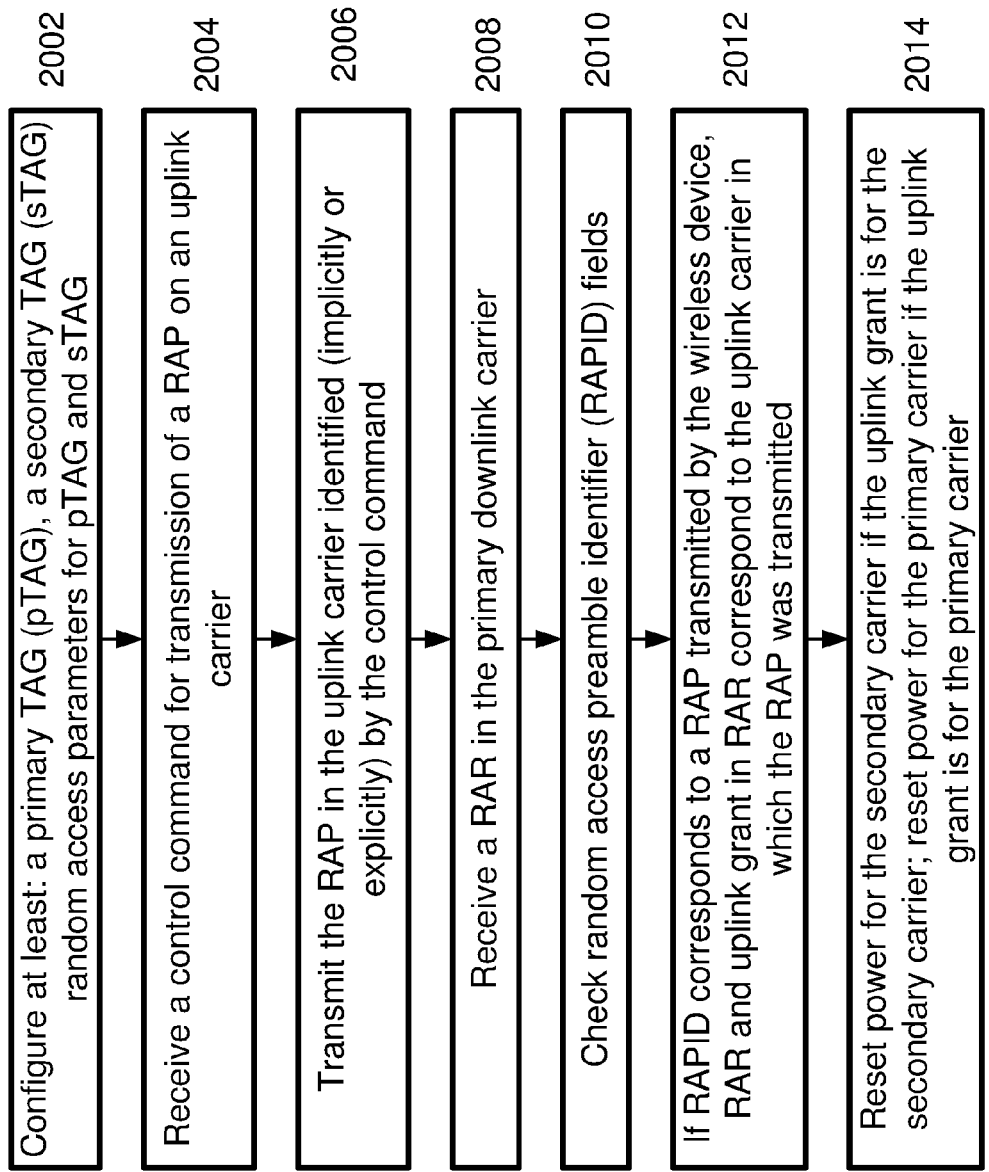
FIG. 20 depicts a flow chart showing the tasks performed in a wireless device as per an aspect of an embodiment of the present invention.

FIG. 20 depicts a flow chart showing tasks in a wireless device as per an aspect of an embodiment of the present invention. According to some of the various aspects of embodiments, a wireless device may receive from a base station, at least one first control message. The at least one first control message may include RRC control messages and may configure an RRC connection. The at least one first control message may cause configuration of a plurality of cells comprising a primary cell and at least one secondary cell at block 2002. Each of the plurality of cells may comprise a downlink carrier and zero or one uplink carrier. The configuration may assign a cell to a cell group. A cell group index may identify one of a plurality of cell groups. The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the at least one secondary cell. The at least one first control message may further cause configuration of a plurality of random access resource parameters. The random access resource parameters may identify random access resources for the primary cell and a first secondary cell in the secondary cell group. The at least one first control message may further cause configuration of power control accumulations for the first secondary cell.

The wireless device may receive a control command (PDCCH order) to transmit a random access preamble (RAP) on an uplink carrier at block 2004. The wireless device may transmit a RAP in the uplink carrier identified (implicitly or explicitly) by the control command at block 2006. If the PDCCH order includes a carrier index, the RAP may be transmitted on the carrier identified by the carrier index. If the PDDCH order does not include the carrier index, the RAP may be transmitted on the same carrier as the carrier for the PDCCH order. The wireless device may receive a random access response (RAR) on the primary cell at block 2008. The wireless device may decode and check the random access preamble identifier RAPID field in the RAR at 2010. If the wireless device determines that the RAPID corresponds to a RAP transmitted by the wireless device at block 2012, the RAR and the uplink grant in the RAR may correspond to the uplink carrier in which the RAP was transmitted. The wireless device may reset power for the secondary carrier if the uplink grant is for the secondary carrier at 2014. The wireless device may reset power for the primary carrier if the uplink grant is for the primary carrier at 2014.

Figure 19:
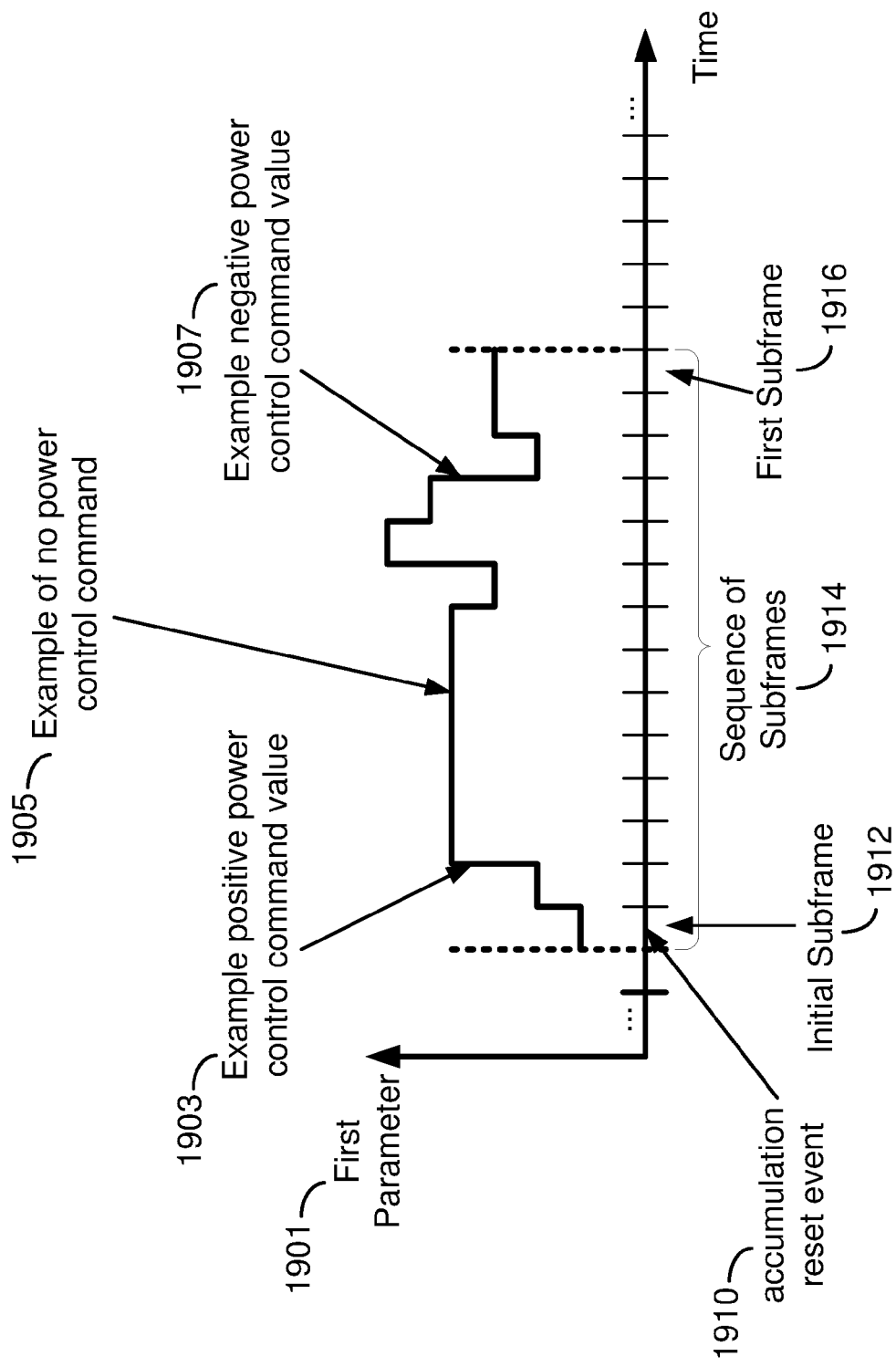
FIG. 19 depicts an example of the first parameter calculated over time as per an aspect of an embodiment of the present invention.

FIG. 19 depicts an example of first parameter 1901 calculated over time as per an aspect of an embodiment of the present invention. The wireless device receives a first control packet providing a first uplink grant to transmit a first uplink packet in a first subframe 1916 of a first secondary cell. The wireless device may compute transmission power of the first uplink packet employing, at least in part, a first parameter calculated by accumulation of an initial value and at least one power control value corresponding to a sequence of subframes 1914. The sequence of subframes may start from an initial subframe 1912 and may end with the first subframe 1916. The initial subframe 1912 may be identified by the most recent subframe before the first subframe 1916 with one of the following events 1910: a predefined transmit power parameter value updated by higher layers; and a random access response received corresponding to a transmitted random access preamble on the first secondary cell. 1903 illustrates an example of a positive power control (command) value, 1905 shows illustrates an example of no power control command (TPC value of zero), and 1907 illustrates an example of a negative power control (command) value. The wireless device may transmit the first uplink packet in radio resources identified by the first uplink grant.

Figure 21:
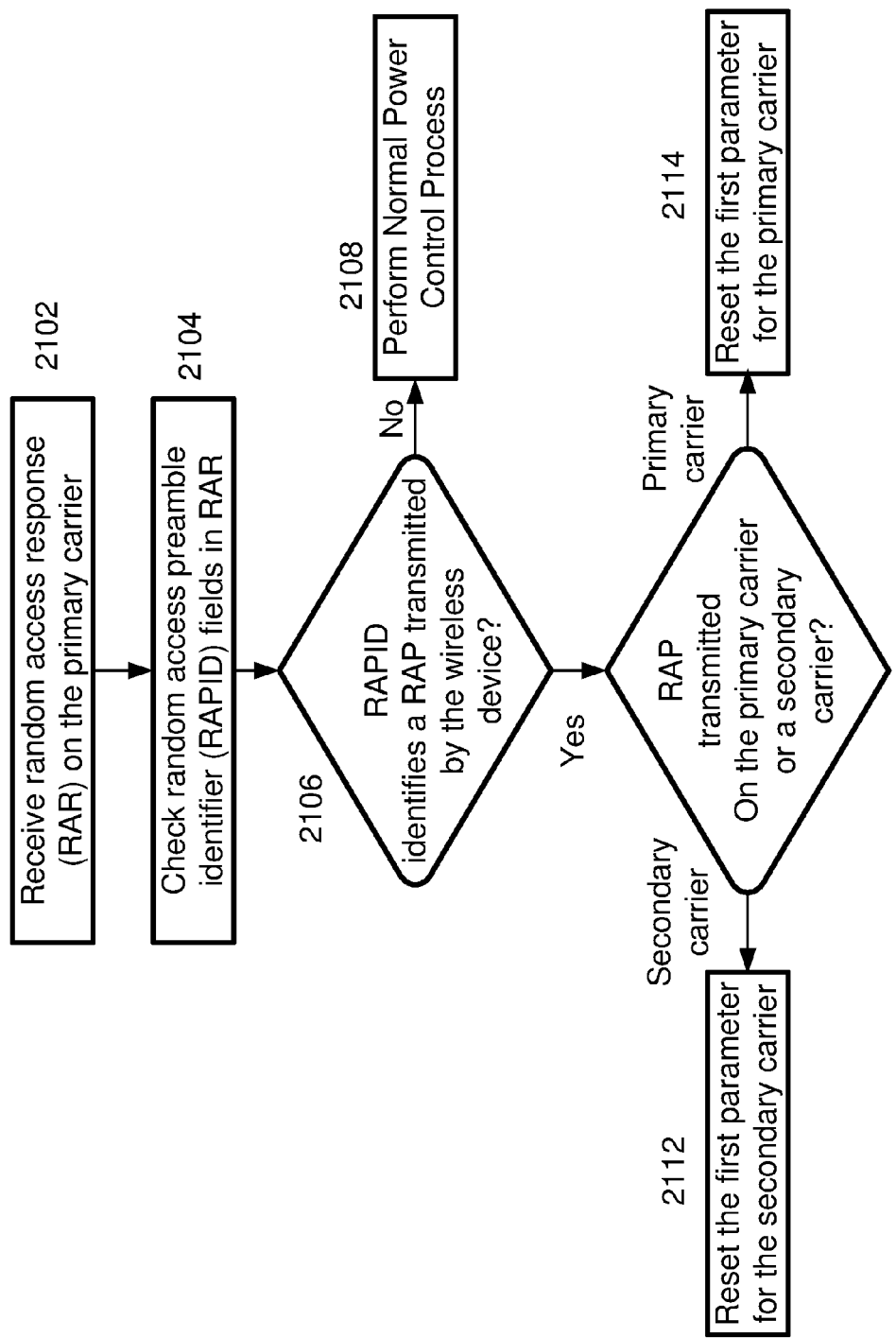
FIG. 21 a claim flow showing the tasks performed in a wireless device as per an aspect of an embodiment of the present invention.

FIG. 21 depicts a flow chart showing the tasks performed in a wireless device as per an aspect of an embodiment of the present invention. The wireless device may receive a RAR on the primary carrier at block 2102. The wireless device may not process the RAR or may not receive and/or decode the RAR if the wireless device is not currently in a random access process. The wireless device may check a RAPID field in the RAR at block 2104. The wireless device may identify whether the RAPID field identifies a RAP transmitted by the wireless device at block 2106. If the RAPID field does not identify a RAP transmitted by the wireless device, the wireless device may perform a normal power control process without resetting the power control process at block 2108. If the RAPID field identifies a RAP recently transmitted by the wireless device, the wireless device may decode the RAR. If the RAP was transmitted on the primary carrier, the wireless device may reset the first parameter for the primary carrier at 2114. If the RAP was transmitted on a secondary carrier, the wireless device may reset the first parameter for the secondary carrier at 2112.

The first control packet may comprise the first uplink grant and a first power control field. The first power control field may correspond to a first power control value. The first power control field may correspond with a pre-defined power control value, for example, according to a predefined table. Each subframe in the sequence of subframes may be assigned: the initial value; or one power control value in the at least one power control value. The initial subframe may be assigned the initial value. Other subframe(s) may be assigned a power control value (TPC value). If the sequence of subframes includes only one subframe, then the power of the one subframe may be set at the initial value.

A power control value in the at least one power control value corresponding to a subframe in the sequence of subframes may be zero if one of the following conditions is satisfied: no power control is received for the subframe; the wireless device has reached a maximum power in the subframe and the corresponding power control value is positive; and the wireless device has reached a minimum power in the subframe and the corresponding power control value is negative. A power control value in the at least one power control value corresponding to a subframe in the sequence of subframes may be zero if one of the following conditions is satisfied: the subframe is not an uplink subframe in a TDD frame structure; the wireless device has reached a maximum power in the subframe and the corresponding power control value is positive; and the wireless device has reached a minimum power in the subframe and the corresponding power control value is negative.

The wireless device may receive the predefined transmit power parameter value via a radio resource control protocol message. The initial value may be zero if the predefined transmit power parameter value is updated in the initial subframe. The initial value may be the sum of a power control value in the at least one power control value and an offset value if the random access response is received. The wireless device may reset the power control accumulation associated with a first uplink carrier of the first secondary cell if one of the events occurs. The offset value may correspond to a total power ramp-up from the first to the last preamble transmitted by the wireless device during a random access process corresponding to the random access response. The at least one first control message may cause configuration of power control accumulations for the first secondary cell. The first control packet may enable configuration of power control accumulations for the first secondary cell.

The first control packet may be received in PDCCH radio resources or EPDCCH radio resources. The first control packet may have a DCI format 0 according to an LTE physical layer standard. A CRC of the first control packet may be scrambled by a temporary C-RNTI according to an LTE physical layer standard. The first control packet may have one of the following formats according to an LTE physical layer standard: a DCI format 0; a DCI format 4; a DCI format 3; and a DCI format 3A. The first uplink grant may identify radio resources employed for transmission of the first uplink packet on a first uplink carrier of the first secondary cell. The wireless device may receive the first power control field K subframes before the first subframe, wherein K is a preconfigured integer parameter greater than zero. The wireless device may receive the first control packet K subframes before the first subframe, wherein K is a preconfigured integer parameter greater than zero. K may be equal to 4 for FDD frame structure.

The transmission power may be computed employing at least one of the following parameters: bandwidth of radio resources identified by the first uplink grant; a downlink pathloss estimate; modulation and coding identified by the first uplink grant; the first parameter; and/or the like. The transmission power of the first uplink packet may be within a pre-configured maximum power value. The wireless device may set the transmission power to the pre-configured maximum power value if the transmission power is above the pre-configured maximum power value. The wireless device may selectively reduce the transmission power if the wireless device does not have enough power budget to transmit the first uplink packet at the transmission power. The wireless device may selectively reduce or modify the transmission power of the first uplink packet after computing the transmission power.

According to some of the various aspects of embodiments, the setting of the wireless device transmit power for a physical uplink shared channel (PUSCH) transmission may, for example, be defined as follows. If the wireless device transmits PUSCH without a simultaneous PUCCH for the serving cell c, then the wireless device transmit power $P_{PUSCH,c}(i)$ for PUSCH transmission in subframe i for the serving cell c may be given by $$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_C + \Delta_{TF,c}(i) + f_{c(i)} \end{cases}$$

[dBm]

If the wireless device transmits a PUSCH signal simultaneous with a PUCCH signal for the serving cell c, then the wireless device transmit power $P_{PUSCH,c}(i)$ for the PUSCH transmission in subframe i for the serving cell c may be given by:

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_C + \Delta_{TF,c}(i) + f_{c(i)} \end{cases}$$

[dBm]

If the wireless device is not transmitting a PUSCH signal for the serving cell c, for the accumulation of a TPC (transmit power control) command received with DCI format 3/3A for PUSCH signal, the wireless device may assume that the wireless device transmit power $P_{PUSCH,c}(i)$ for the PUSCH transmission in subframe i for the serving cell c is computed by:

$$P_{PUSCH,c}(i) = \min\{P_{CMAX,c}(i), P_{O\_PUSCH,c}(1) + \alpha_c(1) \cdot PL_c + f_c(i)\}[dBm]$$

where, $P_{CMAX,c}(i)$ may be the configured wireless device transmit power defined in subframe i for serving cell c and $\hat{P}_{CMAX,c}(i)$ may be the linear value of $P_{CMAX,c}(i)$. $P_{CMAX,c}(i)$ may be defined according to the definitions in LTE standard release 10. $\hat{P}_{PUCCH}(i)$ may be the linear value of $P_{PUCCH}(i)$. $P_{PUCCH}(i)$ may be defined according to the definitions in LTE standard release 10. $M_{PUSCH,c}(i)$ may be the bandwidth of the PUSCH resource assignment expressed in number of resource blocks valid for subframe i and serving cell c. $P_{O\_PUSCH,c}(j)$ may be calculated employing parameters provided by higher layers. $PL_c$ may be the downlink pathloss estimate calculated in the wireless device for serving cell c in dB. $\Delta_{TF,c}(i)$ is calculated as a function of modulation and coding.

$\delta_{PUSCH,c}$ may be a correction value, also referred to as a TPC command and may be included in PDCCH/EPDCCH with DCI format 0/4 for serving cell c or jointly coded with other TPC commands in PDCCH with DCI format 3/3A whose CRC parity bits may be scrambled with TPC-PUSCH-RNTI. The current PUSCH power control adjustment state for serving cell c may be given by $f_c(i)$ which may be predefined.

$f_c(i)=f_c(i-1)+\delta_{PUSCH,c}(i-K_{PUSCH})$ if accumulation is enabled based on the parameter accumulation-enabled provided by higher layers or if the TPC command $\delta_{PUSCH,c}$ is included in a PDCCH/EPDCCH with DCI format 0 for serving cell c, where $\delta_{PUSCH,c}(i-K_{PUSCH})$ may a be signaled on PDCCH/EPDCCH with DCI format 0/4 or PDCCH with DCI format 3/3A on subframe $i-K_{PUSCH}$ and where $f_c(0)$ may be the first value after reset of accumulation. The value of $K_{PUSCH}$ may be predefined. For serving cell c, the wireless device may attempt to decode a PDCCH/EPDCCH of DCI format 0/4 with the wireless device's CRNTI or DCI format 0 for SPS C-RNTI and a PDCCH of DCI format 3/3A with this wireless device's TPC-PUSCH-RNTI in every subframe except when in DRX or where serving cell c is deactivated. If DCI format 0/4 for serving cell c and DCI format 3/3A are both detected in the same subframe, then the wireless device may use the $\delta_{PUSCH,c}$ provided in DCI format 0/4. $\delta_{PUSCH,c}=0$ dB for a subframe where no TPC command is decoded for serving cell c or where DRX occurs or i is not an uplink subframe in TDD. The $\delta_{PUSCH,c}$ dB accumulated values signaled on PDCCH/EPDCCH with DCI format 0/4 may be derived from a predefined table. If the PDCCH/EPDCCH with DCI format 0 is validated as a SPS activation or release PDCCH/EPDCCH, then $\delta_{PUSCH,c}$ is 0 dB. The $\delta_{PUSCH}$ dB accumulated values signaled on PDCCH with DCI format 3/3A may be one of SET1 derived from a predefined table or SET2 derived from a predefined table as determined by the parameter TPC-Index provided by higher layers. If a wireless device has reached $P_{CMAX,c}(i)$ for serving cell c, positive TPC commands for serving cell c may not be accumulated. If wireless device has reached minimum power, negative TPC commands may not be accumulated.

$f_c(i)=\delta_{PUSCH,c}(i-K_{PUSCH})$ if accumulation is not enabled for serving cell c based on the parameter Accumulation-enabled provided by higher layers, where $\delta_{PUSCH,c}(i-K_{PUSCH})$ may be signaled on PDCCH/EPDCCH with DCI format 0/4 for serving cell c on subframe $i-K_{PUSCH}$. The $\delta_{PUSCH,c}$ dB absolute values signaled on PDCCH/EPDCCH with DCI format 0/4 may be derived from a predefined table. If the PDCCH/EPDCCH with DCI format 0 is validated as a SPS activation or release PDCCH, then $\delta_{PUSCH,c}$ is 0 dB. $f_c(i)=f_c(i-1)$ for a subframe where no PDCCH/EPDCCH with DCI format 0/4 is decoded for serving cell c or where DRX occurs or i is not an uplink subframe in TDD.

For both types of $f_c(*)$ (accumulation or current absolute) the first value may be set as follows: If $P_{O\_UE\_PUSCH,c}$ value is changed by higher layers and serving cell c is the primary cell or, if $P_{O\_UE\_PUSCH,c}$ value is received by higher layers and serving cell c is a Secondary cell: $f_c(0)=0$; Else: If serving cell c is the serving cell the serving cell, in which the Random Access Preamble was transmitted on the uplink carrier $f_c(0)=\Delta P_{rampup}+\delta_{msg2}$, where $\delta_{msg2}$ may be the TPC command indicated in the random access response, and $\Delta P_{rampup}$ may be provided by higher layers and may correspond to the total power ramp-up from the first to the last preamble.

According to some of the various embodiments, a wireless device may receive at least one radio resource control message from a base station. The at least one radio resource control message may cause in the wireless device configuration of a plurality of cells comprising a primary cell and at least one secondary cell. The at least one radio resource control message may further cause assignment of each of the at least one secondary cell to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell. The wireless device may receive a control command to transmit a random access preamble on random access resources of a secondary cell in the secondary cell group.

The wireless device may transmit one or more times the random access preamble on the random access resources of the secondary cell. The wireless device may receive a random access response providing an uplink grant to transmit an uplink packet. The wireless device may compute transmission power of the uplink packet employing, at least in part, a first parameter calculated by summation of: a power control value corresponding to a power control field in the uplink grant; and a total power ramp-up from the first transmission to the last transmission of the random access preamble if the random access preamble is transmitted more than one time. The wireless device may transmit the first uplink packet in radio resources identified by the first uplink grant.

The random access response may comprise a timing adjustment command. The wireless device may apply the timing adjustment command to the secondary cell group.

The at least one radio resource control message may cause configuration of at least one power control parameter of the secondary cell. The uplink grant may comprise a radio resource allocation parameter; the power control field; and/or a modulation and coding index. The transmission power may be computed employing at least one of the following parameters: bandwidth of radio resources identified by the uplink grant; a downlink pathloss estimate; modulation and coding identified by the uplink grant; and the first parameter. The control command comprises a preamble identifier of the random access preamble. The at least one radio resource control message may cause configuration of the random access resources on the secondary cell. The wireless device may retransmits the random access preamble if the following conditions are met: no random access response is received in response to transmission of the random access preamble within a period of time; and a maximum number of transmissions is not reached.

According to some of the various aspects of embodiments, the random access procedure may be initiated by a PDCCH order or by the MAC sublayer itself. Random access procedure on an SCell may be initiated by a PDCCH order. If a UE receives a PDCCH transmission consistent with a PDCCH order masked with its C-RNTI (radio network temporary identifier), and for a specific serving cell, the UE may initiate a random access procedure on this serving cell. For random access on the PCell a PDCCH order or RRC optionally indicate the ra-PreambleIndex and the ra-PRACH-MaskIndex; and for random access on an SCell, the PDCCH order indicates the ra-PreambleIndex with a value different from zero and the ra-PRACH-MaskIndex. For the pTAG preamble transmission on PRACH and reception of a PDCCH order may only be supported for PCell.

According to some of the various aspects of embodiments, the procedure may use some of the following information: a) the available set of PRACH resources for the transmission of the random access preamble, prach-ConfigIndex, b) for PCell, the groups of random access preambles and/or the set of available random access preambles in each group, c) for PCell, the preambles that are contained in random access preambles group A and Random Access Preambles group B are calculated, d) the RA response window size ra-ResponseWindowSize, e) the power-ramping factor powerRampingStep, f) the maximum number of preamble transmission preambleTransMax, g) the initial preamble power preambleInitialReceivedTargetPower, h) the preamble format based offset DELTA_PREAMBLE, i) for PCell, the maximum number of Msg3 HARQ transmissions maxHARQ-Msg3Tx, j) for PCell, the Contention Resolution Timer mac-ContentionResolutionTimer. These parameters may be updated from upper layers before each Random Access procedure is initiated.

According to some of the various aspects of embodiments, the Random Access procedure may be performed as follows: Flush the Msg3 buffer; set the PREAMBLE_TRANSMISSION_COUNTER to 1; set the backoff parameter value in the UE to 0 ms; for the RN (relay node), suspend any RN subframe configuration; proceed to the selection of the Random Access Resource. There may be one Random Access procedure ongoing at any point in time. If the UE receives a request for a new Random Access procedure while another is already ongoing, it may be up to UE implementation whether to continue with the ongoing procedure or start with the new procedure.

According to some of the various aspects of embodiments, the Random Access Resource selection procedure may be performed as follows. If ra-PreambleIndex (Random Access Preamble) and ra-PRACH-MaskIndex (PRACH Mask Index) have been explicitly signalled and ra-PreambleIndex is not zero, then the Random Access Preamble and the PRACH Mask Index may be those explicitly signalled. Otherwise, the Random Access Preamble may be selected by the UE.

The UE may determine the next available subframe containing PRACH permitted by the restrictions given by the prach-ConfigIndex, the PRACH Mask Index and physical layer timing requirements (a UE may take into account the possible occurrence of measurement gaps when determining the next available PRACH subframe). If the transmission mode is TDD and the PRACH Mask Index is equal to zero, then if ra-PreambleIndex was explicitly signalled and it was not 0 (i.e., not selected by MAC), then randomly select, with equal probability, one PRACH from the PRACHs available in the determined subframe. Else, the UE may randomly select, with equal probability, one PRACH from the PRACHs available in the determined subframe and the next two consecutive subframes. If the transmission mode is not TDD or the PRACH Mask Index is not equal to zero, a UE may determine a PRACH within the determined subframe in accordance with the requirements of the PRACH Mask Index. Then the UE may proceed to the transmission of the Random Access Preamble.

PRACH mask index values may range for example from 0 to 16. PRACH mask index value may determine the allowed PRACH resource index that may be used for transmission. For example, PRACH mask index 0 may mean that all PRACH resource indeces are allowed; or PRACH mask index 1 may mean that PRACH resource index 0 may be used. PRACH mask index may have different meaning in TDD and FDD systems.

The random-access procedure may be performed by UE setting PREAMBLE_RECEIVED_TARGET_POWER to preambleInitialReceivedTargetPower+DELTA_PRE-AMBLE+(PREAMBLE_TRANSMISSION_COUNTER−1)*powerRampingStep. The UE may instruct the physical layer to transmit a preamble using the selected PRACH, corresponding RA-RNTI, preamble index and PREAMBLE_RECEIVED_TARGET_POWER.

According to some of the various aspects of embodiments, once the random access preamble is transmitted and regardless of the possible occurrence of a measurement gap, the UE may monitor the PDCCH of the PCell for random access response(s) identified by the RA-RNTI (random access radio network identifier) a specific RA-RNTI defined below, in the random access response (RAR) window which may start at the subframe that contains the end of the preamble transmission plus three subframes and has length ra-ResponseWindowSize subframes. The specific RA-RNTI associated with the PRACH in which the Random Access Preamble is transmitted, is computed as: RA-RNTI=1+t_id+10*f_id. Where t_id may be the index of the first subframe of the specified PRACH (0≤t_id<10), and f_id is the index of the specified PRACH within that subframe, in ascending order of frequency domain (0≤f_id<6). The UE may stop monitoring for RAR(s) after successful reception of a RAR containing random access preamble identifiers that matches the transmitted random access preamble.

According to some of the various aspects of embodiments, if a downlink assignment for this TTI (transmission tme interval) has been received on the PDCCH for the RA-RNTI and the received TB (transport block) is successfully decoded, the UE may regardless of the possible occurrence of a measurement gap: if the RAR contains a backoff indicator (BI) subheader, set the backoff parameter value in the UE employing the BI field of the backoff indicator subheader, else, set the backoff parameter value in the UE to zero ms. If the RAR contains a random access preamble identifier corresponding to the transmitted random access preamble, the UE may consider this RAR reception successful and apply the following actions for the serving cell where the random access preamble was transmitted: process the received riming advance command for the cell group in which the preamble was transmitted, indicate the preambleInitialReceivedTargetPower and the amount of power ramping applied to the latest preamble transmission to lower layers (i.e., (PREAMBLE_TRANSMISSION_COUNTER−1)*powerRampingStep); process the received uplink grant value and indicate it to the lower layers; the uplink grant is applicable to uplink of the cell in which the preamble was transmitted. If ra-PreambleIndex was explicitly signalled and it was not zero (e.g., not selected by MAC), consider the random access procedure successfully completed. Otherwise, if the Random Access Preamble was selected by UE MAC, set the Temporary C-RNTI to the value received in the RAR message. When an uplink transmission is required, e.g., for contention resolution, the eNB may not provide a grant smaller than 56 bits in the Random Access Response.

According to some of the various aspects of embodiments, if no RAR is received within the RAR window, or if none of all received RAR contains a random access preamble identifier corresponding to the transmitted random access preamble, the random access response reception may considered not successful. If RAR is not received, UE may increment PREAMBLE_TRANSMISSION_COUNTER by 1. If PREAMBLE_TRANSMISSION_COUNTER= preambleTransMax+1 and random access preamble is transmitted on the PCell, then UE may indicate a random access problem to upper layers (RRC). This may result in radio link failure. If PREAMBLE_TRANSMISSION_COUNTER= preambleTransMax+1 and the random access preamble is transmitted on an SCell, then UE may consider the random access procedure unsuccessfully completed. UE may stay in RRC connected mode and keep the RRC connection active eventhough a random access procedure unsuccessfully completed on a secondary TAG. According to some of the various aspects of embodiments, at completion of the random access procedure, the UE may discard explicitly signalled ra-PreambleIndex and ra-PRACH-MaskIndex, if any; and flush the HARQ buffer used for transmission of the MAC PDU in the Msg3 buffer. In addition, the RN may resume the suspended RN subframe configuration, if any.

According to some of the various aspects of embodiments, a UE may have a configurable timer timeAlignmentTimer per TAG. The timeAlignmentTimer is used to control how long the UE considers the Serving Cells belonging to the associated TAG to be uplink time aligned (in-sync). When a Timing Advance Command MAC control element is received, the UE may apply the riming advance command for the indicated TAG, and start or restart the timeAlignmentTimer associated with the indicated TAG. When a timing advance command is received in a RAR message for a serving cell belonging to a TAG andif the random access preamble was not selected by UE MAC, the UE may apply the timing advance command for this TAG, and may start or restart the timeAlignmentTimer associated with this TAG. When a timeAlignmentTimer associated with the pTAG expires, the UE may: flush all HARQ buffers for all serving cells; notify RRC to release PUCCH/SRS for all serving cells; clear any configured downlink assignments and uplink grants; and consider all running timeAlignmentTimers as expired. When a timeAlignmentTimer associated with an sTAG expires, then for all Serving Cells belonging to this TAG, the UE may flush all HARQ buffers; and notify RRC to release SRS. The UE may not perform any uplink transmission on a serving Cell except the random access preamble transmission when the timeAlignmentTimer associated with the TAG to which this serving cell belongs is not running. When the timeAlignmentTimer associated with the pTAG is not running, the UE may not perform any uplink transmission on any serving cell except the random access preamble transmission on the PCell. A UE stores or maintains N_TA (current timing advance value of an sTAG) upon expiry of associated timeAlignmentTimer. The UE may apply a received timing advance command MAC control element and starts associated timeAlignmentTimer. Transmission of the uplink radio frame number i from the UE may start $(N_{TA}+N_{TA\ offset}) \times T_s$ seconds before the start of the corresponding downlink radio frame at the UE, where $0 \leq N_{TA} \leq 20512$. In an example implementation, $N_{TA\ offset}=0$ for frame structure type 1 (FDD) and $N_{TA\ offset}=624$ for frame structure type 2 (TDD).

According to some of the various aspects of embodiments, upon reception of a timing advance command for a TAG containing the primary cell, the UE may adjust uplink transmission timing for PUCCH/PUSCH/SRS of the primary cell based on the received timing advance command. The UL transmission timing for PUSCH/SRS of a secondary cell may be the same as the primary cell if the secondary cell and the primary cell belong to the same TAG. Upon reception of a timing advance command for a TAG not containing the primary cell, the UE may adjust uplink transmission timing for PUSCH/SRS of secondary cells in the TAG based on the received timing advance command where the UL transmission timing for PUSCH/SRS is the same for all the secondary cells in the TAG.

The timing advance command for a TAG may indicates the change of the uplink timing relative to the current uplink timing for the TAG as multiples of 16 Ts (Ts: sampling time unit). The start timing of the random access preamble may obtained employing a downlink synchronization time in the same TAG. In case of random access response, an 11-bit timing advance command, TA, for a TAG may indicate NTA values by index values of TA=0, 1, 2, . . . , 1282, where an amount of the time alignment for the TAG may be given by NTA=TA×16. In other cases, a 6-bit timing advance command, TA, for a TAG may indicate adjustment of the current NTA value, NTA,old, to the new NTA value, NTA,new, by index values of TA=0, 1, 2, . . . , 63, where NTA,new=NTA, old+(TA−31)×16. Here, adjustment of NTA value by a positive or a negative amount indicates advancing or delaying the uplink transmission timing for the TAG by a given amount respectively. For a timing advance command received on subframe n, the corresponding adjustment of the uplink transmission timing may apply from the beginning of subframe n+6. For serving cells in the same TAG, when the UE's uplink PUCCH/PUSCH/SRS transmissions in subframe n and subframe n+1 are overlapped due to the timing adjustment, the UE may complete transmission of subframe n and not transmit the overlapped part of subframe n+1. If the received downlink timing changes and is not compensated or is only partly compensated by the uplink timing adjustment without timing advance command, the UE may change NTA accordingly.

Downlink frames and subframes of downlink carriers may be time aligned (by the base station) in carrier aggregation and multiple TAG configuration. Time alignment errors may be tolerated to some extend. For example, for intra-band contiguous carrier aggregation, time alignment error may not exceed 130 ns. In another example, for intra-band non-contiguous carrier aggregation, time alignment error may not exceed 260 ns. In another example, for inter-band carrier aggregation, time alignment error may not exceed 1.3 μs.

The UE may have capability to follow the frame timing change of the connected base station. The uplink frame transmission may take place $(N_{TA}+N_{TA\ offset}) \times T_s$ before the reception of the first detected path (in time) of the corresponding downlink frame from the reference cell. The UE may be configured with a pTAG containing the PCell. The pTAG may also contain one or more SCells, if configured. The UE may also be configured with one or more sTAGs, in which case the pTAG may contain one PCell and the sTAG may contain at least one SCell with configured uplink. In pTAG, UE may use the PCell as the reference cell for deriving the UE transmit timing for cells in the pTAG. The UE may employ a synchronization signal on the reference cell to drive downlink timing. When a UE is configured with an sTAG, the UE may use an activated SCell from the sTAG for deriving the UE transmit timing for cell in the sTAG.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

According to some of the various embodiments, physical downlink control channel(s) may carry transport format, scheduling assignments, uplink power control, and other control information. PDCCH may support multiple formats. Multiple PDCCH packets may be transmitted in a subframe. According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. PDCCH channel(s) may carry a plurality of downlink control packets in subframe(s). Enhance PDCCH may be implemented in a cell as an option to carrier control information. According to some of the various embodiments, PHICH may carry the hybrid-ARQ (automatic repeat request) ACK/NACK.

Other arrangements for PCFICH, PHICH, PDCCH, enhanced PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device with N_TA=0.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a primary carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits.

Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier (if the carrier is uplink time aligned), CQI(channel quality indicator)/PMI(precoding matrix indicator)/RI(ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A wireless device comprising:
   one or more processors; and
   memory storing instructions that, when executed by the one or more processors, cause the wireless device to:
   receive at least one message comprising configuration parameters of a plurality of cells grouped into a plurality of cell groups comprising a first cell group and a second cell group, wherein:
      uplink transmission timing in the first cell group is derived employing a first cell in the first cell group; and
      uplink transmission timing in the second cell group is derived employing a second cell in the second cell group;
   transmit a first signal on a cell of the first cell group; and
   responsive to a determination that a configured transmission of sounding reference signals (SRSs) overlaps in time with a configured transmission of the first signal, and responsive to a determination that a calculated total transmission power exceeds a first power value:
      drop at least one first SRS of the SRSs;
      scale a transmission power of at least one second SRS of the SRSs; and
      transmit the at least one second SRS.

2. The wireless device of claim 1, wherein the configured transmission of the at least one first SRS is configured for transmission in the first cell group.

3. The wireless device of claim 1, wherein the configured transmission of the at least one second SRS is configured for transmission in the second cell group.

4. The wireless device of claim 1, wherein the transmission power of the at least one second SRS is scaled employing a factor smaller than or equal to one.

5. The wireless device of claim 1, wherein the first signal comprises a physical uplink control channel signal or a physical uplink shared channel signal.

6. The wireless device of claim 1, wherein the configured transmission of the SRSs is configured for transmission in a last symbol of a first subframe.

7. The wireless device of claim 6, wherein the first signal is transmitted in the first subframe.

8. The wireless device of claim 1, wherein the first signal comprises a random access preamble.

9. The wireless device of claim 1, wherein the first power value is a maximum transmission power value associated with the wireless device.

10. The wireless device of claim 1, wherein the instructions, when executed by the one or more processors, further cause the wireless device to adjust a transmission power of a second signal responsive to a determination that the calculated total transmission power exceeds the first power value.

11. A method comprising:
    receiving at least one message comprising configuration parameters of a plurality of cells grouped into a plurality of cell groups comprising a first cell group and a second cell group, wherein:
       uplink transmission timing in the first cell group is derived employing a first cell in the first cell group; and
       uplink transmission timing in the second cell group is derived employing a second cell in the second cell group;
    transmitting a first signal on a cell of the first cell group; and
    responsive to a determination that a configured transmission of sounding reference signals (SRSs) overlaps in time with a configured transmission of the first signal and responsive to a determination that a calculated total transmission power exceeds a first power value:
       dropping at least one first SRS of the SRSs;
       scaling a transmission power of at least one second SRS of the SRSs; and
       transmitting the at least one second SRS.

12. The method of claim 11, wherein the configured transmission of the at least one first SRS is configured for transmission in the first cell group.

13. The method of claim 11, wherein the configured transmission of the at least one second SRS is configured for transmission in the second cell group.

14. The method of claim 11, wherein the transmission power of the at least one second SRS is scaled employing a factor smaller than or equal to one.

15. The method of claim 11, wherein the first signal is a physical uplink control channel signal or a physical uplink shared channel signal.

16. The method of claim 11, wherein the configured transmission of the SRSs is configured for transmission in a last symbol of a first subframe.

17. The method of claim 16, wherein the first signal is transmitted in the first subframe.

18. The method of claim 11, wherein the first signal is a random access preamble.

19. The method of claim 11, wherein the first power value is a maximum transmission power value associated with a wireless device.

20. The method of claim 11, further comprising adjusting a transmission power of a second signal responsive to a determination that the calculated total transmission power exceeds the first power value.

21. A method comprising:
    transmitting, by a base station and to a wireless device, at least one message comprising configuration parameters of a plurality of cells grouped into a plurality of cell groups comprising a first cell group and a second cell group, wherein:

uplink transmission timing in the first cell group is derived employing a first cell in the first cell group; and uplink transmission timing in the second cell group is derived employing a second cell in the second cell group;

receiving, by the wireless device, the at least one message;

transmitting, by the wireless device, a first signal on a cell of the first cell group; and responsive to a determination that a configured transmission of sounding reference signals (SRSs) overlaps in time with a configured transmission of the first signal and responsive to a determination that a calculated total transmission power exceeds a first power value:

dropping, by the wireless device, at least one first SRS of the SRSs;

scaling, by the wireless device, a transmission power of at least one second SRS of the SRSs; and transmitting, by the wireless device, the at least one second SRS.

22. The method of claim 21, wherein the configured transmission of the at least one first SRS is configured for transmission in the first cell group.

23. The method of claim 21, wherein the configured transmission of the at least one second SRS is configured for transmission in the second cell group.

24. The method of claim 21, wherein the transmission power of the at least one second SRS is scaled employing a factor smaller than or equal to one.

25. The method of claim 21, wherein the first signal is a physical uplink control channel signal or a physical uplink shared channel signal.

26. The method of claim 21, wherein the configured transmission of the SRSs is configured for transmission in a last symbol of a first subframe.

27. The method of claim 26, wherein the first signal is transmitted in the first subframe.

28. The method of claim 21, wherein the first signal is a random access preamble.

29. The method of claim 21, wherein the first power value is a maximum transmission power value associated with the wireless device.

30. The method of claim 21, further comprising adjusting a transmission power of a second signal responsive to a determination that the calculated total transmission power exceeds the first power value.

31. A system comprising:
a base station comprising:
one or more processors; and
memory storing instructions that, when executed by the one or more processors of the base station, cause the base station to:
transmit at least one message comprising configuration parameters of a plurality of cells grouped into a plurality of cell groups comprising a first cell group and a second cell group, wherein:
uplink transmission timing in the first cell group is derived employing a first cell in the first cell group; and
uplink transmission timing in the second cell group is derived employing a second cell in the second cell group; and
a wireless device comprising:
one or more processors; and
memory storing instructions that, when executed by the one or more processors of the wireless device, cause the wireless device to:
receive the at least one message;
transmit a first signal on a cell of the first cell group; and
responsive to a determination that a configured transmission of sounding reference signals (SRSs) overlaps in time with a configured transmission of the first signal, and responsive to a determination that a calculated total transmission power exceeds a first power value:
drop at least one first SRS of the SRSs;
scale a transmission power of at least one second SRS of the SRSs; and
transmit the at least one second SRS.

32. The system of claim 31, wherein the configured transmission of the at least one first SRS is configured for transmission in the first cell group.

33. The system of claim 31, wherein the configured transmission of the at least one second SRS is configured for transmission in the second cell group.

34. The system of claim 31, wherein the transmission power of the at least one second SRS is scaled employing a factor smaller than or equal to one.

35. The system of claim 31, wherein the first signal comprises a physical uplink control channel signal or a physical uplink shared channel signal.

36. The system of claim 31, wherein the configured transmission of the SRSs is configured for transmission in a last symbol of a first subframe.

37. The system of claim 36, wherein the first signal is transmitted in the first subframe.

38. The system of claim 31, wherein the first signal comprises a random access preamble.

39. The system of claim 31, wherein the first power value is a maximum transmission power value associated with the wireless device.

40. The system of claim 31, wherein the instructions, when executed by the one or more processors of the wireless device, further cause the wireless device to adjust a transmission power of a second signal responsive to a determination that the calculated total transmission power exceeds the first power value.

* * * * *

UNITED STATES PATENT AND TRADEMARK OFFICE
CERTIFICATE OF CORRECTION

PATENT NO. : 9,642,098 B2
APPLICATION NO. : 15/060881
DATED : May 2, 2017
INVENTOR(S) : Esmael Hejazi Dinan Page 1 of 2

It is certified that error appears in the above-identified patent and that said Letters Patent is hereby corrected as shown below:

On the Title Page

Column 1, item (65) Prior Publication Data, Line 1:
After "Data", please insert --¶US 2017/0118753 A9 Apr. 27, 2017--

Page 5, Column 1 of item (56) Other Publications, Line 56:
Delete "TerrestrialRadio" and insert --Terrestrial Radio--

Page 5, Column 2 of item (56) Other Publications, Line 11:
Delete "Souce:" and insert --Source:--

Page 5, Column 2 of item (56) Other Publications, Line 27:
Delete "Dpen" and insert --Open--

Page 5, Column 2 of item (56) Other Publications, Line 55:
Delete "Souce:" and insert --Source:--

Page 6, Column 1 of item (56) Other Publications, Line 51:
Delete "Chian" and insert --China--

Page 6, Column 2 of item (56) Other Publications, Line 61:
Delete "Fluawei," and insert --Huawei,--

Page 7, Column 1 of item (56) Other Publications, Line 41:
Delete "Cun-ent" and insert --Current--

Page 7, Column 1 of item (56) Other Publications, Line 45:
Delete "36212" and insert --36.212--

Signed and Sealed this
Sixth Day of September, 2022

Katherine Kelly Vidal
*Director of the United States Patent and Trademark Office*

CERTIFICATE OF CORRECTION (continued)
U.S. Pat. No. 9,642,098 B2

Page 7, Column 2 of item (56) Other Publications, Line 2:
Delete "'Source:" and insert --Source:--

Page 7, Column 2 of item (56) Other Publications, Line 8:
Delete "Souce:" and insert --Source:--

Page 7, Column 2 of item (56) Other Publications, Line 11:
Delete "Souce:" and insert --Source:--

Page 7, Column 2 of item (56) Other Publications, Line 68:
Delete "ST-Ercisson," and insert --ST-Ericsson,--

In the Specification

Column 11, Detailed Description of Embodiments, Line 26:
Delete "TAGS" and insert --TAG3--

Column 38, Detailed Description of Embodiments, Line 56:
After "PPRACH=min{$P_{CMAX,c}(i)$", insert --,--

Column 44, Detailed Description of Embodiments, Line 48:
After "may", delete "a"

Column 44, Detailed Description of Embodiments, Line 50:
After "i-$K_{PUSCH}$", insert --,--

Column 47, Detailed Description of Embodiments, Line 63:
Delete "tme" and insert --time--

Column 48, Detailed Description of Embodiments, Line 58:
Delete "andif" and insert --and if--

Column 54, Detailed Description of Embodiments, Line 23:
Delete "Lab VIEWMathScript." and insert --LabVIEWMathScript.--